(12) United States Patent
Lin et al.

(10) Patent No.: US 12,365,968 B2
(45) Date of Patent: Jul. 22, 2025

(54) ORGANIC HYDROGEN STORAGE MATERIAL DEHYDROGENATION CATALYST, SUPPORT FOR THE CATALYST, HYDROGEN-STORAGE ALLOY, AND PROCESS FOR PROVIDING HIGH-PURITY HYDROGEN GAS

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Wei Lin, Beijing (CN); Xue Yang, Beijing (CN); Haitao Song, Beijing (CN); Ye Song, Beijing (CN); Min Sun, Beijing (CN); Jun Liu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 812 days.

(21) Appl. No.: 17/595,028

(22) PCT Filed: May 6, 2020

(86) PCT No.: PCT/CN2020/088750
§ 371 (c)(1),
(2) Date: Nov. 5, 2021

(87) PCT Pub. No.: WO2020/224586
PCT Pub. Date: Nov. 12, 2020

(65) Prior Publication Data
US 2022/0227623 A1 Jul. 21, 2022

(30) Foreign Application Priority Data

May 6, 2019 (CN) .................. 201910370696.X
May 6, 2019 (CN) .................. 201910370702.1

(51) Int. Cl.
*C22C 28/00* (2006.01)
*B01D 53/04* (2006.01)
*B01D 53/053* (2006.01)
*B01D 53/22* (2006.01)
*B01J 21/06* (2006.01)
*B01J 23/42* (2006.01)
*B01J 23/44* (2006.01)
*B01J 23/656* (2006.01)
*B01J 23/755* (2006.01)
(Continued)

(52) U.S. Cl.
CPC .......... *C22C 28/00* (2013.01); *B01D 53/0462* (2013.01); *B01D 53/053* (2013.01); *B01D 53/229* (2013.01); *B01J 21/063* (2013.01); *B01J 23/42* (2013.01); *B01J 23/44* (2013.01); *B01J 23/6562* (2013.01); *B01J 23/755* (2013.01); *B01J 23/835* (2013.01); *B01J 23/892* (2013.01); *B01J 35/615* (2024.01); *B01J 35/633* (2024.01); *B01J 35/635* (2024.01); *B01J 35/638* (2024.01); *B22F 1/00* (2013.01); *C01B 3/0031* (2013.01); *C01B 3/0036* (2013.01); *C01B 3/0052* (2013.01); *C01B 3/0057* (2013.01); *C01B 3/26* (2013.01); *F17C 1/00* (2013.01); *F17C 7/04* (2013.01); *F17C 11/005* (2013.01); *H01M 8/04216* (2013.01); *B01D 2256/16* (2013.01); *C01P 2002/72* (2013.01); *F17C 2221/012* (2013.01); *F17C 2225/0123* (2013.01); *F17C 2225/036* (2013.01); *F17C 2265/065* (2013.01); *H01M 2250/20* (2013.01)

(58) Field of Classification Search
None
See application file for complete search history.

(56) References Cited

U.S. PATENT DOCUMENTS 3,506,633 A  4/1970  Matsuura et al.
4,108,920 A  8/1978  Ryu
(Continued)

FOREIGN PATENT DOCUMENTS

CN  1123474 A   5/1996
CN  1100154 C   1/2003
(Continued)

OTHER PUBLICATIONS

Gianotti et al., High-purity hydrogen generation via dehydrogenation of organic carriers: A review on the catalytic process, ACS Catal., 2018 (Gianotti) (Year: 2018).*
(Continued)

*Primary Examiner* — Sheng H Davis
(74) *Attorney, Agent, or Firm* — NKL Law; Allen Xue

(57) ABSTRACT

A catalyst used for dehydrogenation of an organic hydrogen-storage material to generate hydrogen, a support for the catalyst, and a preparation process thereof are presented. A hydrogen-storage alloy and a preparation process thereof are also provided. A process for providing high-purity hydrogen, a high-efficiently distributed process for producing high-purity and high-pressure hydrogen, a system for providing high-purity and high-pressure hydrogen, a mobile hydrogen supply system, and a distributed hydrogen supply apparatus are also described.

14 Claims, 3 Drawing Sheets

(51) Int. Cl.
*B01J 23/835* (2006.01)
*B01J 23/89* (2006.01)
*B01J 35/61* (2024.01)
*B01J 35/63* (2024.01)
*B22F 1/00* (2022.01)
*C01B 3/00* (2006.01)
*C01B 3/26* (2006.01)
*F17C 1/00* (2006.01)
*F17C 7/04* (2006.01)
*F17C 11/00* (2006.01)
*H01M 8/04082* (2016.01)

(56) References Cited

U.S. PATENT DOCUMENTS

| | | |
|---|---|---|
| 6,255,548 B1 | 7/2001 | Didillon et al. |
| 2004/0198592 A1 | 10/2004 | Hu et al. |
| 2008/0234527 A1 | 9/2008 | Matsumoto et al. |

FOREIGN PATENT DOCUMENTS

| | | |
|---|---|---|
| CN | 101041869 A | 9/2007 |
| CN | 101532102 A | 9/2009 |
| CN | 101559923 A | 10/2009 |
| CN | 101845323 A | 9/2010 |
| CN | 103183314 A | 7/2013 |
| CN | 103638954 A | 3/2014 |
| CN | 104263997 A | 1/2015 |
| CN | 104532095 A | 4/2015 |
| CN | 105060248 A | 11/2015 |
| CN | 204897392 U | 12/2015 |
| CN | 105349841 A | 2/2016 |
| CN | 108220739 A | 6/2018 |
| CN | 108384991 A | 8/2018 |
| CN | 108654596 A | 10/2018 |
| CN | 109516438 A | 3/2019 |
| EP | 0605143 A2 | 12/1993 |
| JP | S61068303 A | 4/1986 |
| JP | S6227302 A | 2/1987 |
| JP | H06106061 A | 4/1994 |
| JP | 2001266864 A | 9/2001 |
| JP | 2005281103 A | 10/2005 |
| JP | 2006104000 * | 4/2006 |
| JP | 4717257 B2 | 7/2011 |
| JP | 2011245475 A | 12/2011 |
| JP | 2013199703 A | 10/2013 |
| JP | 2016196382 A | 11/2016 |
| JP | 2017159198 A | 9/2017 |
| JP | 2018144016 A | 9/2018 |
| TW | 200827293 A | 7/2008 |
| WO | 2016158437 A1 | 10/2016 |
| WO | 2020224584 A1 | 11/2020 |

OTHER PUBLICATIONS

Sandrock, Gary et al.; "A panoramic overview of hydrogen storage alloys from a gas reaction point of view"; Journal of Alloys and Compounds; vol. 293-295; ISSN. 0925-8388; Dec. 20, 1999; pp. 877-888.

Saih, Youssef et al.; "Tailoring of alumina surfaces as supports for NiMo sulfide catalysts in the ultra deep hydrodesulfurization of gas oil: case study of TiO2-coated alumina prepared by chemical vapor deposition technique"; Catalysis Today; vol. 86, No. 1-4; ISSN: 0920-5861; pp. 61-72.

Sugiura, Yukihiro et al.; "Dehydrogenation of Methylcyclohexane over Pt/TiO2-Al2O3 Catalysts"; Chemistry Letters; vol. 46, No. 11; Nov. 5, 2017; ISSN. 0366-7022; pp. 1601-1604.

Peng, Xianyun et al.; "Microstructures and Electrochemical Hydrogen Storage Characteristics of La0.65-xCe0.25-xPr0.03Nd0.07Y2xNi3.65Co0.75Mn0.3Al0.3(x=0-0.04)Alloys"; Int. J Electrochem. Sci. International Journal; vol. 8; Feb. 1, 2013; pp. 2262-2271.

Suleiman, Y. et al. "Design and Fabrication of Fluidized Bed Reactor"; International Journal of Engineering and Computer Science; vol. 2. No. 5; May 5, 2013; pp. 1595-1605.

Li, W. et al., "Effects of Y Substitution for La on the Microstructure and Electrochemical Properties of LaNi3.55Mn0.4Al0.3Co0.75 Hydrogen Storage Alloys", Materials Transactions, Jul. 16, 2008, vol. 49, No. 10, pp. 2229-2232.

* cited by examiner

ORGANIC HYDROGEN STORAGE MATERIAL DEHYDROGENATION CATALYST, SUPPORT FOR THE CATALYST, HYDROGEN-STORAGE ALLOY, AND PROCESS FOR PROVIDING HIGH-PURITY HYDROGEN GAS

TECHNICAL FIELD

The present invention relates to a catalyst used for dehydrogenation of an organic hydrogen-storage material to generate hydrogen gas, a support for the catalyst, and a preparation process thereof; the present invention also relates to a hydrogen-storage alloy and a preparation process thereof; and the present invention also relates to a process for providing high-purity hydrogen gas, a high-efficiently distributed process for producing high-purity and high-pressure hydrogen gas, a system for providing high-purity and high-pressure hydrogen gas, a mobile hydrogen supply system, and a distributed hydrogen supply apparatus.

BACKGROUND TECHNOLOGY

As a renewable energy source, hydrogen gas is not only energy efficient, but also produces almost no waste. The development of hydrogen gas energy source is expected to become an important way to improve energy efficiency, reduce oil consumption, improve the ecological environment, and ensure energy security. The development of sustainable and efficient large-scale hydrogen production technology has become an urgent need in the hydrogen energy era.

Hydrogen gas exists in gaseous form under normal conditions, and is flammable, explosive, and easy to diffuse, so that people should give priority to safety, high efficiency and no leakage loss in hydrogen-storage and transportation in practical applications, which brings great difficulties in storage and transportation. Therefore, hydrogen energy utilization needs to solve the problem of hydrogen gas storage and transportation.

Hydrogen gas is directly transported from the production site to the hydrogen fueling station in high-pressure gaseous state. The transportation cost is high, and long-distance transportation also has certain traffic safety hazards. In case of storing hydrogen gas in high-pressure gas state, the cost and the area of hydrogen-storage tanks are high and large, and there are also major safety hazards.

SUMMARY OF THE INVENTION

A technical problem to be solved by the present invention is to provide a catalyst for dehydrogenation of an organic hydrogen-storage compound to prepare hydrogen gas and a support for the catalyst. Another technical problem to be solved by the present invention is to provide a hydrogen-storage alloy used in a process for purifying a hydrogen gas containing organic substances and a preparation process thereof. Another technical problem to be solved by the present invention is to provide a process for providing high-purity hydrogen gas, a high-efficiently distributed process for producing high-purity and high-pressure hydrogen gas, a system for providing high-purity and high-pressure hydrogen gas, and a mobile hydrogen supply system and a distributed hydrogen supply apparatus.

To this end, the present invention provides the following technical solutions:

1. A process of providing high-purity hydrogen gas, the process comprising:

(1) An organic liquid hydrogen-storage material is contacted and reacted with a dehydrogenation catalyst to obtain a dehydrogenation reaction product containing hydrogen gas;

(2) the dehydrogenation reaction product is cooled to obtain a liquid product and a hydrogen-rich gas product, and the liquid product is collected;

(3) the hydrogen-rich gas is contacted with a hydrogen-storage alloy to obtain a hydrogen-containing alloy, and an unabsorbed gas is collected;

(3a) Optionally, an organic substance in the hydrogen-containing alloy storage container is removed;

(4) The hydrogen-containing alloy is heated to release hydrogen gas.

2. The process for providing high-purity hydrogen gas according to any of aforementioned technical solutions, wherein in step (1):

The reaction temperature for contacting and reacting the organic liquid hydrogen-storage material with the dehydrogenation catalyst is 150 to 450° C. (for example, 200 to 400° C., 300 to 350° C.);

The weight hourly space velocity for contacting and reacting the organic liquid hydrogen-storage material with the dehydrogenation catalyst is 0.5-50 $h^{-1}$ (e.g., 1-45 $h^{-1}$, 2-30 $h^{-1}$);

The pressure for contacting and reacting the organic liquid hydrogen-storage material with the dehydrogenation catalyst is 0.03-5 MPa (gauge pressure) (for example 0.3-5 MPa, 0.1-3 MPa, 0.5-2 MPa or 0.2-1.6 MPa);

Optionally, the organic liquid hydrogen-storage material is mixed with hydrogen gas and then contacted with the dehydrogenation catalyst, and the hydrogen-to-hydrocarbon ratio (the molar ratio of hydrogen gas to the organic liquid hydrogen-storage material) is 0-10 (for example, 0-8).

3. The process for providing high-purity hydrogen gas according to any of aforementioned technical solutions, wherein in step (2), The cooling temperature for cooling the dehydrogenation reaction product is lower than the boiling temperature of the organic substance(s) in the liquid product, preferably lower than the boiling temperature of the organic substance with the lowest boiling point among those being liquid at normal temperature and pressure.

4. The process for providing high-purity hydrogen gas according to any of aforementioned technical solutions, wherein in step (3), The hydrogen-rich gas is the hydrogen-rich gas product or a hydrogen-gas-containing gas obtained by further separation of the hydrogen-rich gas product, and the process for the further separation includes temperature swing separation, membrane separation, pressure swing adsorption separation or a combination thereof.

The mass fraction of hydrogen gas in the hydrogen-rich gas is ≥80% (for example, 80-99%, preferably ≥85%, more preferably ≥90%).

5. The process for providing high-purity hydrogen gas according to any of aforementioned technical solutions, wherein in step (3), Contacting the hydrogen-rich gas with the hydrogen-storage alloy is carried out in one or more hydrogen-storage alloy storage containers:

The number of the hydrogen-storage alloy(s) can be one or more, and a plurality of hydrogen-storage alloys can be used in a mixture, or can be used in series or in parallel or in combination of in series and in parallel;

The pressure for contacting the hydrogen-rich gas with the hydrogen-storage alloy is 0.001-5 MPa (for example, 0.01-5 MPa, 0.03-4 MPa, 0.05-5 MPa, 0.08-2 MPa, 0.05-3 MPa, 0.1-1 MPa), in case of a plurality of hydrogen-storage alloy storage containers and in the presence of hydrogen-storage containers in series, in the hydrogen-rich gas stream direction, the contact pressure for finally contacting with the hydrogen-storage alloy (also known as the hydrogen absorption pressure) is 0.05-5 MPa (for example 0.1-1 MPa);

The temperature for contacting the hydrogen-rich gas with the hydrogen-storage alloy (also known as hydrogen absorption temperature) is −70 to 100° C. (for example, −50 to 90° C., −30 to 80° C.);

In case of contacting with the hydrogen-storage alloy, the temperature of the hydrogen-rich gas is lower than the boiling temperature of the organic liquid hydrogen-storage material under normal pressure.

6. The process for providing high-purity hydrogen gas according to any of aforementioned technical solutions, wherein in step (3), The number of the hydrogen-storage alloy storage container(s) is one or more, wherein according to the order of contacting with hydrogen gas, the hydrogen-storage alloy in the hydrogen-storage alloy storage container finally contacting with hydrogen gas is a hydrogen-storage alloy having a high equilibrium pressure, wherein the hydrogen-storage alloy having a high equilibrium pressure is such one that there is at least one temperature point between 150 and 450° C., and at this temperature point the equilibrium pressure for absorbing hydrogen gas is 35 MPa or higher; preferably the hydrogen-storage alloy in at least one hydrogen-storage alloy storage container is a hydrogen-storage alloy having a high equilibrium pressure.

7. The process for providing high-purity hydrogen gas according to any of aforementioned technical solutions, wherein Step (3a) is performed, wherein the organic substance in the hydrogen-containing alloy storage container is removed by a purge process (for example the purge is performed with hydrogen gas, for example the process is as follows: after the hydrogen-storage alloy reaches a predetermined adsorption capacity, the supply of a hydrogen-rich gas to the hydrogen-storage alloy is stopped, a hydrogen gas is passed through the hydrogen-containing alloy, the organic gas in the hydrogen-containing alloy and in the hydrogen-containing alloy storage container (also known as hydrogen-storage alloy storage container) is taken out, and introduced into a storage tank for storage or absorbed by the hydrogen-storage alloy in other hydrogen-storage alloy storage containers; wherein preferably, the purity of the hydrogen gas for purge is greater than 90 wt %, more preferably greater than 95 wt %, for example greater than 99 wt %).

8. The process for providing high-purity hydrogen gas according to any of aforementioned technical solutions, wherein in step (4):

The temperature of hydrogen gas released by the hydrogen-storage alloy (namely, the temperature at which the hydrogen-storage alloy is heated, abbreviated as hydrogen release temperature) is 150 to 450° C., the pressure of the released hydrogen gas is ≥35 MPa (for example 35-100 MPa) in order to obtain a high-purity and high-pressure hydrogen, or the partial pressure of the released hydrogen gas is 0.1-5 MPa in order to obtain a high purity hydrogen gas, wherein the hydrogen release temperature is higher than the hydrogen absorption temperature.

9. The process for providing high-purity hydrogen gas according to any of aforementioned technical solutions, wherein the process further comprises the hydrogen-containing alloy is allowed to release hydrogen gas, and the released hydrogen contacts with different hydrogen-storage alloy(s) to form hydrogen-containing alloy(s), and this process is repeated once or multiple times, wherein the hydrogen-storage alloy used in at least the last repetition process is a hydrogen-storage alloy having a high equilibrium pressure.

10. The process for providing high-purity hydrogen gas according to any of aforementioned technical solutions, wherein The hydrogen-storage alloy is a combination of a first hydrogen-storage alloy and a second hydrogen-storage alloy;

The first hydrogen-storage alloy is a magnesium-based $A_2B$ type hydrogen-storage alloy for contacting with the hydrogen-rich gas, The second hydrogen-storage alloy is used to pressurize a first hydrogen-storage hydrogen gas, and the second hydrogen-storage alloy is a hydrogen-storage alloy having a high equilibrium pressure, and the second hydrogen-storage alloy is one or more of rare earth-based $AB_5$ type, zirconium-titanium-based $AB_2$ type, and titanium-based $AB$ type hydrogen-storage alloys;

The hydrogen-rich gas is firstly passed through the first hydrogen-storage alloy for impurity separation; then the high-purity hydrogen gas released from the first hydrogen-storage alloy is contacted with the second hydrogen-storage alloy, and then the second hydrogen-storage alloy is allowed to release hydrogen gas under high pressure.

The hydrogen release temperature of the first hydrogen-storage alloy is higher than the hydrogen absorption temperature of the second hydrogen-storage alloy, and the temperature difference is preferably ≥100° C. (for example, 350° C.≥temperature difference≥150° C.);

The first hydrogen-storage alloy and the second hydrogen-storage alloy are in different hydrogen-storage alloy storage tanks, and there is a heat exchange system between the first hydrogen-storage alloy storage tank and the second hydrogen-storage alloy storage tank;

The hydrogen absorption temperature for contacting the hydrogen-rich gas with the first hydrogen-storage alloy is 20-150° C. (for example, 50-100° C.), and the hydrogen partial pressure is 0.001-0.1 MPa (0.001-0.03 MPa);

The temperature at which the first hydrogen-storage alloy releases hydrogen gas (hydrogen release temperature) is 150-450° C. (for example, 200-350° C.), and the hydrogen gas partial pressure for hydrogen release is 0.1-5 MPa (for example, 0.1-1 MPa);

The hydrogen absorption temperature at which the second hydrogen-storage alloy absorbs hydrogen gas is −70 to 100° C. (for example, −30 to 100° C.), and the hydrogen gas partial pressure for hydrogen absorption is 0.1-5 MPa (for example, 0.1-1 MPa), The hydrogen release temperature of the second hydrogen-storage alloy is 150-450° C. (for example, 200-350° C.), and the hydrogen gas partial pressure for hydrogen release is ≥35 MPa (for example, 35-100 MPa).

11. The process for providing high-purity hydrogen gas according to any of aforementioned technical solutions, wherein The organic liquid hydrogen-storage material is an organic compound containing a ring in the molecule, which optionally contains heteroatom(s), and the heteroatom(s) may be on the ring; For example, saturated or unsaturated hydrocarbons containing cycloalkane ring(s), for example, saturated or unsaturated hydrocarbons containing no heterocyclic atom and containing cycloalkane ring(s), more specifically, saturated or unsaturated hydrocarbons containing no heterocyclic atom and containing cycloalkane ring(s) and having the total ring number of aromatic rings and cycloalkanes of 2 or less, for example, cyclohexane, methyl cyclohexane, decahydronaphthalene, and bi(cyclohexane); and saturated or unsaturated hydrocarbons containing heteroatom(s) and containing cycloalkane ring(s), for example, nitrogen-containing heterocyclic compounds, and nitrogen/boron-containing heterocyclic compounds, the nitrogen-containing heterocyclic compound comprises one or more of decahydrocarbazole, dodecahydroethylcarbazole, indoline, 4-aminopiperidine, piperidine-4-carboxamide, perhydro-4,7-phenanthroline, 2-methyl-1,2,3,4-tetrahydroquinoline, and 2,6-dimethyldecahydro-1,5-naphthyridine; the nitrogen/boron-containing heterocyclic compound comprises: one or more of 1,2-azaborinane, and 3-methyl-1,2-azaborolidine.

12. The process for providing high-purity hydrogen gas according to any of aforementioned technical solutions, wherein The process further comprises the released hydrogen gas is introduced into a hydrogen gas storage tank to store hydrogen gas; or the obtained high-purity and high-pressure hydrogen gas can be directly used to refuel a hydrogen fuel cell vehicle.

13. A high-efficiently distributed process for producing high-purity and high-pressure hydrogen gas, the process comprising:

In a dehydrogenation reactor, a liquid organic hydrogen-storage material is subjected to dehydrogenation reaction in the presence of a dehydrogenation catalyst to obtain a dehydrogenation reaction product including hydrogen gas;

In a cooling separation apparatus, the dehydrogenation reaction product is cooled and separated to obtain a hydrogen-rich stream and an organic liquid;

In a hydrogen-storage alloy storage container, a hydrogen-rich stream or a purified hydrogen-rich stream is contacted with the hydrogen-storage alloy to obtain a hydrogen-containing alloy;

Purging with hydrogen gas removes an organic substance in the hydrogen-storage alloy storage container; wherein the purity of the hydrogen gas for purge is preferably greater than 90 wt % (for example, greater than 95 wt %, greater than 99 wt %);

The hydrogen-containing alloy is heated to release hydrogen gas to obtain a high-pressure hydrogen gas and supply the obtained high-pressure hydrogen gas to a hydrogen-consuming apparatus or a high-pressure hydrogen gas storage tank for storage.

14. A system for providing a high-purity and high-pressure hydrogen gas, comprising:

An organic liquid hydrogen-storage material storage and supply apparatus, used to store an organic liquid hydrogen-storage material and provide the organic liquid hydrogen-storage material to a dehydrogenation reactor;

A dehydrogenated liquid storage apparatus, used to store the liquid product obtained after the dehydrogenation of the organic liquid hydrogen-storage material;

A dehydrogenation reactor apparatus, used for the dehydrogenation reaction of the organic liquid hydrogen-storage material under the action of the dehydrogenation catalyst to obtain a dehydrogenation reaction product including hydrogen gas;

A cooling separation apparatus, used to separate the dehydrogenation reaction product to obtain a hydrogen-rich gas product and a liquid product;

A hydrogen-storage & hydrogen-supply apparatus, which includes a hydrogen-storage alloy storage container and a hydrogen-storage alloy heating system, used to contact the hydrogen-rich gas with the hydrogen-storage alloy to adsorb hydrogen gas at low temperature and low pressure, and heat to dehydrogenate after the adsorption is saturated;

Optionally, a purge apparatus, used to remove organic substance(s) in the hydrogen-storage container;

A hydrogen gas supply apparatus, supplying a high-pressure hydrogen to the hydrogen-consuming apparatus or the hydrogen gas storage tank;

Preferably, the system is configured to be integrated and built in a cargo container, and used as a cargo container-type hydrogen production system in a hydrogen refueling station, or directly built in a hydrogen refueling station for use;

Preferably, the hydrogen-storage & hydrogen-supply apparatus comprises one or more hydrogen-storage alloy storage containers, a plurality of hydrogen-storage alloy storage containers can be connected in parallel or in series or in combination of in series and in parallel;

Preferably, at least one of the hydrogen-storage alloy storage containers is a high-pressure-resistant container and/or the hydrogen gas supply apparatus is a high-pressure-resistant apparatus, for example, its tolerance pressure is 35 MPa or more.

15. A mobile hydrogen supply system, comprising a transportation vehicle and a system for providing a high-purity and high-pressure hydrogen gas according to any of aforementioned technical solutions arranged on the transportation vehicle.

16. A distributed hydrogen supply apparatus, comprising a system for providing a high-purity and high-pressure hydrogen according to any of aforementioned technical solutions, and optionally comprising a high-pressure hydrogen gas storage tank.

17. A hydrogen-storage alloy or the process, system or apparatus according to any of aforementioned technical solutions, wherein the hydrogen-storage alloy is one or more of rare earth-based $AB_5$ type, zirconium-titanium-based $AB_2$ type, titanium-based AB type, magnesium-based $A_2B$ type and vanadium-based solid solution type hydrogen-storage alloys, wherein The molecular formula of the rare earth-based $AB_5$ type hydrogen-storage alloy is:

$$M_m Ni_{x1} Co_{x2} Mn_{x3} Fe_{x4} Al_{x5} Sn_{x6},$$

$$4.5 \leq x1+x2+x3+x4+x5+x6 \leq 5.5,$$

wherein, $M_m$ is 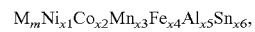 $La_{y1} Ce_{y2} Nd_{y3} Pr_{y4} Y_{y5}$, $$y1+y2+y3+y4+y5=1,$$

wherein, $0.4 \leq y1 \leq 0.99$ (e.g., $0.4 \leq y1 \leq 0.8$), $0 \leq y2 \leq 0.45$ (e.g., $0.1 \leq y2 \leq 0.45$), $0 \leq y3 \leq 0.2$ (e.g., $0 \leq y3 \leq 0.2$), $0 \leq y4 \leq 0.05$ (e.g., $0 \leq y4 \leq 0.05$), $0.01 \leq y5 \leq 0.1$ (e.g., $0.01 \leq y5 \leq 0.05$), $3 \leq x1 \leq 5.45$ (e.g., $3 \leq x1 \leq 4.9$), $0 \leq x2 \leq 1.5$ (e.g., $0.1 \leq x2 \leq 1$), $0 \leq x3 \leq 0.8$ (e.g., $0.1 \leq x3 \leq 0.6$), $0 \leq x4 \leq 0.8$ (e.g., $0.1 \leq x4 \leq 0.6$), $0 \leq x5 \leq 0.75$ (e.g., $0.05 \leq x5 \leq 0.5$), $0 \leq x6 \leq 0.2$; (e.g., $0 \leq x6 \leq 0.15$);

The molecular formula of the zirconium-titanium-based $AB_2$ type hydrogen-storage alloy is $AB_2$, wherein

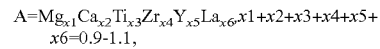
$$A=Mg_{x1} Ca_{x2} Ti_{x3} Zr_{x4} Y_{x5} La_{x6}, x1+x2+x3+x4+x5+x6=0.9\text{-}1.1,$$

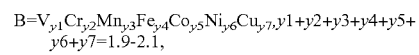
$$B=V_{y1} Cr_{y2} Mn_{y3} Fe_{y4} Co_{y5} Ni_{y6} Cu_{y7}, y1+y2+y3+y4+y5+y6+y7=1.9\text{-}2.1,$$

$0 \leq x1 \leq 0.54$ (e.g., $0.01 \leq x1 \leq 0.3$, $0.01 \leq x1 \leq 0.1$), $0 \leq x2 \leq 0.54$ (e.g., $0 \leq x2 \leq 0.25$), $0.5 \leq x3 \leq 1.04$ (e.g., $0.6 \leq x3 \leq 1$), $0.05 \leq x4 \leq 0.58$ (e.g., $0.1 \leq x4 \leq 0.58$), $0.01 \leq x5 \leq 0.2$ (e.g., $0.01 \leq x5 \leq 0.05$), $0 \leq x6 \leq 0.2$ (e.g., $0 \leq x6 \leq 0.05$), $0.05 \leq y1 \leq 1.95$ (e.g., 0.05≤y1≤1.8), 0≤y2≤1.9 (e.g., 0≤y2≤1.85), 0.05≤y3≤1.95 (e.g., 0.1≤y3≤1.95), 0≤y4≤1.6 (e.g., 0≤y4≤1.5), 0≤y5≤0.5 (e.g., 0≤y5≤0.3), 0.1≤y6≤0.5 (e.g., 0.1≤y6≤0.3), 0≤y7≤0.5 (e.g., 0.1≤y7≤0.2), preferably, $0.7 \leq x3:(x3+x4) \leq 0.95$, preferably, $1.7 \leq y1+y2+y3+y4 \leq 2$;

The molecular formula of the titanium-based AB type hydrogen-storage alloy is AB, wherein $A = Ti_{x1}Zr_{x2}Y_{x3}La_{x4}, x1+x2+x3+x4 = 0.85-1.1$, $B = V_{y1}Cr_{y2}Mn_{y3}Fe_{y4}Co_{y5}Ni_{y6}Cu_{y7}, y1+y2+y3+y4+y5+y6+y7 = 0.95-1.05$, 0≤x1≤1.09 (e.g., 0.9≤x1≤1.05), 0≤x2≤1.09 (e.g., 0≤x2≤0.5), 0.01≤x3≤0.2 (e.g., 0.01≤x3≤0.05), 0≤x4≤0.2 (e.g., 0≤x4≤0.05), 0.05≤y1≤0.5 (e.g., 0.05≤y1≤0.2), 0≤y2≤0.8 (e.g., 0≤y2≤0.2), 0≤y3≤0.8 (e.g., 0.05≤y3≤0.4, or 0.1≤y3≤0.4), 0.2≤y4≤1 (e.g., 0.5≤y4≤0.9), 0≤y5≤0.35 (e.g., 0≤y5≤0.1), 0≤y6≤0.45 (e.g., 0≤y6≤0.2), 0≤y7≤0.3 (e.g., 0≤y7≤0.2), preferably, x1 and x2 are zero at the same time;

The molecular formula of the magnesium-based $A_2B$ type hydrogen-storage alloy is $A_2B$, wherein $A = Mg_{x1}Ca_{x2}Ti_{x3}La_{x4}Y_{x5}, x1+x2+x3+x4+x5 = 1.9-2.1$, $B = Cr_{y1}Fe_{y2}Co_{y3}Ni_{y4}Cu_{y5}Mo_{y6}; y1+y2+y3+y4+y5+y6 = 0.9-1.1$;

wherein, 1.29≤x1≤2.09 (e.g., 1.7≤x1≤2.05), 0≤x2≤0.5 (e.g., 0x2≤0.2), 0≤x3≤0.8 (e.g., 0≤x3≤0.5), 0≤x4≤0.5 (e.g., 0≤x4≤0.2), 0.01≤x5≤0.2 (e.g., 0.05≤x5≤0.1), 0≤y1≤0.3 (e.g., 0≤y1≤0.2, 0.05≤y1≤0.2), 0≤y2≤0.2 (e.g., 0≤y2≤0.1), 0≤y3≤0.6 (e.g., 0≤y3≤0.5), 0.2≤y4≤1.1 (e.g., 0.7≤y4≤1.05), 0≤y5≤0.5 (e.g., 0≤y5≤0.4), 0≤y6≤0.15 (e.g., 0≤y6≤0.1);

The molecular formula of the vanadium-based solid solution type hydrogen-storage alloy is $A_{x1}B_{x2}$, wherein x1+x2=1, wherein $A = Ti_{y1}V_{y2}Zr_{y3}Nb_{y4}Y_{y5}La_{y6}Ca_{y7}, y1+y2+y3+y4+y5+y6+y7=1$, $B = Mn_{z1}Fe_{z2}Co_{z3}Ni_{z4}, z1+z2+z3+z4=1$, 0.7≤x1≤0.95 (e.g., 0.8≤x1≤0.95, 0.9≤x1≤0.95), 0.05≤x2≤0.3 (e.g., 0.05≤x2≤0.2, 0.05≤x2≤0.1), 0.40≤y1≤0.9 (e.g., 0.45≤y1≤0.9, 0.5≤y1≤0.8), 0≤y2≤0.5 (e.g., 0≤y2≤0.4), 0≤y3≤0.5 (e.g., 0≤y3≤0.4), 0≤y4≤0.55 (e.g., 0≤y4≤0.4), 0≤y5≤0.2 (e.g., 0.01≤y5≤0.2, 0.05≤y5≤0.2), 0≤y6≤0.1 (e.g., 0≤y6≤0.05), 0≤y7≤0.1 (e.g., 0≤y7≤0.05), 0≤z1≤1 (e.g., 0.1≤z1≤1, 0.2≤z1≤0.95), 0≤z2≤0.95 (e.g., 0≤z2≤0.9), 0≤z3≤0.3 (e.g., 0≤z3≤0.2), 0≤z4≤0.45 (e.g., 0.05≤z4≤0.45, 0.05≤z4≤0.3), 0.55≤z1+z2≤1 (e.g., 0.7≤z1+z2≤1).

18. The hydrogen-storage alloy, process, system or apparatus according to any of aforementioned technical solutions, wherein the hydrogen-storage alloy is selected from:

$La_{0.61}Ce_{0.16}Pr_{0.04}Nd_{0.19}Ni_{3.55}Co_{0.75}Mn_{0.4}Al_{0.3}$, $(Ti_{0.8}V_{0.2})_{0.95}(Fe_1)_{0.05}$, $(Ti_{0.8}Y_{0.2})_{0.95}(Mn_{0.95}Ni_{0.05})_{0.05}$, $(Ti_{0.4}V_{0.4}Y_{0.2})_{0.9}(Fe_{0.05}Mn_{0.95})_{0.1}$, $(Ti_{0.4}V_{0.4}Y_{0.2})_{0.9}(Fe_{0.05}Mn_{0.9}Ni_{0.05})0.1$, $(Ti_{0.7}Nb_{0.1}Y_{0.2})_{0.9}(Mn_1)_{0.1}$, $(Ti_{0.7}Nb_{0.1}Y_{0.2})_{0.9}(Mn_{0.7}Ni_{0.3})_{0.1}$, $(Ti_{0.4}Zr_{0.4}Y_{0.2})_{0.93}(Fe_{0.2}Mn_{0.7}Co_{0.1})_{0.07}$, $(Ti_{0.4}Zr_{0.4}Y_{0.2})_{0.93}(Fe_{0.2}Mn_{0.7}Ni_{0.1})_{0.07}$, $(Ti_{0.4}V_{0.4}Zr_{0.2})_{0.95}(Fe_{0.6}Mn_{0.2}Co_{0.1}Ni_{0.1})_{0.05}$, $(Ti_{0.4}V_{0.35}Zr_{0.2}Y_{0.05})_{0.95}(Fe_{0.6}Mn_{0.2}Co_{0.1}Ni_{0.1})_{0.05}$, $(Ti_{0.88}Y_{0.1}Ca_{0.02})_{0.95}(Fe_{0.3}Mn_{0.6}Co_{0.1})_{0.05}$, $(Ti_{0.88}Y_{0.1}Ca_{0.02})_{0.95}(Fe_{0.3}Mn_{0.6}Ni_{0.1})_{0.05}$, $(Ti_{0.7}Nb_{0.1}Y_{0.2})_{0.8}(Mn_{0.7}Ni_{0.3})_{0.2}$, $Ti_{0.64}Zr_{0.45}Y_{0.01}VMn_{0.9}Ni_{0.1}$, $Mg_{0.01}Ti_{0.93}Zr_{0.15}Y_{0.01}VMn_{0.9}Ni_{0.1}$, $Ti_{0.55}Zr_{0.48}Y_{0.05}La_{0.02}V_{0.33}Cr_{0.05}Mn_{1.5}Fe_{0.09}Ni_{0.1}$, $Ti_{0.85}Zr_{0.18}Y_{0.05}La_{0.02}V_{0.23}Cr_{0.05}Mn_{1.5}Fe_{0.09}Ni_{0.1}Cu_{0.1}$, $Ti_{0.6}Zr_{0.4}Y_{0.05}V_{0.1}Mn_{1.8}Ni_{0.2}$, $Mg_{0.1}Ti_{0.7}Zr_{0.2}Y_{0.05}V_{0.1}Mn_{1.6}Ni_{0.2}Cu_{0.2}$, $Ca_{0.01}Ti_{0.9}Zr_{0.05}Y_{0.05}V_{1.2}Mn_{0.6}Ni_{0.3}$, $Ca_{0.01}Ti_{0.85}Zr_{0.05}Y_{0.05}V_{1.2}Mn_{0.6}Ni_{0.1}Cu_{0.2}$, $TiZr_{0.05}Y_{0.05}V_{0.1}Cr_{1.4}Mn_{0.2}Co_{0.1}Ni_{0.3}$, $Mg_{0.1}Ti_{0.8}Zr_{0.15}Y_{0.05}V_{0.1}Cr_{1.4}Mn_{0.2}Co_{0.1}Ni_{0.1}Cu_{0.2}$, $Ti_{0.5}Zr_{0.55}Y_{0.05}V_{1.79}Mn_{0.1}Fe_{0.01}Ni_{0.2}$, $Ti_{0.8}Zr_{0.25}Y_{0.05}V_{1.79}Mn_{0.1}Fe_{0.01}Ni_{0.1}Cu_{0.1}$, $Mg_{0.01}Ti_{0.63}Zr_{0.45}Y_{0.01}VMn_{0.9}Ni_{0.1}$, $Mg_{1.8}Y_{0.1}Ni_1$, $Mg_{1.8}Y_{0.1}Cr_{0.05}Ni_1$, $Mg_{1.5}Ti_{0.8}Y_{0.05}Ni_{1.1}$, $Mg_{1.5}Ti_{0.8}Y_{0.05}Cr_{0.1}Ni_1$, $Mg_2Y_{0.1}Ni_{0.6}Cu_{0.4}$, $Mg_2Y_{0.1}Cr_{0.05}Ni_{0.6}Cu_{0.4}$, $Mg_{1.92}Y_{0.05}Ni_{0.95}Fe_{0.05}$, $Mg_{1.92}Y_{0.08}Cr_{0.2}Ni_{0.75}Fe_{0.05}$, $Mg_{1.9}Y_{0.1}Fe_{0.1}Ni_{0.8}Cu_{0.1}$, $Mg_{1.9}Y_{0.1}Cr_{0.1}Fe_{0.1}Ni_{0.7}Cu_{0.1}$, $Mg_{1.9}Y_{0.1}Ni_{0.8}Co_{0.2}$, $Mg_{1.9}Y_{0.1}Cr_{0.1}Ni_{0.8}Co_{0.2}$, $Mg_{1.8}Y_{0.1}La_{0.1}Ni_{0.9}Co_{0.1}$, $Mg_{1.8}Y_{0.1}La_{0.1}Cr_{0.05}Ni_{0.9}Co_{0.1}$, $Mg_{1.7}Ti_{0.2}Y_{0.1}Ni_{0.7}Co_{0.32}$, $Mg_{1.7}Ti_{0.2}Y_{0.1}Cr_{0.05}Ni_{0.7}Co_{0.3}$, $TiY_{0.01}V_{0.1}Fe_{0.7}Ni_{0.2}$, $TiY_{0.01}V_{0.1}Fe_{0.7}Mn_{0.1}Ni_{0.1}$, $TiY_{0.02}V_{0.2}Fe_{0.8}$, $TiY_{0.02}V_{0.2}Fe_{0.7}Mn_{0.1}$, $Ti_{0.97}Y_{0.03}V_{0.05}Cr_{0.03}Fe_{0.9}$, $Ti_{0.97}Y_{0.03}V_{0.05}Cr_{0.03}Fe_{0.5}Mn_{0.4}$, $Ti_{0.9}Y_{0.04}V_{0.15}Fe_{0.9}$, $Ti_{0.9}Y_{0.04}V_{0.05}Fe_{0.9}Mn_{0.1}$, $Ti_{0.97}Zr_{0.05}Y_{0.04}V_{0.1}Cr_{0.2}Fe_{0.7}$, $Ti_{0.91}Zr_{0.05}Y_{0.04}V_{0.1}Cr_{0.2}Fe_{0.6}Mn_{0.1}$, $Ti_{0.95}Y_{0.05}V_{0.26}Fe_{0.7}Cu_{0.05}$, $Ti_{0.95}Y_{0.05}V_{0.05}Fe_{0.7}Mn_{0.21}Cu_{0.05}$, $Ti_{1.02}Y_{0.03}V_{0.05}Fe_{0.9}Ni_{0.1}$, $Ti_{1.02}Y_{0.03}V_{0.05}Fe_{0.8}Mn_{0.1}Ni_{0.1}$, $La_{0.5}Ce_{0.32}Nd_{0.15}Pr_{0.02}Y_{0.01}Ni_{4.4}Fe_{0.55}Al_{0.05}$, $La_{0.5}Ce_{0.32}Nd_{0.15}Pr_{0.02}Y_{0.01}Ni_{4.4}Fe_{0.6}$, $La_{0.8}Ce_{0.15}Y_{0.05}Ni_4Mn_{0.5}Al_{0.5}$, $La_{0.8}Ce_{0.15}Y_{0.05}Ni_{4.5}Mn_{0.5}$, $La_{0.45}Ce_{0.4}Nd_{0.1}Pr_{0.03}Y_{0.02}Ni_4Co_{0.8}Al_{0.2}$, $La_{0.45}Ce_{0.4}Nd_{0.1}Pr_{0.03}Y_{0.02}Ni_{4.2}Co_{0.8}$, $La_{0.75}Ce_{0.15}Nd_{0.05}Pr_{0.02}Y_{0.03}Ni_{4.7}Al_{0.1}Fe_{0.2}$, $La_{0.75}Ce_{0.15}Nd_{0.05}Pr_{0.02}Y_{0.03}Ni_{4.8}Fe_{0.2}$, $La_{0.8}Ce_{0.15}Nd_{0.03}Y_{0.02}Ni_{4.5}Co_{0.3}Mn_{0.1}Al_{0.1}$, $La_{0.8}Ce_{0.15}Nd_{0.03}Y_{0.02}Ni_{4.5}Co_{0.4}Mn_{0.1}$, $La_{0.97}Y_{0.03}Ni_4Co_1$.

19. The hydrogen-storage alloy, process, system or apparatus according to any of aforementioned technical solutions, wherein the hydrogen-storage alloy is selected from:

$(Ti_{0.8}Y_{0.2})_{0.95}(Mn_{0.95}Ni_{0.05})_{0.05}$, $(Ti_{0.4}V_{0.4}Y_{0.2})_{0.9}(Fe_{0.05}Mn_{0.9}Ni_{0.05})_{0.1}$, $(Ti_{0.7}Nb_{0.1}Y_{0.2})_{0.9}(Mn_{0.7}Ni_{0.3})_{0.1}$, $(Ti_{0.4}Zr_{0.4}Y_{0.2})_{0.93}(Fe_{0.2}Mn_{0.7}Ni_{0.1})_{0.07}$, $(Ti_{0.4}V_{0.35}Zr_{0.2}Y_{0.05})_{0.95}(Fe_{0.6}Mn_{0.2}Co_{0.1}Ni_{0.1})_{0.05}$, $(Ti_{0.88}Y_{0.1}Ca_{0.02})_{0.95}(Fe_{0.3}Mn_{0.6}Ni_{0.1})_{0.05}$, $Mg_{0.01}Ti_{0.93}Zr_{0.15}Y_{0.01}VMn_{0.9}Ni_{0.1}$, $Ti_{0.85}Zr_{0.18}Y_{0.05}La_{0.02}V_{0.23}Cr_{0.05}Mn_{1.5}Fe_{0.09}Ni_{0.1}Cu_{0.1}$, $Mg_{0.1}Ti_{0.7}Zr_{0.2}Y_{0.05}V_{0.1}Mn_{1.6}Ni_{0.2}Cu_{0.2}$, $Ca_{0.01}Ti_{0.85}Zr_{0.05}Y_{0.05}V_{1.2}Mn_{0.6}Ni_{0.1}Cu_{0.2}$, $Mg_{0.1}Ti_{0.8}Zr_{0.15}Y_{0.05}V_{0.1}Cr_{1.4}Mn_{0.2}Co_{0.1}Ni_{0.1}Cu_{0.2}$, $Ti_{0.8}Zr_{0.25}Y_{0.05}V_{1.79}Mn_{0.1}Fe_{0.01}Ni_{0.1}Cu_{0.1}$, $Mg_{1.8}Y_{0.1}Cr_{0.05}Ni_1$, $Mg_{1.5}Ti_{0.8}Y_{0.05}Cr_{0.1}Ni_1$, $Mg_2Y_{0.1}Cr_{0.05}Ni_{0.6}Cu_{0.4}$, $Mg_{1.92}Y_{0.05}Cr_{0.2}Ni_{0.75}Fe_{0.05}$, $Mg_{1.9}Y_{0.1}Cr_{0.1}Fe_{0.1}Ni_{0.7}Cu_{0.1}$, $Mg_{1.9}Y_{0.1}Cr_{0.1}Ni_{0.8}Co_{0.2}$, $Mg_{1.8}Y_{0.1}La_{0.1}Cr_{0.05}Ni_{0.9}Co_{0.1}$, $Mg_{1.7}Ti_{0.2}Y_{0.1}Cr_{0.05}Ni_{0.7}Co_{0.3}$, $TiY_{0.01}V_{0.1}Fe_{0.7}Mn_{0.1}Ni_{0.1}$, $TiY_{0.02}V_{0.2}Fe_{0.7}Mn_{0.1}$, $Ti_{0.97}Y_{0.03}V_{0.05}Cr_{0.03}Fe_{0.5}Mn_{0.4}$, $Ti_{0.9}Y_{0.04}V_{0.05}Fe_{0.9}Mn_{0.1}$, $Ti_{0.91}Zr_{0.05}Y_{0.04}V_{0.1}Cr_{0.2}Fe_{0.6}Mn_{0.1}$, $Ti_{0.95}Y_{0.05}V_{0.05}Fe_{0.7}Mn_{0.21}Cu_{0.05}$, $Ti_{1.02}Y_{0.03}V_{0.05}Fe_{0.8}Mn_{0.1}Ni_{0.1}$, $La_{0.5}Ce_{0.32}Nd_{0.15}Pr_{0.02}Y_{0.01}Ni_{4.4}Fe_{0.55}Al_{0.05}$, $La_{0.8}Ce_{0.15}Y_{0.05}Ni_4Mn_{0.5}Al_{0.5}$, $La_{0.45}Ce_{0.4}Nd_{0.1}Pr_{0.03}Y_{0.02}Ni_4Co_{0.8}Al_{0.2}$, $La_{0.75}Ce_{0.05}Nd_{0.05}Pr_{0.02}Y_{0.03}Ni_{4.7}Al_{0.1}Fe_{0.2}$, $La_{0.8}Ce_{0.15}Nd_{0.03}Y_{0.02}Ni_{4.5}Co_{0.3}Mn_{0.1}Al_{0.1}$.

20. The hydrogen-storage alloy, process, system, or apparatus according to any of aforementioned technical solutions, wherein the hydrogen-storage alloy is prepared by the following process, wherein the process comprises the following steps:

(1) weighing each of the raw materials of the hydrogen-storage alloy in a way to reach the composition of the hydrogen-storage alloy and mixing the raw materials;

(2) melting the mixture obtained in step (1) and then annealing;

wherein the melting is electric furnace melting or induction melting;

Preferably, the melting condition comprises; it is performed under vacuum or inert atmosphere, the temperature is 1200-3000° C., preferably 1800-2200° C.;

More preferably, it is performed under vacuum, and the melting pressure is $1*10^{-5}$ to $1*10^{-3}$ Pa (absolute pressure), preferably $0.5*10^{-4}$ to $5*10^{-4}$ Pa (absolute pressure);

More preferably, it is performed under inert atmosphere, and the melting pressure is 0.5-1 bar (for example, 0.6-1 bar, 0.7-1 bar) (gauge pressure), Wherein the annealing condition comprises: it is performed under vacuum or inert atmosphere (e.g., argon atmosphere), the temperature is 500-900° C. (for example 700-1000° C.), the time is 12-360 hours;

Optionally, the process further comprises cooling the material obtained by annealing in step (2) and then performing a crushing treatment to obtain a product of 10-400 mesh (for example, 20-400 mesh), Optionally, the process further comprises subjecting the material obtained by annealing in step (2) to activation treatment; preferably, the condition of the activation treatment comprises: it is performed under vacuum, the temperature is 50-300° C., and the time is 1-10 hours.

21. A support composition for dehydrogenation catalyst of an organic substance, wherein the support composition comprises alumina and a modified metal oxide, and the modified metal oxide is titanium oxide and/or zirconium oxide, wherein, $\eta \leq 0.3$, preferably, $\eta=0$; $\theta \geq 5$, preferably, $\theta$ is 5-40 (for example, 5.4-34.3);

$\eta$=the content by weight percent of the crystal phase of the modified metal oxide in the support composition/the content by weight percent of the chemical composition of the modified metal oxide in the support composition, $\theta$=the content by weight percent of the modified metal oxide on the surface of the support composition/the content by weight percent of the chemical composition of the modified metal oxide in the support composition, titanium oxide is calculated as $TiO_2$, zirconium oxide is calculated as $ZrO_2$.

22. The support composition for a dehydrogenation catalyst of an organic substance according to any of aforementioned technical solutions, wherein the mass fraction of alumina in the support composition is 80-98.5% (for example 83-97.5%, 85-95% or 90-95%), the mass fraction of the modified metal oxide is 1.5-20% (for example 2.5-17%, 5-15%, or 5-10%).

23. The support composition for a dehydrogenation catalyst of an organic substance according to any of aforementioned technical solutions, wherein the modified metal oxide comprises titanium oxide; in the support composition, the mass fraction of titanium oxide is 2-20% (for example, 2.5-17%, 5-15% or 5-10%), the mass fraction of zirconium dioxide is 0-8% (for example, 0-6%, 0-3% or 1-6%); preferably, the modified metal oxide (for example, titanium oxide) in a monolayer is dispersed on the alumina substrate.

24. The support composition for a dehydrogenation catalyst of an organic substance according to any of aforementioned technical solutions, wherein relative to the pure phase of $TiO_2$, in the XPS spectrum of the support composition, a peak at the Ti $2P_{3/2}$ orbital electron binding energy of 458.8 eV is shifted by 0.6-0.7 eV to a higher binding energy and/or a peak at the Ti $2P_{1/2}$ orbital electron binding energy of 464.5 eV is shifted by 0.8-0.9 eV to a higher binding energy.

25. The support composition for a dehydrogenation catalyst of an organic substance according to any of aforementioned technical solutions, wherein the support composition has the phase structure of at least one of γ-alumina, η-alumina, ρ-alumina or χ-alumina.

26. The support composition for a dehydrogenation catalyst of an organic substance according to any of aforementioned technical solutions, wherein the support composition has a specific surface area of 100-350 m²/g, the support composition has a pore volume of 0.3-1.3 mL/g.

27. A process for preparing a support composition for a dehydrogenation catalyst of an organic substance according to any of aforementioned technical solutions, comprising the following steps:

(1) contacting an alumina substrate with a gas flow of a modified metal oxide precursor carried by a gas to obtain an alumina substrate loaded with the modified metal oxide precursor, and the modified metal oxide precursor is titanium oxide precursor and/or zirconium oxide precursor;

(2) Hydrolyzing and calcining the alumina substrate loaded with the modified metal oxide precursor to obtain a support composition.

28. The process for preparing the support composition according to any of aforementioned technical solutions, wherein the titanium oxide precursor is selected from titanium tetrachloride, (tetra)ethyl titanate, (tetra)butyl titanate, (tetra)isopropyl titanate, titanium acetate, and a mixture thereof (preferably titanium tetrachloride); the zirconium oxide precursor is selected from zirconium tetrachloride, zirconium ethoxide, zirconium methoxide, zirconium isopropoxide, tetrabutyl zirconate, and a mixture thereof (preferably zirconium tetrachloride and/or zirconium methoxide).

29. The process for preparing the support composition according to any of aforementioned technical solutions, wherein the alumina substrate is selected from γ-alumina, η-alumina, ρ-alumina, χ-alumina, hydrated alumina, and a mixture thereof.

30. The process for preparing the support composition according to any of aforementioned technical solutions, wherein the alumina substrate has a specific surface area of 100-350 m²/g; preferably, the ratio of the specific surface area of the support composition to the specific surface area of the alumina substrate is not lower than 90%.

31. The process for preparing the support composition according to any of aforementioned technical solutions, wherein the alumina substrate has a pore volume of 0.3-1.3 mL/g.

32. The process for preparing the support composition according to any of aforementioned technical solutions, wherein the gas is an anhydrous inactive gas (for example, nitrogen gas, helium gas, neon gas, argon gas), the content of water in the anhydrous inactive gas is not more than 10 ppm; preferably, the content of the modified metal oxide precursor in the gas flow of a modified metal oxide precursor carried by a gas is 0.1-3 g/L (for example, 0.2-2 g/L), wherein the content of the modified metal oxide precursor is calculated as metal oxide.

33. The process for preparing the support composition according to any of aforementioned technical solutions, wherein in step (1), the temperature of the gas is room temperature to 350° C. (for example, room temperature (room temperature refers to 15-40° C.) to 300° C., or 15 to 300° C.).

34. The process for preparing the support composition according to any of aforementioned technical solutions, wherein the pressure for contacting in step (1) is 0.05-5 atm (for example, 1-3 atm) (gauge pressure).

35. The process for preparing the support composition according to any of aforementioned technical solutions, wherein the ratio of the volumetric flow rate of the gas per minute to the volume of alumina substrate is 3-80:1 (e.g., 5-30:1, 10-25:1); wherein the volume of the gas is calculated as the volume under normal conditions, the volume of the alumina substrate is calculated as the bulk volume.

36. The process for preparing the support composition according to any of aforementioned technical solutions, wherein when the alumina substrate is contacted with the gas flow of a modified metal oxide precursor carried by a gas, the alumina substrate is in fluidized state or under stirring; wherein being in fluidized state may be, for example, in a bubbling bed, a turbulent bed, a fast bed or a conveying bed.

37. The process for preparing the support composition according to any of aforementioned technical solutions, wherein in step (2), hydrolyzing the alumina substrate loaded with the modified metal oxide precursor is performed as follows: the alumina substrate loaded with the modified metal oxide precursor is contacted with a gas containing water vapor.

38. The process for preparing the support composition according to any of aforementioned technical solutions, wherein for the hydrolysis in step (2), the ratio of the gas containing water vapor to the alumina substrate contacted therewith (the ratio of the volume of the gas containing water vapor and the bulk volume of the alumina substrate under normal conditions) is 3-80:1 (for example, 5-30:1, or 10-25:1), the proportion of the water vapor in the gas containing water vapor relative to the total gas volume is 0.1 vol %-100 vol % (for example, 3 vol %-100 vol %); other gas(es) except water vapour in the gas containing water vapor can be inert gas, nitrogen gas or air.

39. The process for preparing the support composition according to any of aforementioned technical solutions, wherein for the hydrolysis in step (2), the hydrolysis time is 1 hour to 50 hours, for example 2 hours to 30 hours.

40. The process for preparing the support composition according to any of aforementioned technical solutions, wherein for the calcining, the calcining temperature is 350° C.-700° C., the calcining time is 0.5-12 hours (the calcining atmosphere can be an atmosphere not containing the oxygen gas or containing the oxygen gas, in an embodiment, the content of the oxygen gas in the atmosphere containing the oxygen gas can be 3-100 vol %, for example it is an atmosphere of air or an atmosphere of oxygen gas).

41. A catalyst for producing hydrogen by dehydrogenation of organic substance or the hydrogen-storage alloy, process, system or apparatus according to any of aforementioned technical solutions, wherein the catalyst contains the support composition for a dehydrogenation catalyst of an organic substance according to any of aforementioned technical solutions and an active component.

42. The catalyst for producing hydrogen by dehydrogenation of organic substance according to any of aforementioned technical solutions or the hydrogen-storage alloy, process, system or apparatus according to any of aforementioned technical solutions, wherein the active component is one of the following (1), (2) and (3):

(1) At least one element in the noble metal group, preferably, the active component is Pt and optionally at least one element other than Pt in the noble metal group;

(2) Pt and at least one element in the first metal group;

(3) Ni, at least one element in the second metal group, and optionally phosphorus;

wherein

The noble metal group is a group consisting of elements selected from Pt, Pd, Ru, Re, Rh, Ir, and Os;

The first metal group is a group consisting of elements selected from Sn, V, Mo, Cr, Mn, Fe, Co, Ni, Cu, Ag, Ce, W, Cu, and Ca;

The second metal group is a group consisting of elements selected from Zn, Sn, Cu, Fe, Ag, In, Re, Mo, Co, Ca, and W;

In the catalyst, the content of the support is 70-99.9 wt %; the content of active component is 0.1-30 wt %.

43. The catalyst for producing hydrogen by dehydrogenation of organic substance according to any of aforementioned technical solutions or the hydrogen-storage alloy, process, system or apparatus according to any of aforementioned technical solutions, wherein the active component is (1) at least one element in the noble metal group, in the catalyst, the content of the support is 90-99.9 wt % (for example, 92-99.4 wt %, 92-99.5 wt %, 95-99.4 wt %, 98-99.2 wt %/o, 98.5-99.5 wt %), the content of active component is 0.1-10 wt % (for example, 0.6-8 wt %, 0.5-8 wt %, 0.6-5 wt %, 0.8-2 wt % or 0.5-1.5 wt %);

Preferably, the active component is Pt and optionally at least one element other than Pt in the noble metal group, wherein the content of Pt is 0.1-10 wt % (for example, 0.1-2 wt %, 0.6-10 wt % or 0.6-0.8 wt %), the content of at least one element other than Pt in the noble metal group is 0-9.9 wt % (for example, 0.1-2 wt % or 0.1-0.8 wt %).

44. The catalyst for producing hydrogen by dehydrogenation of organic substance according to any of aforementioned technical solutions or the hydrogen-storage alloy, process, system or apparatus according to any of aforementioned technical solutions, wherein the active component is (2) Pt and at least one element in the first metal group;

In the catalyst, the content of the support is 75-99.5 wt % (for example, 75-99.4 wt %, 79.9-98.5 wt %), the content of active component is 0.5-25 wt % (for example, 0.6-25 wt %, 1.5-20.1 wt %);

In the active component, the content of Pt (calculated as simple substance) is 0.01-10 wt % (for example, 0.2-8 wt %, 0.4-2 wt %, 0.3-0.6 wt %, 0.1-0.7 wt %); the content of at least one element (calculated as oxide) in the first metal group is 0.5-20 wt % (for example, 0.5-15 wt % or 1-10 wt %); preferably, at least one element in the first metal group is Ni or is a combination of Ni and at least one element other than Ni selected from those in the first metal group, wherein the mass ratio of Pt (calculated as simple substance) to Ni (as NiO) is (0.01:16) to (0.5:0.1).

45. The catalyst for producing hydrogen by dehydrogenation of organic substance according to any of aforementioned technical solutions or the hydrogen-storage alloy, process, system or apparatus according to any of aforementioned technical solutions, wherein the active component is (3) Ni, at least one element in the second metal group, and optionally phosphorus;

In the catalyst, the content of the support is 70-95 wt % (for example, 75-93 wt %, or 75-90 wt %), the content of active component calculated as oxide is 5-30 wt % (for example, 7-25 wt %);

In the active component, the content of nickel as NiO is 0.5-25 wt % (for example, 5-25 wt %, 6-20 wt %, or 6-11 wt %); the content of at least one element calculated as oxide in the second metal group is 0-15 wt % (for example, 0-10 wt %); the content of phosphorus as P2O5 is 0-15 wt %.

46. A process for preparing a catalyst, which comprises the following steps: steps (1) and (2) in the process for preparing the support composition according to any of aforementioned technical solutions:

(1) contacting an alumina substrate with a gas flow of a modified metal oxide precursor carried by a gas to obtain an alumina substrate loaded with the modified metal oxide precursor, and the modified metal oxide precursor is titanium oxide precursor and/or zirconium oxide precursor;

(2) Hydrolyzing and calcining the alumina substrate loaded with the modified metal oxide precursor to obtain a support composition; Wherein the process for preparing the catalyst further comprises the following steps:

(3) Impregnating the support composition with the active component precursor solution to obtain a support impregnated with the active component precursor;

(4) Drying and calcining the support impregnated with the active component precursor; Preferably, the active component is one of the following (1), (2) and (3):

(1) At least one element in the noble metal group, preferably, the active component is Pt and optionally at least one element other than Pt in the noble metal group;

(2) Pt and at least one element in the first metal group;

(3) Ni, at least one element in the second metal group, and optionally phosphorus;

Wherein

The noble metal group is a group consisting of elements selected from Pt, Pd, Ru, Re, Rh, Ir, and Os;

The first metal group is a group consisting of elements selected from Sn, V, Mo, Cr, Mn, Fe, Co, Ni, Cu, Ag, Ce, W, Cu, and Ca;

The second metal group is a group consisting of elements selected from Zn, Sn, Cu, Fe, Ag, In, Re, Mo, Co, Ca, and W.

47. The process for preparing the catalyst according to any of aforementioned technical solutions, wherein for the calcining in step (4), the calcining temperature is 400-700° C., the calcining time is 0.5-12 hours.

48. The process for preparing the catalyst according to any of aforementioned technical solutions, wherein The active component precursor is a soluble salt of the active component (for example, one or more of metal nitrate, metal acetate, metal chloride, metal carbonate, metal acetate complex, metal hydroxide, metal oxalate complex, high-valent metal acid, high-valent metal acid salt, metal complex, and ammonium salt).

49. The process for preparing the catalyst according to any of aforementioned technical solutions, wherein The support impregnated with the active component precursor is placed in an environment below −40° C. for 1 hour to 24 hours; and then it is vacuum-dried to remove the water adsorbed on the support, and then calcined to obtain the catalyst.

DETAILED DESCRIPTION OF THE INVENTION

Figure 1:
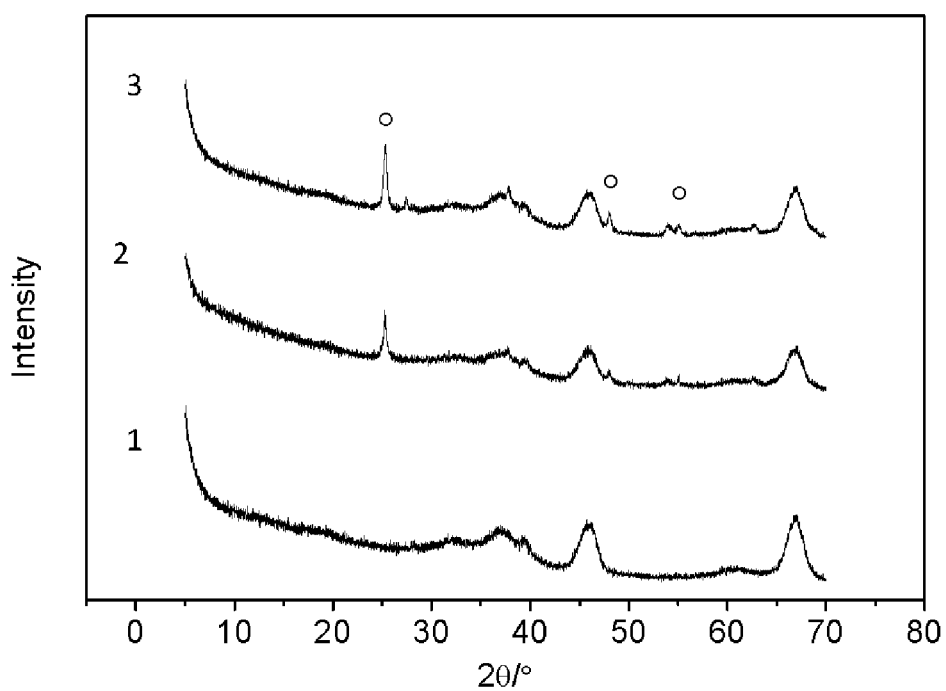
FIG. 1 is an X-ray diffraction (XRD) spectrum of a support composition containing alumina and titanium oxide, wherein "1" is an XRD spectrum of the support composition (alumina loaded with titanium oxide) provided by the present invention; "2" is the XRD spectrum of the support composition of alumina loaded with Ti oxide prepared by the impregnation process; "3" is the XRD spectrum of the mechanical mixture of alumina and titanium dioxide. In the XRD curve, the diffraction peaks of $TiO_2$ (anatase) appear at $2\theta=25.37°, 48.12°, 53.97°, 55.1°$.
Figure 2:
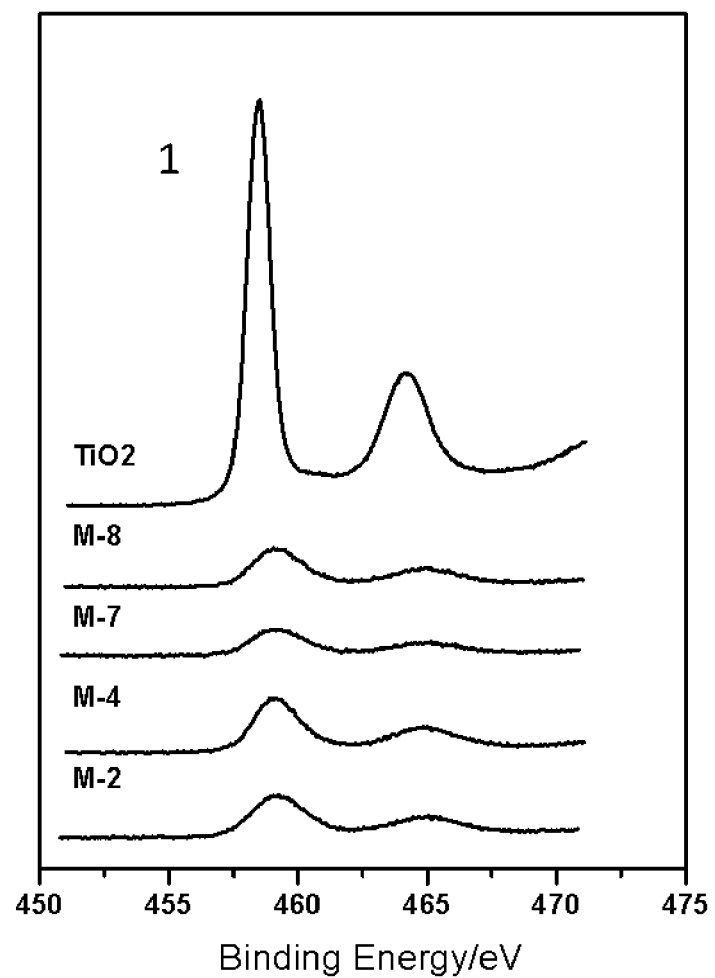
FIG. 2 is an X-ray photoelectron spectroscopy (XPS) spectrum, where 1 is the XPS spectrum of pure $TiO_2$; the other curves are the XPS spectra of the support compositions with different $TiO_2$ contents (alumina loaded with titanium oxide) prepared by the process of the present invention, in which M-2, M-4, M-7 and M-8 are the supports of Examples 2, 4, 7 and 8 respectively. As can be seen from FIG. 2, for the support composition provided by the present invention, a peak at the Ti $2P_{3/2}$ orbital electron binding energy (binding energy) of 458.8 eV is shifted by 0.6-0.7 eV to a higher binding energy, and a peak at the Ti $2P_{1/2}$ orbital electron binding energy of 464.5 eV is shifted by 0.8-0.9 eV to a higher binding energy, indicating that there is an interaction between Ti and the alumina support.

The pressure in the present invention refers to gauge pressure, unless otherwise specified. In an aspect of the present invention, the present invention provides a support composition for a dehydrogenation catalyst of an organic substance, wherein the support composition comprises alumina and a modified metal oxide, and the modified metal oxide is titanium oxide and/or zirconium oxide, wherein, $\eta<0.3$, preferably, $\eta=0$; $\theta \geq 5$, preferably, $\theta$ is 5-40 (for example, 5.4-34.3);

$\eta$=the content by weight percent of the crystal phase of the modified metal oxide in the support composition/the content by weight percent of the chemical composition of the modified metal oxide in the support composition, $\theta$=the content by weight percent of the modified metal oxide on the surface of the support composition/the content by weight percent of the chemical composition of the modified metal oxide in the support composition, titanium oxide is calculated as $TiO_2$, zirconium oxide is calculated as $ZrO_2$.

Preferably, the alumina and the modified metal oxide partly or completely form a support composition. In an embodiment, the modified metal oxide is loaded on the surface of the support.

According to the support composition of the present invention, the mass fraction of alumina in the support composition is 80-98.5% (for example, 83-97.5%, 85-95% or 90-95%), the mass fraction of the modified metal oxide is 1.5-20% (for example, 2.5-17%, 5-15%, or 5-10%).

According to the support composition of the present invention, the modified metal oxide comprises titanium oxide; in the support composition, the mass fraction of titanium oxide is 2-20% (for example, 2.5-17%, 5-15% or 5-10%), the mass fraction of zirconium dioxide is 0-8% (for example, 0-6%, 0-3% or 1-6%); preferably, the modified metal oxide (for example, titanium oxide) in a monolayer is dispersed on the alumina substrate.

According to an embodiment of the present invention, if measured by XPS, the content of the modified metal oxide in the 0-5 nm thick surface layer of the support surface is higher than 90 atomic number %, preferably higher than 95 atomic number %, it is called that the modified metal oxide in a monolayer is dispersed on the alumina substrate.

According to the support composition of the present invention, relative to the pure phase of $TiO_2$, in the XPS spectrum of the support composition, a peak at the Ti $2P_{3/2}$ orbital electron binding energy of 458.8 eV is shifted by 0.6-0.7 eV to a higher binding energy and/or a peak at the Ti $2P_{1/2}$ orbital electron binding energy of 464.5 eV is shifted by 0.8-0.9 eV to a higher binding energy.

According to the support composition of the present invention, the support composition has the phase structure of at least one of γ-alumina, η-alumina, ρ-alumina or χ-alumina.

According to the support composition of the present invention, the support composition has a specific surface area of 100-350 $m^2/g$ (for example, 110-340 $m^2/g$ or 130-250 $m^2/g$ or 140-200 $m^2/g$), the support composition has a pore volume of 0.3-1.3 mL/g (for example, 0.32-1.0 mL/g or 0.35-0.6 mL/g or 0.35-0.8 mL/g). The ratio of the specific surface area of the support composition to the specific surface area of the alumina substrate is not less than 90%, that is, the specific surface area of the support composition, compared with that of pure alumina (alumina without modification by introducing the modifying element), is reduced by a proportion of ≤10%.

The support composition provided by the present invention can be used to prepare a catalyst for the dehydrogenation of organic substance to produce hydrogen gas, and can also be used in a catalyst for the oxidative dehydrogenation of alkane organic substances to prepare olefins or oxygen-containing organic substances. Generally, the catalyst includes the support composition provided by the present invention and the active metal component loaded on the support composition, and the active metal component is an oxide of the active metal and/or a simple substance of the active metal. The active metal is one or more of VIIIB group metal, VIIB group metal, VB group metal, VIB group metal, IB group metal, rare earth element, alkaline earth metal, IVA group metal. The catalyst of the present invention can have higher dehydrogenation activity and/or higher selectivity than catalysts prepared by using the known support and the same active metal.

The support composition provided by the present invention has a relatively low η value and a relatively high θ value. It can be used as a dehydrogenation catalyst support, especially used in a catalyst for the dehydrogenation of a cycloalkane ring-containing organic liquid hydrogen-storage compound to prepare hydrogen gas, and can improve the dehydrogenation activity and/or selectivity of the catalyst.

The preparation process of the support composition provided by the present invention can produce the support composition provided by the present invention. The produced support composition has a relatively low η value and a relatively high θ value, and the preparation process is easy to implement.

The dehydrogenation catalyst prepared with the support composition provided by the present invention for producing hydrogen gas by dehydrogenating organic liquid hydrogen-storage compounds has higher activity and higher hydrogen selectivity. The prepared oxidative dehydrogenation catalyst has higher activity and higher oxidation selectivity.

The support provided by the present invention can be used to prepare a catalyst for producing hydrogen gas by dehydrogenation of organic hydrogen-storage compounds, and can also be used as a support for other hydrogen-related reaction catalysts or oxidation catalysts, for example, for organic substance oxidative dehydrogenation catalysts, unsaturated hydrocarbon hydrogenation catalysts, organic substance complete oxidation catalyst or NO oxidation catalyst.

In one aspect of the present invention, the present invention provides a process for preparing a support composition, comprising the following steps: (1) contacting an alumina substrate with a gas flow of a modified metal oxide precursor carried by a gas to obtain an alumina substrate loaded with the modified metal oxide precursor, and the modified metal oxide precursor is titanium oxide precursor and/or zirconium oxide precursor; (2) Hydrolyzing and calcining the alumina substrate loaded with the modified metal oxide precursor to obtain a support composition.

According to the preparation process of the support composition of the present invention, the modified metal oxide precursor is preferably a substance that can be vaporized to form a gaseous metal oxide precursor at room temperature to 350° C. The titanium oxide precursor is selected from titanium tetrachloride, (tetra)ethyl titanate, (tetra)butyl titanate, (tetra)isopropyl titanate, titanium acetate, and a mixture thereof (preferably titanium tetrachloride); the zirconium oxide precursor is selected from zirconium tetrachloride, zirconium ethoxide, zirconium methoxide, zirconium isopropoxide, tetrabutyl zirconate, and a mixture thereof (preferably zirconium tetrachloride and/or zirconium methoxide).

According to the preparation process for the support composition of the present invention, the alumina substrate is selected from γ-alumina, η-alumina, ρ-alumina, χ-alumina, hydrated alumina (for example, boehmite, diaspore, pseudo-boehmite, gibbsite, bayerite, nordstrandite, amorphous aluminium hydroxide), and a mixture thereof, preferably, the average particle size (diameter) of the alumina substrate) is 5-100 μm, for example 5-50 μm.

According to the preparation process for the support composition of the present invention, the alumina substrate has a specific surface area of not less than 100 $m^2/g$ (for example, more than 100 and not more than 380 $m^2/g$, 100-350 $m^2/g$, 125-335 $m^2/g$); Preferably, the ratio of the specific surface area of the support composition to the specific surface area of the alumina substrate is not less than 90%, that is, the specific surface area of the obtained support composition, compared with that of the alumina substrate, is reduced by a proportion of ≤10%.

According to the process for preparing the support composition of the present invention, the alumina substrate has a pore volume of not lower than 0.3 mL/g (for example, more than 0.3 and not more than 1.45 mL/g, 0.3-1.3 mL/g, 0.35-1.2 mL/g, 0.35-1.0 or 0.4-0.8 mL/g).

According to the process for preparing the support composition of the present invention, the gas is an anhydrous inactive gas (for example, nitrogen gas, helium gas, neon gas, argon gas), the content of water in the anhydrous inactive gas is not more than 10 ppm; preferably, the content of the modified metal oxide precursor in the gas flow of a modified metal oxide precursor carried by a gas is 0.1-3 g/L (for example, 0.2-2 g/L), wherein the content of the modified metal oxide precursor is calculated as metal oxide.

According to the process for preparing the support composition of the present invention, in step (1), the temperature of the gas is room temperature to 350° C. (for example, room Temperature (room temperature refers to 15-40° C.) to 300° C., or 15 to 300° C.), the temperature for contacting is 15-350° C. (for example, 15-300° C. or 15-100° C. or 15-200° C. or 18-60° C. or 15-40° C.).

According to the process for preparing the support composition of the present invention, the pressure for contacting in step (1) is 0.05-5 atm (for example, 1-3 atm) (gauge pressure).

According to the process for preparing the support composition of the present invention, the ratio of the volumetric flow rate of the gas per minute to the volume of alumina substrate is 3-80:1 (e.g., 5-30:1, 10-25:1); wherein the volume of the gas is calculated as the volume under normal conditions, the volume of the alumina substrate is calculated as the bulk volume.

According to the process for preparing the support composition of the present invention, when the alumina substrate is contacted with the gas flow of a modified metal oxide precursor carried by a gas, the alumina substrate is in fluidized state or under stirring; wherein being in fluidized state may be, for example, in a bubbling bed, a turbulent bed, a fast bed or a conveying bed.

In an embodiment, the alumina substrate is contacted with a gas flow of a modified metal oxide precursor carried by a gas (also known as gas flow), the alumina substrate is contacted in a fixed bed with the gas flow, or is contacted in the fluidized state with the gas flow of a modified metal oxide precursor carried by a gas, or can be contacted under stirring with the gas flow. The contacting in fluidized state may be for example the contacting in a bubbling bed, a turbulent bed, a fast bed or a conveying bed. The ratio of the volumetric flow rate of the gas per minute to the volume of the alumina substrate is 3-80:1, for example 5-30:1, or 10-25:1, wherein the volume of the gas is calculated as the volume under normal conditions, and the volume of the alumina substrate is calculated as the bulk volume. In another embodiment, the gas flow is contacted with the alumina substrate in a fluidized bed, and the volumetric space velocity for the contacting is 3-80:1 $min^{-1}$, for example 5-30:1 $min^{-1}$ or 10-25:1 $min^{-1}$, wherein the volumetric flow rate of the gas flow is based on the volume of the gas under normal conditions, the alumina substrate is calculated as the bulk volume, and the fluidized bed can be a bulk fluidized bed, a bubbling bed or a turbulent bed.

According to the process for preparing the support composition of the present invention, in step (2), hydrolyzing the alumina substrate loaded with the modified metal oxide precursor is performed as follows: the alumina substrate loaded with the modified metal oxide precursor is contacted with a gas containing water vapor.

According to the process for preparing the support composition of the present invention, for the hydrolysis in step (2), the ratio of the gas containing water vapor to the alumina substrate contacted therewith (the ratio of the volume of the gas containing water vapor and the bulk volume of the alumina substrate under normal conditions) is 3-80:1 (for example, 5-30:1, or 10-25:1), the proportion of the water vapor in the gas containing water vapor relative to the total gas volume is 0.1 vol %-100 vol % (for example, 3 vol %-100 vol %, 10 vol %-70 vol %); other gas(es) except water vapour in the gas containing water vapor can be inert gas, nitrogen gas or air.

According to the process for preparing the support composition of the present invention, for the hydrolysis in step (2), the hydrolysis time is 1 hour to 50 hours, for example 2 hours to 30 hours (usually, the hydrolysis time is greater than or equal to the loading time, the loading time refers to the time for contacting alumina substrate with the gas flow of a modified metal oxide precursor carried by a gas).

According to the process for preparing the support composition of the present invention, the calcining atmosphere can be an atmosphere not containing the oxygen gas or containing the oxygen gas. In an embodiment, the content of the oxygen gas in the atmosphere containing the oxygen gas can be 3-100 vol %, for example it is an atmosphere of air or an atmosphere of oxygen gas. The calcining temperature is 350° C.-700° C. (e.g., 400-700° C.), the calcining time is 0.5-12 hours (for example, 1-10 hours, or 2-9 hours, or 4-8 hours).

In an aspect of the present invention, the present invention provides a catalyst for producing hydrogen by dehydrogenation of organic substance, wherein the catalyst contains the support composition for a dehydrogenation catalyst of an organic substance according to the present invention and an active component.

In the catalyst provided by the present invention, the active components may exist in the form of oxides and/or active metal simple substances.

According to the catalyst for producing hydrogen by dehydrogenation of organic substance of the present invention, the active component is one of the following (1), (2) and (3): (1) At least one element in the noble metal group, preferably, the active component is Pt and optionally at least one element other than Pt in the noble metal group; (2) Pt and at least one element in the first metal group; (3) Ni, at least one element in the second metal group, and optionally phosphorus; wherein The noble metal group is a group consisting of elements selected from Pt, Pd, Ru, Re, Rh, Ir, and Os; The first metal group is a group consisting of elements selected from Sn, V, Mo, Cr, Mn, Fe, Co, Ni, Cu, Ag, Ce, W, Cu, and Ca; The second metal group is a group consisting of elements selected from Zn, Sn, Cu, Fe, Ag, In, Re, Mo, Co, Ca, and W; In the catalyst, the content of the support is 70-99.9 wt %; the content of active component is 0.1-30 wt %.

According to the catalyst for producing hydrogen by dehydrogenation of organic substance of the present invention, the active component is (1) at least one element in the noble metal group, in the catalyst, the content of the support is 90-99.9 wt % (for example, 92-99.4 wt %, 92-99.5 wt %, 95-99.4 wt %, 98-99.2 wt %, 98.5-99.5 wt %); the content of active component is 0.1-10 wt % (for example, 0.6-8 wt %, 0.5-8 wt %, 0.6-5 wt %, 0.8-2 wt % or 0.5-1.5 wt %); preferably, the active component is Pt and optionally at least one element other than Pt in the noble metal group, wherein the content of Pt is 0.1-10 wt % (for example, 0.1-2 wt %, 0.6-10 wt % or 0.6-0.8 wt %), the content of at least one element other than Pt in the noble metal group is 0-9.9 wt % (for example, 0.1-2 wt % or 0.1-0.8 wt %).

According to the catalyst for producing hydrogen by dehydrogenation of organic substance of the present invention, the active component is (2) Pt and at least one element in the first metal group (for example, one or more of Sn, Ni, Mn, and Cu); In the catalyst, the content of the support is 75-99.5 wt % (for example, 75-99.4 wt %, 79.9-98.5 wt %), the content of active component is 0.5-25 wt % (for example, 0.6-25 wt %, 1.5-20.1 wt %/): in the active component, the content of Pt (calculated as simple substance) is 0.01-10 wt % (for example, 0.2-8 wt %, 0.4-2 wt %, 0.3-0.6 wt %, 0.1-0.7 wt %); the content of at least one element (calculated as oxide) in the first metal group is 0.5-20 wt % (for example, 0.5-15 wt % or 1-10 wt %); preferably, at least one element in the first metal group is Ni or a combination of Ni and at least one element other than Ni selected from those in the first metal group (for example, Sn, Mn, and Cu, preferably Cu), wherein the mass ratio of Pt (calculated as simple substance) to Ni (as NiO) is (0.01: 16) to (0.5.0.1). Preferably, in the catalyst the content of Pt is 0.1-0.5 wt %, the content of Ni as oxide is 0.5-15 wt %, for example 1-10 wt %, the content of the element other than Ni (as oxide) in the first metal group is 0-10 wt %, for example 1-6 wt %.

The active component is further more preferably Pt, Ni and Cu.

According to the catalyst for producing hydrogen by dehydrogenation of organic substance of the present invention, the active component is (3) Ni, at least one element in the second metal group (preferably, Sn, Cu, Zn, Fe, Ag, more preferably, Sn, Ag, Cu and Zn, further preferably Sn, Zn and Cu, still further preferably Sn and Zn), and optionally phosphorus. According to this preferred embodiment, it can have higher conversion rate and hydrogen generation rate, and can have higher hydrogen selectivity relative to other active metals. In the catalyst, the content of the support is 70-95 wt % (for example, 75-93 wt %, or 75-90 wt %), the content of active component calculated as oxide is 5-30 wt % (for example, 7-25 wt %, 10-25 wt %, 8-20 wt %, or 10-16 wt %); in the active component, the content of nickel as NiO is 0.5-25 wt % (for example, 0.5-20 wt %, 5-25 wt %, 6-20 wt %, 5-15 wt %, 8-10 wt %, or 6-11 wt %); the content of at least one element calculated as oxide in the second metal group is 0-15 wt % (for example, 0-10 wt %, 2-6 wt %6) the content of phosphorus as P2O5 is 0-15 wt % (for example, 0-8 wt %, 0-6 wt %).

According to the catalyst for producing hydrogen by dehydrogenation of organic substance of the present invention, the specific surface of the catalyst is 100-350 m$^2$/g (for example, 120-330 m$^2$/g), the pore volume of the catalyst is 0.3-1.3 ml/g (for example, 0.35-1.2 ml/g).

In an aspect of the present invention, the present invention provides a process for preparing the catalyst for producing hydrogen by dehydrogenation of organic substance of the present invention, which comprises the following steps: (1) contacting an alumina substrate with a gas flow of a modified metal oxide precursor carried by a gas to obtain an alumina substrate loaded with the modified metal oxide precursor, and the modified metal oxide precursor is titanium oxide precursor and/or zirconium oxide precursor; (2) Hydrolyzing and calcining the alumina substrate loaded with the modified metal oxide precursor to obtain a support composition; (3) Impregnating the support composition with the active component precursor solution to obtain a support impregnated with the active component precursor; (4) Drying and calcining the support impregnated with the active component precursor; Preferably, the active component is one of the following (1), (2) and (3): (1) At least one element in the noble metal group, preferably, the active component is Pt and optionally at least one element other than Pt in the noble metal group; (2) Pt and at least one element in the first metal group; (3) Ni, at least one element in the second metal group, and optionally phosphorus; wherein the noble metal group is a group consisting of elements selected from Pt, Pd, Ru, Re, Rh, Ir, and Os; the first metal group is a group consisting of elements selected from Sn, V, Mo, Cr, Mn, Fe, Co, Ni, Cu, Ag, Ce, W, Cu, and Ca; the second metal group is a group consisting of elements selected from Zn, Sn, Cu, Fe, Ag, In, Re, Mo, Co, Ca, and W.

According to the process for preparing the catalyst for producing hydrogen by dehydrogenation of organic substance of the present invention, for the calcining in step (4), the calcining temperature is 400-700° C., the calcining time is 0.5-12 hours.

In one embodiment, when the support composition is impregnated with the solution of the active component precursor, it usually includes dissolving the active metal component precursor in water and impregnating the support composition to obtain a support impregnated with the active metal component precursor. The impregnation process can be an existing impregnation process, for example, it can be an isometric impregnation process or an excessive impregnation process. The water is one or more of deionized water, distilled water or decationized water. It is also possible to dissolve the metal precursor in water to obtain a metal precursor solution; the metal precursor solution is introduced onto the support by co-impregnation or step-by-step impregnation. The impregnation can be saturation impregnation or supersaturation impregnation. When the catalyst contains two or more than two metal active elements, the co-impregnation means that two or more than two metal elements can be dissolved in deionized water together, and then the impregnation liquor is impregnated onto the support, and then the support is dried and calcined. The step-by-step impregnation includes dissolving two or more than two metal elements in deionized water; the metal impregnation liquor is impregnated on the support separately, and the support obtained after each impregnation needs to be dried and calcined, and there is no requirement on the order of introducing the metal. For example, the precursor of Pt and the precursor of one element in the first metal group can be formulated into a solution to impregnate the support composition, or the impregnation with the precursor of Pt can be firstly performed followed by drying and then the impregnation with the precursor of the element in the first metal group. For example, the liquid/solid volume ratio of the impregnation liquor to the support during impregnation is 0.3-5.0, preferably 0.6-4.0, and the impregnation temperature is 10-50° C., preferably 15-40° C. Preferably, the impregnated support is allowed to stand at room temperature for 2-10 hours, and the impregnated support is dried and then calcined. The calcining temperature is preferably 400-700 jãC, and the calcining time is preferably 0.5-12 hours, such as 1-10 hours or 2-9 hours or 4-8 hours. There is no special requirements to the calcining atmosphere. For example, the calcining can be performed in air. During the calcining, the volume ratio of air (normal conditions) to the catalyst is, for example, 400-1000:1, and the calcining time is preferably 4-8 hours.

According to the process for preparing the catalyst for producing hydrogen by dehydrogenation of organic substance of the present invention, the active component precursor is a soluble salt of the active component (for example, one or more of metal nitrate, metal acetate, metal chloride, metal carbonate, metal acetate complex, metal hydroxide, metal oxalate complex, high-valent metal acid, high-valent metal acid salt, metal complex, and ammonium salt). In one embodiment, the high-valent metal acid/high-valent metal acid salt is, for example, one or more of chloroplatinic acid, ammonium chloroplatinate, tetraammineplatinum nitrate, and tetraammineplatinum hydroxide. The precursor of phosphorus is, for example, one or more of ammonium phosphate, ammonium dihydrogen phosphate, diammonium hydrogen phosphate, phosphoric acid, and metal phosphate.

According to the process for preparing the catalyst for producing hydrogen by dehydrogenation of organic substance of the present invention, the support impregnated with the active component precursor is placed in an environment below-40 jãC for 1 hour to 24 hours; and then it is vacuum-dried to remove the water adsorbed on the support, and then calcined to obtain the catalyst.

In an aspect of the present invention, the present invention provides a hydrogen-storage alloy, wherein the hydrogen-storage alloy is one or more of rare earth-based $AB_5$ type, zirconium-titanium-based $AB_2$ type, titanium-based AB type, magnesium-based $A_2B$ type and vanadium-based solid solution type hydrogen-storage alloys, wherein The molecular formula of the rare earth-based $AB_5$ type hydrogen-storage alloy is:

$$M_m Ni_{x1} Co_{x2} Mn_{x3} Fe_{x4} Al_{x5} Sn_{x6},$$

$$4.5 \leq x1+x2+x3+x4+x5+x6 \leq 5.5,$$

wherein, $M_m$ is $La_{y1} Ce_{y2} Nd_{y3} Pr_{y4} Y_{y5}$, $$y1+y2+y3+y4+y5=1,$$

wherein, $0.4 \leq y1 \leq 0.99$ (e.g., $0.4 \leq y1 \leq 0.8$), $0 \leq y2 \leq 0.45$ (e.g., $0.1 \leq y2 \leq 0.45$), $0 \leq y3 \leq 0.2$ (e.g., $0 \leq y3 \leq 0.2$), $0 \leq y4 \leq 0.05$ (e.g., $0 \leq y4 \leq 0.05$), $0.01 \leq y5 \leq 0.1$ (e.g., $0.01 \leq y5 \leq 0.05$), $3 \leq x1 \leq 5.45$ (e.g., $3 \leq x1 \leq 4.9$), $0 \leq x2 \leq 1.5$ (e.g., $0.1 \leq x2 \leq 1$), $0 \leq x3 \leq 0.8$ (e.g., $0.1 \leq x3 \leq 0.6$), $0 \leq x4 \leq 0.8$ (e.g., $0.1 \leq x4 \leq 0.6$), $0 \leq x5 \leq 0.75$ (e.g., $0.05 \leq x5 \leq 0.5$), $0 \leq x6 \leq 0.2$; (e.g., $0 \leq x6 \leq 0.15$).

The molecular formula of the zirconium-titanium-based $AB_2$ type hydrogen-storage alloy is $AB_2$, wherein $$A=Mg_{x1}Ca_{x2}Ti_{x3}Zr_{x4}Y_{x5}La_{x6}\ x1+x2+x3+x4+x5+x6=0.9-1.1,$$

$$B=V_{y1}Cr_{y2}Mn_{y3}Fe_{y4}Co_{y5}Ni_{y6}Cu_{y7}\ y1+y2+y3+y4+y5+y6+y7=1.9-2.1,$$

$0 \leq x1 \leq 0.54$ (e.g., $0.01 \leq x1 \leq 0.3$, $0.01 \leq x1 \leq 0.1$), $0 \leq x2 \leq 0.54$ (e.g., $0 \leq x2 \leq 0.25$), $0.5 \leq x3 \leq 1.04$ (e.g., $0.6 \leq x3 \leq 1$), $0.05 \leq x4 \leq 0.58$ (e.g., $0.1 \leq x4 \leq 0.58$), $0.01 \leq x5 \leq 0.2$ (e.g., $0.01 \leq x5 \leq 0.05$), $0 \leq x6 \leq 0.2$ (e.g., $0 \leq x6 \leq 0.05$), $0.05 \leq y1 \leq 1.95$ (e.g., $0.05 \leq y1 \leq 1.8$), $0 \leq y2 \leq 1.9$ (e.g., $0 \leq y2 \leq 1.85$), $0.05 \leq y3 \leq 1.95$ (e.g., $0.1 \leq y3 \leq 1.95$), $0 \leq y4 \leq 1.6$ (e.g., $0 \leq y4 \leq 1.5$), $0 \leq y5 \leq 0.5$ (e.g., $0 \leq y5 \leq 0.3$), $0.1 \leq y6 \leq 0.5$ (e.g., $0.1 \leq y6 \leq 0.3$), $0 \leq y7 \leq 0.5$ (e.g., $0.1 \leq y7 \leq 0.2$), preferably, $0.7 \leq x3:(x3+x4) \leq 0.95$; preferably, $1.7 \leq y1+y2+y3+y4 \leq 2$.

The molecular formula of the titanium-based AB type hydrogen-storage alloy is AB, wherein $$A=Ti_{x1}Zr_{x2}Y_{x3}La_{x4}\ x1+x2+x3+x4=0.85-1.1,$$

$$B=V_{y1}Cr_{y2}Mn_{y3}Fe_{y4}Co_{y5}Ni_{y6}Cu_{y7}\ y1+y2+y3+y4+y5+y6+y7=0.95-1.05,$$

$0 \leq x1 \leq 1.09$ (e.g., $0.9 \leq x1 \leq 1.05$), $0 \leq x2 \leq 1.09$ (e.g., $0 \leq x2 \leq 0.5$), $0.01 \leq x3 \leq 0.2$ (e.g., $0.01 \leq x3 \leq 0.05$), $0 \leq x4 \leq 0.2$ (e.g., $0 \leq x4 \leq 0.05$), $0.05 \leq y1 \leq 0.5$ (e.g., $0.05 \leq y1 \leq 0.2$), $0 \leq y2 \leq 0.8$ (e.g., $0 \leq y2 \leq 0.2$), $0 \leq y3 \leq 0.8$ (e.g., $0.05 \leq y3 \leq 0.4$, or $0.1 \leq y3 \leq 0.4$), $0.2 \leq y4 \leq 1$ (e.g., $0.5 \leq y4 \leq 0.9$), $0 \leq y5 \leq 0.35$ (e.g., $0 \leq y5 \leq 0.1$), $0 \leq y6 \leq 0.45$ (e.g., $0 \leq y6 \leq 0.2$), $0 \leq y7 \leq 0.3$ (e.g., $0 \leq y7 \leq 0.2$), preferably, x1 and x2 are zero at the same time;

The molecular formula of the magnesium-based $A_2B$ type hydrogen-storage alloy is $A_2B$, wherein $$A=Mg_{x1}Ca_{x2}Ti_{x3}La_{x4}Y_{x5}\ x1+x2+x3+x4+x5=1.9-2.1,$$

$$B=Cr_{y1}Fe_{y2}Co_{y3}Ni_{y4}Cu_{y5}Mo_{y6}\ y1+y2+y3+y4+y5+y6=0.9-1.1;$$

wherein, $1.29 \leq x1 \leq 2.09$ (e.g., $1.7 \leq x1 \leq 2.05$), $0 \leq x2 \leq 0.5$ (e.g., $0 \leq x2 \leq 0.2$), $0 \leq x3 \leq 0.8$ (e.g., $0 \leq x3 \leq 0.5$), $0 \leq x4 \leq 0.5$ (e.g., $0 \leq x4 \leq 0.2$), $0.01 \leq x5 \leq 0.2$ (e.g., $0.05 \leq x5 \leq 0.1$), $0 \leq y1 \leq 0.3$ (e.g., $0 \leq y1 \leq 0.2$, $0.05 \leq y1 \leq 0.2$), $0 \leq y2 \leq 0.2$ (e.g., $0 \leq y2 \leq 0.1$), $0 \leq y3 \leq 0.6$ (e.g., $0 \leq y3 \leq 0.5$), $0.2 \leq y4 \leq 1.1$ (e.g., $0.7 \leq y4 \leq 1.05$), $0 \leq y5 \leq 0.5$ (e.g., $0 \leq y5 \leq 0.4$), $0 \leq y6 \leq 0.15$ (e.g., $0 \leq y6 \leq 0.1$);

The molecular formula of the vanadium-based solid solution type hydrogen-storage alloy is $A_{x1}B_{x2}$, wherein $x1+x2=1$, wherein $A=Ti_{y1}V_{y2}Zr_{y3}Nb_{y4}Y_{y5}La_{y6}Ca_{y7}\ y1+y2+y3+y4+y5+y6+y7=1$, $$B=Mn_{z1}Fe_{z2}Co_{z3}Ni_{z4}\ z1+z2+z3+z4=1,$$

$0.7 \leq x1 \leq 0.95$ (e.g., $0.8 \leq x1 \leq 0.95$, $0.9 \leq x1 \leq 0.95$), $0.05 \leq x2 \leq 0.3$ (e.g., $0.05 \leq x2 \leq 0.2$, $0.05 \leq x2 \leq 0.1$), $0.4 \leq y1 \leq 0.9$ (e.g., $0.45 \leq y1 \leq 0.9$, $0.5 \leq y1 \leq 0.8$), $0 \leq y2 \leq 0.5$ (e.g., $0 \leq y2 \leq 0.4$), $0 \leq y3 \leq 0.5$ (e.g., $0 \leq y3 \leq 0.4$), $0 \leq y4 \leq 0.55$ (e.g., $0 \leq y4 \leq 0.4$), $0 \leq y5 \leq 0.2$ (e.g., $0.01 \leq y5 \leq 0.2$, $0.05 \leq y5 \leq 0.2$), $0 \leq y6 \leq 0.1$ (e.g., $0 \leq y6 \leq 0.05$), $0 \leq y7 \leq 0.1$ (e.g., $0 \leq y7 \leq 0.05$), $0 \leq z1 \leq 1$ (e.g., $0.1 \leq z1 \leq 1$, $0.2 \leq z1 \leq 0.95$), $0 \leq z2 \leq 0.95$ (e.g., $0 \leq z2 \leq 0.9$), $0 \leq z3 \leq 0.3$ (e.g., $0 \leq z3 \leq 0.2$), $0 \leq z4 \leq 0.45$ (e.g., $0.05 \leq z4 \leq 0.45$, $0.05 \leq z4 \leq 0.3$), $0.55 \leq z1+z2 \leq 1$ (e.g., $0.7 \leq z1+z2 \leq 1$).

In an embodiment, the hydrogen-storage alloy of the present invention is selected from: $La_{0.61}Ce_{0.16}Pr_{0.04}Nd_{0.19}Ni_{3.55}Co_{0.75}Mn_{0.4}Al_{0.3}$, $(Ti_{0.8}V_{0.2})_{0.95}(Fe_1)_{0.05}$, $(Ti_{0.8}Y_{0.2})_{0.95}(Mn_{0.95}Ni_{0.05})_{0.05}$, $(Ti_{0.4}V_{0.4}Y_{0.2})_{0.9}(Fe_{0.05}Mn_{0.95})_{0.1}$, $(Ti_{0.4}V_{0.4}Y_{0.2})_{0.9}(Fe_{0.05}Mn_{0.9}Ni_{0.05})_{0.1}$, $(Ti_{0.7}Nb_{0.1}Y_{0.2})_{0.9}(Mn_1)_{0.1}$, $(Ti_{0.7}Nb_{0.1}Y_{0.2})_{0.9}(Mn_{0.7}Ni_{0.3})_{0.1}$, $(Ti_{0.4}Zr_{0.4}Y_{0.2})_{0.93}(Fe_{0.2}Mn_{0.7}Co_{0.1})_{0.07}$, $(Ti_{0.4}Zr_{0.4}Y_{0.2})_{0.93}(Fe_{0.2}Mn_{0.7}Ni_{0.1})_{0.07}$, $(Ti_{0.4}V_{0.4}Zr_{0.2})_{0.95}(Fe_{0.6}Mn_{0.2}Co_{0.1}Ni_{0.1})_{0.05}$, $(Ti_{0.4}V_{0.35}Zr_{0.2}Y_{0.05})_{0.95}(Fe_{0.6}Mn_{0.2}Co_{0.1}Ni_{0.1})_{0.05}$, $(Ti_{0.88}Y_{0.1}Ca_{0.02})_{0.95}(Fe_{0.3}Mn_{0.6}Co_{0.1})_{0.05}$, $(Ti_{0.88}Y_{0.1}Ca_{0.02})_{0.95}(Fe_{0.3}Mn_{0.6}Ni_{0.1})_{0.05}$, $(Ti_{0.7}Nb_{0.1}Y_{0.2})_{0.8}(Mn_{0.7}Ni_{0.3})_{0.2}$, $Ti_{0.64}Zr_{0.45}Y_{0.01}VMn_{0.9}Ni_{0.1}$, $Mg_{0.01}Ti_{0.93}Zr_{0.15}Y_{0.01}VMn_{0.9}Ni_{0.1}$, $Ti_{0.55}Zr_{0.48}Y_{0.05}La_{0.02}V_{0.33}Cr_{0.05}Mn_{1.5}Fe_{0.09}Ni_{0.1}$, $Ti_{0.85}Zr_{0.18}Y_{0.05}La_{0.02}V_{0.23}Cr_{0.05}Mn_{1.5}Fe_{0.09}Ni_{0.1}Cu_{0.1}$, $Ti_{0.6}Zr_{0.4}Y_{0.05}V_{0.1}Mn_{1.8}Ni_{0.2}$, $Mg_{0.1}Ti_{0.7}Zr_{0.2}Y_{0.05}V_{0.1}Mn_{1.6}Ni_{0.2}Cu_{0.2}$, $Ca_{0.01}Ti_{0.9}Zr_{0.05}Y_{0.05}V_{1.2}Mn_{0.6}Ni_{0.3}$, $Ca_{0.01}Ti_{0.85}Zr_{0.05}Y_{0.05}V_{1.2}Mn_{0.6}Ni_{0.1}Cu_{0.2}$, $TiZr_{0.05}Y_{0.05}V_{0.1}Cr_{1.4}Mn_{0.2}Co_{0.1}Ni_{0.3}$, $Mg_{0.1}Ti_{0.8}Zr_{0.15}Y_{0.05}V_{0.1}Cr_{1.4}Mn_{0.2}Co_{0.1}Ni_{0.1}Cu_{0.2}$, $Ti_{0.5}Zr_{0.55}Y_{0.05}V_{1.79}Mn_{0.1}Fe_{0.01}Ni_{0.2}$, $Ti_{0.8}Zr_{0.25}Y_{0.05}V_{1.79}Mn_{0.1}Fe_{0.01}Ni_{0.1}Cu_{0.1}$, $Mg_{0.01}Ti_{0.63}Zr_{0.45}Y_{0.01}VMn_{0.9}Ni_{0.1}$, $Mg_{1.8}Y_{0.1}Ni_1$, $Mg_{1.8}Y_{0.1}Cr_{0.05}Ni_1$, $Mg_{1.5}Ti_{0.5}Y_{0.55}Ni_{1.1}$, $Mg_{1.5}Ti_{0.5}Y_{0.55}Cr_{0.1}Ni_1$, $Mg_2Y_{0.1}Ni_{0.6}Cu_{0.4}$, $Mg_2Y_{0.1}Cr_{0.05}Ni_{0.6}Cu_{0.4}$, $Mg_{1.92}Y_{0.08}Ni_{0.95}Fe_{0.05}$, $Mg_{1.92}Y_{0.08}Cr_{0.2}Ni_{0.75}Fe_{0.05}$, $Mg_{1.9}Y_{0.1}Fe_{0.1}Ni_{0.8}Cu_{0.1}$, $Mg_{1.9}Y_{0.1}Cr_{0.1}Fe_{0.1}Ni_{0.7}Cu_{0.1}$, $Mg_{1.9}Y_{0.1}Ni_{0.8}Co_{0.2}$, $Mg_{1.9}Y_{0.1}Cr_{0.1}Ni_{0.8}Co_{0.2}$, $Mg_{1.8}Y_{0.1}La_{0.1}Ni_{0.9}Co_{0.1}$, $Mg_{1.8}Y_{0.1}La_{0.1}Cr_{0.05}Ni_{0.9}Co_{0.1}$, $Mg_{1.7}Ti_{0.2}Y_{0.1}Ni_{0.7}Co_{0.32}$, $Mg_{1.7}Ti_{0.2}Y_{0.1}Cr_{0.05}Ni_{0.7}Co_{0.3}$, $TiY_{0.01}V_{0.1}Fe_{0.7}Ni_{0.2}$, $TiY_{0.01}V_{0.1}Fe_{0.7}Mn_{0.1}Ni_{0.1}$, $TiY_{0.02}V_{0.2}Fe_{0.8}$, $TiY_{0.02}V_{0.2}Fe_{0.7}Mn_{0.1}$, $Ti_{0.97}Y_{0.03}V_{0.05}Cr_{0.03}Fe_{0.9}$, $Ti_{0.97}Y_{0.03}V_{0.05}Cr_{0.03}Fe_{0.5}Mn_{0.4}$, $Ti_{0.9}Y_{0.04}V_{0.15}Fe_{0.9}$, $Ti_{0.9}Y_{0.04}V_{0.05}Fe_{0.9}Mn_{0.1}$, $Ti_{0.91}Zr_{0.05}Y_{0.04}V_{0.1}Cr_{0.2}Fe_{0.7}$, $Ti_{0.91}Zr_{0.05}Y_{0.04}V_{0.1}Cr_{0.2}Fe_{0.6}Mn_{0.1}$, $Ti_{0.95}Y_{0.05}V_{0.26}Fe_{0.7}Cu_{0.05}$, $Ti_{0.95}Y_{0.05}V_{0.05}Fe_{0.7}Mn_{0.21}Cu_{0.05}$, $Ti_{1.02}Y_{0.03}V_{0.05}Fe_{0.9}Ni_{0.1}$, $Ti_{1.02}Y_{0.03}V_{0.05}Fe_{0.8}Mn_{0.1}Ni_{0.1}$, $La_{0.5}Ce_{0.32}Nd_{0.15}Pr_{0.02}Y_{0.01}Ni_{4.4}Fe_{0.55}Al_{0.05}$, $La_{0.5}Ce_{0.32}Nd_{0.15}Pr_{0.02}Y_{0.01}Ni_{4.4}Fe_{0.6}$, $La_{0.8}Ce_{0.15}Y_{0.05}Ni_4Mn_{0.5}Al_{0.5}$, $La_{0.8}Ce_{0.15}Y_{0.05}Ni_{4.5}Mn_{0.5}$, $La_{0.45}Ce_{0.4}Nd_{0.1}Pr_{0.03}Y_{0.02}Ni_4Co_{0.8}Al_{0.2}$, $La_{0.45}Ce_{0.4}Nd_{0.1}Pr_{0.03}Y_{0.02}Ni_{4.2}Co_{0.8}$, $La_{0.75}Ce_{0.15}Nd_{0.05}Pr_{0.02}Y_{0.03}Ni_{4.7}Al_{0.1}Fe_{0.2}$, $La_{0.75}Ce_{0.15}Nd_{0.05}Pr_{0.02}Y_{0.03}Ni_{4.8}Fe_{0.2}$, $La_{0.8}Ce_{0.15}Nd_{0.03}Y_{0.02}Ni_{4.5}Co_{0.3}Mn_{0.1}Al_{0.1}$, $La_{0.8}Ce_{0.15}Nd_{0.03}Y_{0.02}Ni_{4.5}Co_{0.4}Mn_{0.1}$, $La_{0.97}Y_{0.03}Ni_4Co_1$.

In a preferable embodiment, the hydrogen-storage alloy of the present invention is selected from:

$(Ti_{0.8}Y_{0.2})_{0.95}(Mn_{0.95}Ni_{0.05})_{0.05}$, $(Ti_{0.4}V_{0.4}Y_{0.2})_{0.9}(Fe_{0.05}Mn_{0.9}Ni_{0.05})_{0.1}$, $(Ti_{0.7}Nb_{0.1}Y_{0.2})_{0.9}(Mn_{0.7}Ni_{0.3})_{0.1}$, $(Ti_{0.4}Zr_{0.4}Y_{0.2})_{0.93}(Fe_{0.2}Mn_{0.7}Ni_{0.1})_{0.07}$, $(Ti_{0.4}V_{0.35}Zr_{0.2}Y_{0.05})_{0.95}(Fe_{0.6}Mn_{0.2}Co_{0.1}Ni_{0.01})_{0.05}$, $(Ti_{0.8}Y_{0.1}Ca_{0.02})_{0.95}(Fe_{0.3}Mn_{0.6}Ni_{0.1})_{0.05}$, $Mg_{0.01}Ti_{0.93}Zr_{0.15}Y_{0.01}VMn_{0.9}Ni_{0.1}$, $Ti_{0.85}Zr_{0.18}Y_{0.05}La_{0.02}V_{0.23}Cr_{0.05}Mn_{1.5}Fe_{0.09}Ni_{0.1}Cu_{0.1}$, $Mg_{0.1}Ti_{0.7}Zr_{0.2}Y_{0.05}V_{0.1}Mn_{1.6}Ni_{0.2}Cu_{0.2}$, $Ca_{0.01}Ti_{0.85}Zr_{0.05}Y_{0.05}V_{1.2}Mn_{0.6}Ni_{0.1}Cu_{0.2}$, $Mg_{0.1}Ti_{0.8}Zr_{0.15}Y_{0.05}V_{0.1}Cr_{1.4}Mn_{0.2}Co_{0.1}Ni_{0.1}Cu_{0.2}$, $Ti_{0.8}Zr_{0.25}Y_{0.05}V_{1.79}Mn_{0.1}Fe_{0.01}Ni_{0.1}Cu_{0.1}$, $Mg_{1.8}Y_{0.1}Cr_{0.05}Ni_1$, $Mg_{1.5}Ti_{0.5}Y_{0.05}Cr_{0.1}Ni_1$, $Mg_2Y_{0.1}Cr_{0.05}Ni_{0.6}Cu_{0.4}$, $Mg_{1.92}Y_{0.08}Cr_{0.2}Ni_{0.75}Fe_{0.05}$, $Mg_{1.9}Y_{0.1}Cr_{0.1}Fe_{0.1}Ni_{0.7}Cu_{0.1}$, $Mg_{1.9}Y_{0.1}Cr_{0.1}Ni_{0.8}Co_{0.2}$, $Mg_{1.8}Y_{0.1}La_{0.1}Cr_{0.05}Ni_{0.9}Co_{0.1}$, $Mg_{1.7}Ti_{0.2}Y_{0.1}Cr_{0.05}Ni_{0.7}Co_{0.3}$, $TiY_{0.01}V_{0.1}Fe_{0.7}Mn_{0.1}Ni_{0.1}$, $TiY_{0.02}V_{0.2}Fe_{0.7}Mn_{0.1}$, $Ti_{0.97}Y_{0.03}V_{0.05}Cr_{0.03}Fe_{0.8}Mn_{0.4}$, $Ti_{0.9}Y_{0.04}V_{0.05}Fe_{0.9}Mn_{0.1}$, $Ti_{0.91}Zr_{0.05}Y_{0.04}V_{0.1}Cr_{0.2}Fe_{0.6}Mn_{0.1}$, $Ti_{0.95}Y_{0.05}V_{0.05}Fe_{0.7}Mn_{0.21}Cu_{0.05}$, $Ti_{1.02}Y_{0.03}V_{0.05}Fe_{0.8}Mn_{0.1}Ni_{0.1}$, $La_{0.5}Ce_{0.32}Nd_{0.15}Pr_{0.02}Y_{0.01}Ni_{4.4}Fe_{0.55}Al_{0.05}$, $La_{0.8}Ce_{0.15}Y_{0.05}Ni_4Mn_{0.5}Al_{0.5}$, $La_{0.45}Ce_{0.4}Nd_{0.1}Pr_{0.03}Y_{0.02}Ni_4Co_{0.08}Al_{0.2}$, $La_{0.75}Ce_{0.15}Nd_{0.05}Pr_{0.02}Y_{0.03}Ni_{4.7}Al_{0.1}Fe_{0.2}$, $La_{0.8}Ce_{0.15}Nd_{0.03}Y_{0.02}Ni_{4.5}Co_{0.3}Mn_{0.1}Al_{0.1}$.

In an aspect of the present invention, the present invention provides a process for preparing the hydrogen-storage alloy of the present invention, wherein the process comprises the following steps: (1) weighing each of the raw materials of the hydrogen-storage alloy in a way to reach the composition of the hydrogen-storage alloy and mixing the raw materials; (2) melting the mixture obtained in step (1) and then annealing; Wherein the melting is electric furnace melting or induction melting; Preferably, the melting condition comprises: it is performed under vacuum or inert atmosphere, the temperature is 1200-3000jãC, preferably 1800-2200jãC; More preferably, it is performed under vacuum, and the melting pressure is $1*10^{-5}$ to $1*10^{-3}$ Pa (absolute pressure), preferably $0.5*10^{-4}$ to $5*10^{-4}$ Pa (absolute pressure); More preferably, it is performed under inert atmosphere, and the melting pressure is 0.5-1 bar (for example, 0.6-1 bar, 0.7-1 bar) (gauge pressure); Wherein the annealing condition comprises: it is performed under vacuum or inert atmosphere (e.g., argon atmosphere), the temperature is 500-900° C. (for example 700-1000° C.), the time is 12-360 hours; Optionally, the process further comprises cooling the material obtained by annealing in step (2) and then performing a crushing treatment to obtain a product of 10-400 mesh (for example, 20-400 mesh); And optionally, the process further comprises subjecting the material obtained by annealing in step (2) to activation treatment; preferably, the condition of the activation treatment comprises: it is performed under vacuum, the temperature is 50-300 jãC, and the time is 1-10 hours.

In an aspect of the present invention, the present invention provides a process for providing a high-purity hydrogen gas, wherein the process comprises: (1) An organic liquid hydrogen-storage material is contacted and reacted with a dehydrogenation catalyst to obtain a dehydrogenation reaction product containing hydrogen; (2) the dehydrogenation reaction product is cooled to obtain a liquid product and a hydrogen-rich gas product, and the liquid product is collected; (3) the hydrogen-rich gas is contacted with a hydrogen-storage alloy to obtain a hydrogen-containing alloy, and an unabsorbed gas is collected; (3a) Optionally, an organic substance in the hydrogen-containing alloy storage container is removed; (4) The hydrogen-containing alloy is heated to release hydrogen gas.

According to the process for providing a high-purity hydrogen gas of the present invention, the catalyst for producing hydrogen by dehydrogenation of organic substance of the present invention and/or the hydrogen-storage alloy of the present invention are used.

According to the process for providing a high-purity hydrogen gas of the present invention, in step (1): the reaction temperature for contacting and reacting the organic liquid hydrogen-storage material with the dehydrogenation catalyst is 150 to 450° C. (for example, 200 to 400° C., 300 to 350° C.); the weight hourly space velocity for contacting and reacting the organic liquid hydrogen-storage material with the dehydrogenation catalyst is 0.5-50 $h^{-1}$ (e.g., 1-45 $h^{-1}$, 2-30 $h^{-1}$); the pressure for contacting and reacting the organic liquid hydrogen-storage material with the dehydrogenation catalyst is 0.03-5 MPa (gauge pressure) (for example, 0.3-5 MPa, 0.1-3 MPa, 0.5-2 MPa or 0.2-1.6 MPa); Optionally, the organic liquid hydrogen-storage material is mixed with hydrogen gas and then contacted with the dehydrogenation catalyst, and the hydrogen-to-hydrocarbon ratio (the molar ratio of hydrogen gas to the organic liquid hydrogen-storage material) is 0-10 (for example, 0-8). The introduction of hydrogen gas is beneficial to reduce coke formation in the dehydrogenation reaction.

According to the process for providing a high-purity hydrogen gas of the present invention, in step (2), the cooling temperature for cooling the dehydrogenation reaction product is lower than the boiling temperature of the organic substance(s) in the liquid product; preferably lower than the boiling temperature of the organic substance with the lowest boiling point among those being liquid at normal temperature and pressure.

According to the process for providing a high-purity hydrogen gas of the present invention, in step (3), the hydrogen-rich gas is the hydrogen-rich gas product or a hydrogen-containing gas obtained by further separation of the hydrogen-rich gas product, the process for the further separation includes temperature swing separation, membrane separation, pressure swing adsorption separation or a combination thereof; The mass fraction of hydrogen gas in the hydrogen-rich gas is ≥80% (for example, 80-99%, preferably ≥85%, more preferably ≥90%). The hydrogen-rich gas with a certain content of hydrogen gas obtained by cooling and separating is then subjected to the absorption with the hydrogen-storage alloy, the absorption capacity of the hydrogen-storage alloy can be fully utilized and the absorption effect of the hydrogen-storage alloy can be improved.

According to the process for providing a high-purity hydrogen gas of the present invention, in step (3), contacting the hydrogen-rich gas with the hydrogen-storage alloy is carried out in one or more hydrogen-storage alloy storage containers; The number of the hydrogen-storage alloy(s) can be one or more, and a plurality of hydrogen-storage alloys can be used in a mixture, or can be used in series or in parallel or in combination of in series and in parallel; The pressure for contacting the hydrogen-rich gas with the hydrogen-storage alloy is 0.001-5 MPa (for example, 0.01-5 MPa, 0.03-4 MPa, 0.05-5 MPa, 0.08-2 MPa, 0.05-3 MPa, 0.1-1 MPa), in case of a plurality of hydrogen-storage alloy storage containers and in the presence of hydrogen-storage containers in series, in the hydrogen-rich gas stream direction, the contact pressure for finally contacting with the hydrogen-storage alloy (also known as the hydrogen absorption pressure) is 0.05-5 MPa (for example 0.1-1 MPa); The temperature for contacting the hydrogen-rich gas with the hydrogen-storage alloy (also known as hydrogen absorption temperature) is −70 to 100° C. (for example, −50 to 90° C., −30 to 80° C.); In case of contacting with the hydrogen-storage alloy, the temperature of the hydrogen-rich gas is lower than the boiling temperature of the organic liquid hydrogen-storage material under normal pressure.

According to the process for providing a high-purity hydrogen gas of the present invention, in step (3), the number of the hydrogen-storage alloy storage container(s) is one or more, wherein according to the order of contacting with hydrogen gas, the hydrogen-storage alloy in the hydrogen-storage alloy storage container finally contacting with hydrogen gas is a hydrogen-storage alloy having a high equilibrium pressure, wherein the hydrogen-storage alloy having a high equilibrium pressure is such one that there is at least one temperature point between 150 and 450° C., and at this temperature point the equilibrium pressure for absorbing hydrogen gas is 35 MPa or higher; preferably the hydrogen-storage alloy in at least one hydrogen-storage alloy storage container is a hydrogen-storage alloy having a high equilibrium pressure. High-purity and high-pressure hydrogen gas can be obtained with the hydrogen-storage alloy having a high equilibrium pressure, and the obtained high-purity and high-pressure hydrogen gas can be directly used for refueling the hydrogen fuel cell vehicle.

According to the process for providing a high-purity hydrogen gas of the present invention, step (3a) is performed, wherein the organic substance in the hydrogen-containing alloy storage container is removed by a purge process. For example the purge is performed with hydrogen gas, for example the process is as follows: after the hydrogen-storage alloy reaches a predetermined adsorption capacity, the supply of a hydrogen-rich gas to the hydrogen-storage alloy is stopped, a hydrogen gas is passed through the hydrogen-containing alloy, the organic gas in the hydrogen-containing alloy and in the hydrogen-containing alloy storage container (also known as hydrogen-storage alloy storage container) is taken out, and introduced into a storage tank for storage or absorbed by the hydrogen-storage alloy in other hydrogen-storage alloy storage containers; wherein preferably, the purity of the hydrogen gas for purge is greater than 90 wt %, more preferably greater than 95 wt %, for example greater than 99 wt %.

According to the process for providing a high-purity hydrogen gas of the present invention, in step (4): the temperature of hydrogen gas released by the hydrogen-storage alloy (namely, the temperature at which the hydrogen-storage alloy is heated, abbreviated as hydrogen release temperature) is 150 to 450° C., the pressure of the released hydrogen gas is ≥35 MPa (for example, 35-100 MPa) in order to obtain a high-purity and high-pressure hydrogen, or the partial pressure of the released hydrogen gas is 0.1-5 MPa in order to obtain a high purity hydrogen gas, wherein the hydrogen release temperature is higher than the hydrogen absorption temperature.

According to the process for providing a high-purity hydrogen gas of the present invention, it further comprises the hydrogen-containing alloy is allowed to release hydrogen gas, and the released hydrogen contacts with different hydrogen-storage alloy(s) to form hydrogen-containing alloy(s), and this process is repeated once or multiple times, wherein the hydrogen-storage alloy used in at least the last repetition process is a hydrogen-storage alloy having a high equilibrium pressure.

According to the process for providing a high-purity hydrogen gas of the present invention, the hydrogen-storage alloy is a combination of a first hydrogen-storage alloy and a second hydrogen-storage alloy; The first hydrogen-storage alloy is the magnesium-based $A_2B$ type hydrogen-storage alloy according to the present invention for contacting with the hydrogen-rich gas, The second hydrogen-storage alloy is used to pressurize a first hydrogen-storage hydrogen gas, and the second hydrogen-storage alloy is a hydrogen-storage alloy having a high equilibrium pressure, and the second hydrogen-storage alloy is one or more of rare earth-based $AB_5$ type, zirconium-titanium-based $AB_2$ type, and titanium-based AB type hydrogen-storage alloys according to the present invention; The hydrogen-rich gas is firstly passed through the first hydrogen-storage alloy for impurity separation; then the high-purity hydrogen gas released from the first hydrogen-storage alloy is contacted with the second hydrogen-storage alloy, and then the second hydrogen-storage alloy is allowed to release hydrogen gas under high pressure. The hydrogen release temperature of the first hydrogen-storage alloy is higher than the hydrogen absorption temperature of the second hydrogen-storage alloy, and the temperature difference is preferably ≥100° C. (for example, 350° C.≥temperature difference≥150° C.); The first hydrogen-storage alloy and the second hydrogen-storage alloy are in different hydrogen-storage alloy storage tanks, and there is a heat exchange system between the first hydrogen-storage alloy storage tank and the second hydrogen-storage alloy storage tank; The hydrogen absorption temperature for contacting the hydrogen-rich gas with the first hydrogen-storage alloy is 20-150° C. (for example, 50-100° C.), and the hydrogen gas partial pressure is 0.001-0.1 MPa (0.001-0.03 MPa); The temperature at which the first hydrogen-storage alloy releases hydrogen gas (hydrogen release temperature) is 150 to 450° C. (for example, 200-350° C.), and the hydrogen gas partial pressure for hydrogen release is 0.1-5 MPa (for example, 0.1-1 MPa); The hydrogen absorption temperature at which the second hydrogen-storage alloy absorbs hydrogen gas is-70 to 100° C. (for example, −30 to 100° C.), and the hydrogen gas partial pressure for hydrogen absorption is 0.1-5 MPa (for example, 0.1-1 MPa), The hydrogen release temperature of the second hydrogen-storage alloy is 150-450° C. (for example, 200-350° C.), and the hydrogen gas partial pressure for hydrogen release is ≥35 MPa (for example, 35-100 MPa).

According to the process for providing a high-purity hydrogen gas of the present invention, the organic liquid hydrogen-storage material is an organic compound containing a ring in the molecule, which optionally contains heteroatom(s), and the heteroatom(s) may be on the ring; For example, saturated or unsaturated hydrocarbons containing cycloalkane ring(s), for example, saturated or unsaturated hydrocarbons containing no heterocyclic atom and containing cycloalkane ring(s), more specifically, saturated or unsaturated hydrocarbons containing no heterocyclic atom and containing cycloalkane ring(s) and having the total ring number of aromatic rings and cycloalkanes of 2 or less, for example, cyclohexane, methyl cyclohexane, decahydronaphthalene, and bi(cyclohexane): And saturated or unsaturated hydrocarbons containing heteroatom(s) and containing cycloalkane ring(s), for example, nitrogen-containing heterocyclic compounds, and nitrogen/boron-containing heterocyclic compounds, the nitrogen-containing heterocyclic compound comprises one or more of decahydrocarbazole, dodecahydroethylcarbazole, indoline, 4-aminopiperidine, piperidine-4-carboxamide, perhydro-4,7-phenanthroline, 2-methyl-1,2,3,4-tetrahydroquinoline, and 2,6-dimethyldecahydro-1,5-naphthyridine; The nitrogen/boron-containing heterocyclic compound comprises one or more of 1,2-azaborinane, and 3-methyl-1,2-azaborolidine.

According to the process for providing a high-purity hydrogen gas of the present invention, the process further comprises the released hydrogen gas is introduced into a hydrogen gas storage tank to store hydrogen gas; or the obtained high-purity and high-pressure hydrogen gas can be directly used to refuel a hydrogen fuel cell vehicle.

In an aspect of the present invention, the present invention provides a high-efficiently distributed process for producing high-purity and high-pressure hydrogen gas, the process comprising: in a dehydrogenation reactor, a liquid organic hydrogen-storage material is subjected to dehydrogenation reaction in the presence of a dehydrogenation catalyst to obtain a dehydrogenation reaction product including hydrogen gas; in a cooling separation apparatus, the dehydrogenation reaction product is cooled and separated to obtain a hydrogen-rich stream and an organic liquid; in a hydrogen-storage alloy storage container, a hydrogen-rich stream or a purified hydrogen-rich stream is contacted with the hydrogen-storage alloy to obtain a hydrogen-containing alloy; purging with hydrogen gas removes an organic substance in the hydrogen-storage alloy storage container: wherein the purity of the hydrogen gas for purge is preferably greater than 90 wt % (for example, greater than 95 wt %, greater than 99 wt %); the hydrogen-containing alloy is heated to release hydrogen gas to obtain a high-pressure hydrogen gas and supply the obtained high-pressure hydrogen gas to a hydrogen-consuming apparatus or a high-pressure hydrogen gas storage tank for storage, for example, the obtained high-pressure hydrogen gas can be directly used to refuel a hydrogen fuel cell vehicle.

In an aspect of the present invention, the present invention provides a system for providing a high-purity and high-pressure hydrogen gas, comprising: an organic liquid hydrogen-storage material storage and supply apparatus, used to store an organic liquid hydrogen-storage material and provide the organic liquid hydrogen-storage material to a dehydrogenation reactor; a dehydrogenated liquid storage apparatus, used to store the liquid product obtained after the dehydrogenation of the organic liquid hydrogen-storage material; a dehydrogenation reactor apparatus, used for the dehydrogenation reaction of the organic liquid hydrogen-storage material under the action of the dehydrogenation catalyst to obtain a dehydrogenation reaction product including hydrogen gas; a cooling separation apparatus, used to separate the dehydrogenation reaction product to obtain a hydrogen-rich gas product and a liquid product; a hydrogen-storage & hydrogen-supply apparatus, which includes a hydrogen-storage alloy storage container and a hydrogen-storage alloy heating system, used to contact the hydrogen-rich gas with the hydrogen-storage alloy to adsorb hydrogen gas at low temperature and low pressure, and heat to dehydrogenate after the adsorption is saturated; optionally, a purge apparatus, used to remove organic substance(s) in the hydrogen-storage container; a hydrogen gas supply apparatus, supplying a high-pressure hydrogen to the hydrogen-consuming apparatus or the hydrogen gas storage tank; preferably, the system is configured to be integrated and built in a cargo container, and used as a cargo container-type hydrogen production system in a hydrogen refueling station, or directly built in a hydrogen refueling station for use; preferably, the hydrogen-storage & hydrogen-supply apparatus comprises one or more hydrogen-storage alloy storage containers, a plurality of hydrogen-storage alloy storage containers can be connected in parallel or in series or in combination of in series and in parallel; preferably, at least one of the hydrogen-storage alloy storage containers is a high-pressure-resistant container and/or the hydrogen gas supply apparatus is a high-pressure-resistant apparatus, for example, its tolerance pressure is 35 MPa or more.

Figure 3:
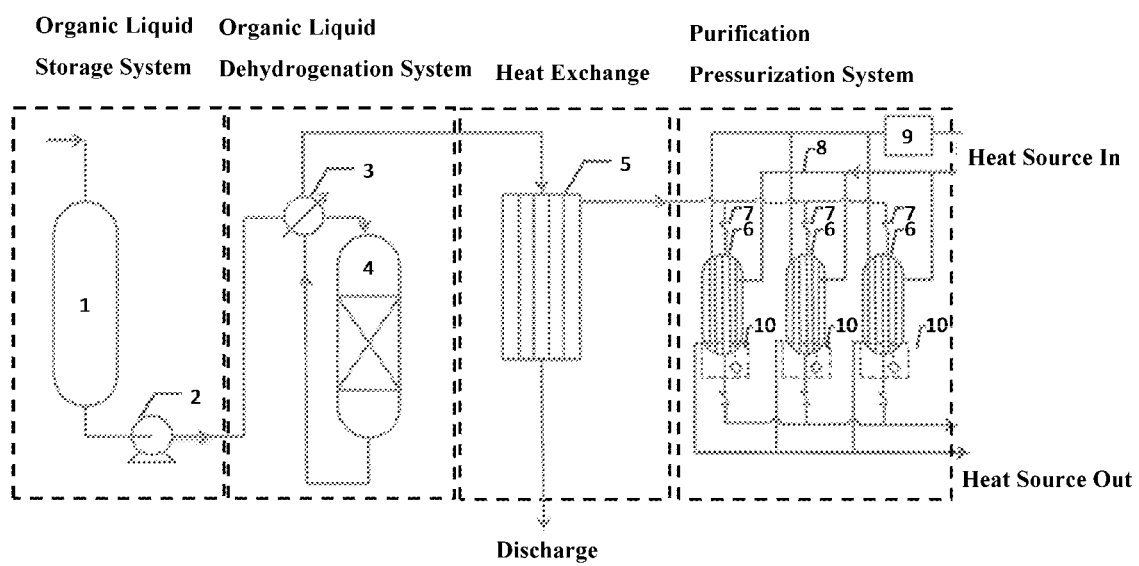
FIG. 3 is a schematic diagram of providing high-purity and high-pressure hydrogen gas provided by the present invention, in which: 1 is an organic liquid storage tank, 2 is a material pump, 3 is a heat exchanger, 4 is a dehydrogenation reactor, 5 is a heat exchanger, 6 is a hydrogen-storage tank, 7 is a one-way valve, 8 is an energy transfer system, 9 is a purge system, and 10 is a hydrogen-storage control system.

As shown in FIG. 3, the present invention provides a system for providing a high-purity and high-pressure hydrogen gas, wherein: 1 is an organic liquid storage tank, 2 is a material pump, 3 is a heat exchanger, 4 is a dehydrogenation reactor, 5 is a heat exchanger, 6 is a hydrogen-storage tank, 7 is a one-way valve, 8 is an energy transfer system, 9 is a purge system, and 10 is a hydrogen-storage control system; The organic liquid material storage system described in FIG. 3 includes an organic liquid storage tank (1) and a material pump (2) connected to the organic liquid dehydrogenation reactor, the organic liquid storage tank is provided with an organic liquid material inlet and an organic liquid material outlet; The organic liquid dehydrogenation reaction system includes an organic liquid heat exchanger (3) and a dehydrogenation reactor (4), and the organic liquid heat exchanger is connected to the outlet and the inlet of the organic liquid dehydrogenation reactor for cooling the reactor outlet gas and preheating the material; The reactor outlet gas can be subjected to a further heat-exchanging and cooling (5) to produce a hydrogen-rich stream by the separation after cooling, and the hydrogen-rich stream can optionally pass through one or more of the membrane separation apparatus and the pressure swing adsorption apparatus; The purification and pressurization system includes one or more sets of hydrogen-storage tanks (6), wherein each set of hydrogen-storage tanks is connected to a set of backflow prevention devices (7), and the hydrogen-storage tanks are connected in parallel to at least one hydrogen supply pipeline; at least includes one energy delivery system (8), used to provide energy to each hydrogen-storage tank to resolve hydrogen gas from the solid hydrogen-storage materials; at least includes a set of vacuum pumps (9) and a purge system, used to remove the impurity gases from the hydrogen-storage tank; the inlet and outlet of the hydrogen-storage tank are each connected to flow meters; and includes a control system (10), which overall controls the hydrogen absorption and release time of each hydrogen-storage tank and the startup time of the energy delivery system, based on the hydrogen production volume of the dehydrogenation reaction. The inlet flow meter of the hydrogen-storage tank is used to calculate the total hydrogen absorption amount of the hydrogen-storage alloy. When the hydrogen-storage capacity of the hydrogen-storage alloy in a single hydrogen-storage tank reaches 80% or more of the total saturated hydrogen absorption amount, the inlet valve of the hydrogen-rich stream of the hydrogen-storage tank is closed. The purge system is opened to remove impurities in the hydrogen-storage tank. When the purity of hydrogen gas in the purge pipeline reaches 99% or more, the purge system is closed. The total amount of hydrogen absorbed by the hydrogen-storage tanks at the same time should be higher than 120% of the hydrogen generation rate, the hydrogen-storage alloy is connected to at least one hydrogen supply pipeline through a hydrogen discharge valve, the hydrogen supply pipeline transports hydrogen gas to the hydrogen gas-storage apparatus, and the hydrogen discharge valves for hydrogen-storage alloys on hydrogen supply pipeline cannot be closed/opened at the same time.

In an aspect of the present invention, the present invention provides a mobile hydrogen supply system, comprising a transportation vehicle and a system for providing a high-purity and high-pressure hydrogen gas according to the present invention arranged on the transportation vehicle.

In an aspect of the present invention, the present invention provides a distributed hydrogen supply apparatus, comprising a system for providing a high-purity and high-pressure hydrogen gas according to the present invention, and optionally comprising a high-pressure hydrogen gas storage tank.

The process for preparing high-purity hydrogen gas provided by the present invention can efficiently provide high-purity hydrogen gas, and can provide high-purity and high-pressure hydrogen gas in case of using a hydrogen-storage alloy with high equilibrium pressure. In addition, the present invention may also have at least one of the following beneficial technical effects, and preferably has multiple beneficial technical effects:

(1) The process of the present invention can have higher dehydrogenation efficiency of organic liquid hydrogen-storage compounds.

(2) It can have a higher dehydrogenation conversion rate of organic liquid hydrogen-storage compounds.

(3) It can have higher dehydrogenation selectivity of organic liquid hydrogen-storage compounds.

(4) It has higher hydrogen absorption efficiency of hydrogen-storage metal.

(5) Hydrogen-storage metal has good hydrogen absorption efficiency in the presence of organic substance.

(6) Through the coupling of organic substance dehydrogenation, cooling separation and hydrogen absorption with hydrogen-storage alloys, the effect of increasing the conversion rate of organic substance dehydrogenation can be achieved.

(7) Dehydrogenation of organic materials and hydrogen absorption of hydrogen-storage alloys can be more efficiently matched The dehydrogenation catalyst for the dehydrogenation of organic substance to produce hydrogen gas provided by the present invention has the merits of higher dehydrogenation activity, hydrogen selectivity and/or hydrogen generation rate.

The dehydrogenation catalyst for hydrogen production from organic substance dehydrogenation provided by the present invention can replace part of noble metals with non-noble metals, can reduce the amount of noble metals, and maintain high dehydrogenation activity, hydrogen selectivity and/or hydrogen generation rate.

The catalyst provided by the present invention can be used for the dehydrogenation of organic hydrogen-storage compounds to produce hydrogen gas, especially for the dehydrogenation of organic substances containing rings, such as cycloalkane rings or heteroatom-containing rings, to produce hydrogen gas. It has higher conversion rate, selectivity and/or hydrogen generation rate.

According to the present invention, the percentage of the crystal phase of the modified metal oxide can be measured by the following process: the X-ray diffraction and phase filtering, and an adapted form of Rietveld modeling, the content by weight percent of the crystal phase of the modified metal oxide was obtained by calculation with the fitting methodology; reference is made to R. V Siriwardane, J. A. Poston, G. Evans, Jr. Ind. Eng. Chem. Res. 33(1994), 2810-2818 for phase filtering, and reference is made to RIQAS rietveld Analysis, Operators Manual, Material Data, Inc., Berkley, CA (1999) for the adapted form of Rietveld modelling.

According to the present invention, the chemical composition percentage of the modified metal oxide is the total content of the modified metal oxide in the support composition, and the chemical composition percentage of the modified metal oxide can be determined by X-ray fluorescence method or chemical analysis process.

According to the present invention, the content by weight percent of the modified metal oxide on the surface of the support composition is measured by the XPS process, and the measured thickness of the surface layer is in the range from the outer surface to a level of 5 nm away from the outer surface.

In addition, the present invention further provides the following technical solutions:

1. A support composition for a catalyst of the dehydrogenation of an organic substance to produce hydrogen gas, wherein the support composition comprises alumina and a modified metal oxide, and the modified metal oxide is titanium oxide and/or zirconium oxide, wherein the modified metal oxide has $\eta \leq 0.3$, wherein $\eta =$ the content by weight percent of the crystal phase of the modified metal oxide in the support composition/the content by weight percent of the chemical composition of the modified metal oxide in the support composition, titanium oxide is calculated as $TiO_2$, zirconium oxide is calculated as $ZrO_2$.

2. The support composition according to solution 1, wherein $\eta=0$, preferably, the first metal oxide in a monolayer is dispersed on the alumina substrate.

3. The support composition according to solution 1, wherein in said support composition, the mass fraction of alumina is 80-98.5%, preferably 83-97.5% or 85-95% or 90-95%; the mass fraction of the modified metal oxide is 1.5-20%, preferably 2.5-17% or 5-15%, or 5-10%.

4. The support composition according to solution 3, wherein the modified metal oxide comprises titanium oxide, wherein preferably, in the support composition, the mass fraction of titanium dioxide is preferably 2-20% for example 5-15% or 5-10% or 2.5-17%, the mass fraction of zirconium dioxide is preferably 0-8% for example 0-6% or 0-3% or 1-6%.

5. The support composition according to solution 4, wherein relative to the pure phase of $TiO_2$, in the XPS spectrum of the support composition, there is a shift for the Ti $2P_{3/2}$ orbital electron binding energy, the peak having the binding energy of 458.8 eV is shifted by 0.6-0.7 eV to a higher binding energy and reaches 459.4-459.5 eV, and/or a peak at the Ti $2P_{1/2}$ orbital electron binding energy of 464.5 eV is shifted by 0.8-0.9 eV to a higher binding energy and reaches 465.3-465.4 eV.

6. The support composition according to solution 1, wherein the oxide substrate has at least one phase structure of γ-alumina, η-alumina, ρ-alumina or χ-alumina.

7. The support composition according to solution 1, wherein the support composition has a specific surface area of 100-350 m²/g.

8. The support composition according to solution 1, wherein said support composition has a pore volume of 0.3-1.3 mL/g.

9. A process for preparing the support composition, comprising the following steps:

(1) contacting an alumina substrate with gas flow of a modified metal oxide precursor carried by a gas, and when titanium tetrachloride reaches the predetermined loading, the introduction of the gas flow of a modified metal oxide precursor carried by a gas is stopped, to obtain an alumina substrate loaded with the modified metal oxide precursor, and the modified metal oxide precursor is titanium oxide precursor and/or zirconium oxide precursor;

(2) Hydrolyzing and calcining the alumina substrate loaded with the modified metal oxide precursor to obtain a support composition.

10. The process for preparing the support composition according to solution 9, wherein said titanium oxide precursor is selected from titanium tetrachloride, ethyl titanate, isopropyl titanate, titanium acetate, and a mixture thereof, preferably titanium tetrachloride; said zirconium oxide precursor is selected from zirconium tetrachloride, zirconium ethoxide, zirconium methoxide, zirconium isopropoxide, tetrabutyl zirconate, and a mixture thereof, preferably zirconium tetrachloride and/or zirconium methoxide.

11. The process for preparing the support composition according to solution 9, wherein the alumina substrate is one or more of γ-alumina, η-alumina, ρ-alumina, and χ-alumina.

12. The process for preparing the support composition according to solution 9, wherein said alumina substrate has a specific surface area of 100-350 m$^2$/g; wherein, preferably, the specific surface area of the obtained support composition, compared with the specific surface area of the alumina substrate, is reduced by a proportion of ≤10%.

13. The process for preparing the support composition according to solution 9, wherein Said alumina substrate has a pore volume of 0.3-1.3 ml/g.

14. The process for preparing the support composition according to solution 9, Wherein the gas is an anhydrous inert gas, the content of water in the anhydrous inert gas is not more than 10 ppm. Preferably, the content of the modified metal oxide precursor in said gas flow of a modified metal oxide precursor carried by a gas is 0.1-3 g/L, wherein the content of the modified metal oxide precursor is calculated as metal oxide.

15. The process for preparing the support composition according to solution 9, wherein in step (1), the temperature of said gas is room temperature to 350° C., for example room temperature to 300° C. or 15-300° C.

16. The process for preparing the support composition according to solution 9, wherein the pressure for contacting in step (1) is 0.05-5 atm for example 1-3 atm.

17. The process for preparing the support composition according to solution 9, wherein the ratio of the volumetric flow rate of the gas per minute to the volume of alumina substrate is 3-80:1 for example 5-30:1 preferably 10-25:1; wherein the volume of the gas is calculated as the volume under normal conditions, the volume of the alumina substrate is calculated as the bulk volume.

18. The process for preparing the support composition according to solution 9, wherein when the alumina substrate is contacted with the gas flow of a modified metal oxide precursor carried by a gas, the alumina substrate is in fluidized state or under stirring; wherein being in fluidized state may be, for example, in a bubbling bed, a turbulent bed, a fast bed or a conveying bed.

19. The process for preparing the support composition according to solution 9, wherein in step (2), hydrolyzing the alumina substrate loaded with the modified metal oxide precursor is performed as follows: the alumina substrate loaded with the modified metal oxide precursor is contacted with a gas containing water vapor. In an embodiment, the ratio of the gas containing water vapor to the alumina substrate contacted therewith (the ratio of the volume of the gas containing water vapor and the bulk volume of the alumina substrate under normal conditions) is 3-80:1 for example 5-30:1, preferably 10-25:1, the proportion of the water vapor in the gas containing water vapor relative to the total gas volume is 0.1 vol %-100 vol %, preferably 3 vol %-100 vol %, more preferably 10 vol %-70 vol %; other gas(es) except water vapour can be inert gas or air. The hydrolysis time is for example 1 hour to 50 hours, preferably 2 hours to 30 hours. Usually, the hydrolysis time is greater than or equal to the loading time (the loading time refers to the time for contacting alumina substrate with the gas flow of a modified metal oxide precursor carried by a gas).

20. The process for preparing the support composition according to solution 9, wherein for said calcining, the calcining temperature is 350° C.-700° C., and the calcining time is 0.5-12 hours.

21. A catalyst for the dehydrogenation of an organic substance to produce hydrogen gas, wherein said catalyst comprises a support containing alumina and a modified metal oxide, and an active metal component, the modified metal oxide is titanium oxide and/or zirconium oxide; the active metal component is an oxide of active metal and/or a simple substance of active metal. Said active metal is for example one or more of VIIIB group metal, VIB group metal, VB group metal, VIB group metal, IB group metal, rare earth element, alkaline earth metal, IVA group metal;

Preferably, the active metal comprises Pt and/or Ni, optionally other element(s). Preferably, the other element is one or more of V, Cr, Mn, Fe, Co, Ni, Cu, Ag, Ce, W, Mo, Sn, Ca, Pt, Pd, Ru, Re, Rh, Ir, Os, Zn, P, and In. Preferably, the support is the support composition according to any of solutions 1-8 or the support composition prepared by the process according to any of solutions 9-20.

22. A catalyst for dehydrogenation of organic substance to produce hydrogen gas, comprising a support and a loaded active metal component, wherein said support is the support composition according to any of solutions 1-8 or the support composition prepared by the process according to any of solutions 9-20, the active metal comprises Pt and optionally other metal, the other metal can be a noble metal or a non-noble metal, said other metal is one or more of elements Pd, Ru, Re, Rh, Ir, Os, Sn, V, Mo, Cr, Mn, Fe, Co, Ni, Cu, Ag, Ce, W, Cu, and Ca.

23. The catalyst according to solution 22, wherein in the catalyst, the content of active metal is 0.1-20 wt % for example 0.1-15 wt %, the content of the support is 85-99.9 wt %, the content of Pt is 0.1-10 wt %. In the composition of the catalyst of the present invention, for the content of the active metal, the nobel metal is calculated as simple substance, and the non-noble metal is calculated as oxide.

24. The catalyst according to solution 22, wherein the other metal is one or more of Pd, Ru, Re, Rh, Ir, and Os.

25. The catalyst according to solution 24, wherein in the catalyst, the content of said active metal is 0.1-10 wt %, preferably 0.5-8 wt %; the content of said support is 90-99.9 wt %, preferably 92-99.5 wt %.

26. The catalyst according to solution 25, wherein in the catalyst, the Pt content is 0.1-2 wt % for example 0.3-1.5 wt % or 0.5-1 wt %, the content of said other metal content is 0-9.9 wt % for example 0.1-2 or 0.2-1 wt % or 0.1-0.8 wt %, the content of said support is preferably 90-99.9 wt % for example 96-99.6 wt % or 98-99.5 wt % or 98.5-99.3 wt %.

27. The catalyst according to solution 22, wherein the other metal is one or more of Sn, V, Mo, Cr, Mn, Fe, Co, Ni, Cu, Ag, Ce, W, Cu, and Ca.

28. The catalyst according to solution 27, wherein in the catalyst, the Pt content is 0.1-10 wt %, the content of said other metal content is 0-15 wt %.

29. The catalyst according to solution 28, wherein in the catalyst, the Pt content is 0.1-2 wt % for example 0.5-1.5 wt %, the content of other metal is 0-15 wt % for example 1-10 wt % or 2-8 wt % or 3-7 wt %; the content of said support is preferably 85-99.9 wt % for example 90-99 wt % or 90-98 wt % or 92-97 wt %.

30. A catalyst for dehydrogenation of organic substance to produce hydrogen gas, comprising a support and a loaded active metal component, wherein said support is the support composition according to any of solutions 1-8 or the support composition prepared by the process according to any of solutions 9-20, the active metal comprises nickel, optionally other metal, said other metal is one or more of Zn, Sn, Cu, Fe, Ag, p, In, Re, Mo, Co, Ca, and W.

31. The catalyst according to solution 30, wherein in the catalyst, the mass fraction of said active metal is 5%-30%, the mass fraction of the support is 70-95%; the mass fraction of the support is preferably 75-90%, the mass fraction of the active metal is preferably 10%-25%.

32. The catalyst according to solution 30, wherein in the catalyst, the content of nickel as oxide is 5-25 wt %, preferably 6-20 wt % for example 7-15 wt % or 7-12 wt % or 8-11 wt %, the content of the other metal as oxide is 0-15 wt % preferably 0-10 wt % for example 0.5-8 wt % or 1-5 wt %.

33. The process for preparing the catalyst according to any of solutions 21-32, comprising:
(1) dissolving an active metal component precursor in water and impregnating a support to obtain a support impregnated with the active metal component precursor;
(2) Drying and calcining the support impregnated with the active metal component precursor;
Preferably, said support is the support composition according to any of solutions 1-8 or the support composition prepared by the process according to any of solutions 9-20.

34. The process for preparing the catalyst according to solution 33, wherein the active metal comprises a non-noble metal, and step (2) comprises: the support impregnated with the active component precursor is placed in an environment below −40° C. for 1 hour to 24 hours; and then it is vacuum-dried to remove the water adsorbed on the support, and then calcined to obtain the catalyst composition.

35. The process for preparing the catalyst according to solution 33, wherein said active metal component precursor is: one or more of metal nitrate, metal chloride, metal acetate, metal carbonate, metal acetate complex, metal hydroxide, metal oxalate complex, high-valent metal acid salt.

36. The process for preparing the catalyst according to solution 32, wherein for step 2 said calcining: the calcining temperature is 400-700° C., the calcining time is preferably 0.5-12 hours.

37. A process for using the catalytic composition, comprising a step of contacting an organic hydrogen-storage compound with said dehydrogenation catalyst according to any of solutions 21-32 or the dehydrogenation catalyst prepared by the process according to any of solutions 33-36 to perform the dehydrogenation reaction to produce hydrogen gas.

38. The process according to solution 37, wherein the dehydrogenation reaction temperature is 150-450° C., weight hourly space velocity 0.5-50 $h^{-1}$, reaction pressure 0.3-5 MPa, the contacting is performed in the presence or absence of hydrogen gas, hydrogen-to-oil ratio (the molar ratio of hydrogen gas introduced into the dehydrogenation reactor to organic hydrogen-storage compound) is 0-10.

39. The process according to solution 37, wherein the organic hydrogen-storage compound is saturated or unsaturated hydrocarbon containing cycloalkane ring(s), for example, the organic hydrogen-storage compound is one or more of cyclohexane, methyl cyclohexane, decahydronaphthalene, bi(cyclohexane), decahydrocarbazole, dodecahydroethylcarbazole, indoline, 4-aminopiperidine, piperidine-4-carboxamide, perhydro-4,7-phenanthroline, 2-methyl-1,2, 3,4-tetrahydroquinoline, 2,6-dimethyldecahydro-1,5-naphthyridine, 1,2-BN-cyclohexane, 3-methyl-1,2-BN-cyclopentane.

In addition, the present invention further provides the following technical solutions:

1. A process for providing a high-purity hydrogen gas, the process comprises: contacting and reacting an organic liquid hydrogen-storage material with a dehydrogenation catalyst to obtain a dehydrogenation reaction product containing hydrogen gas;

The dehydrogenation reaction product is cooled to obtain a liquid product and a hydrogen-rich gas product, and the liquid product is collected;

The hydrogen-rich gas is contacted with a hydrogen-storage alloy to obtain a hydrogen-containing alloy, and an unabsorbed gas is collected;

Optionally, an organic substance in the hydrogen-containing alloy storage container is removed;

The hydrogen-containing alloy is heated to release hydrogen gas to obtain the high purity hydrogen gas.

2. The process according to solution 1, wherein the hydrogen-rich gas is the hydrogen-rich gas product or a hydrogen gas-containing gas obtained by further separation of the hydrogen-rich gas product, and the process for the further separation includes temperature swing separation, membrane separation, pressure swing adsorption separation or a combination thereof.

3. The process according to solution 1 or 2, wherein the mass fraction of hydrogen gas in the hydrogen-rich gas is ≥80%, for example, 80-99%, preferably ≥85%, more preferably ≥90%.

4. The process according to solution 1, wherein the temperature for contacting said hydrogen-rich gas with the hydrogen-storage alloy is −70 to 100° C., preferably −50 to 90° C. more preferably −30 to 80° C.

5. The process according to solution 1, wherein, wherein the temperature for cooling the dehydrogenation reaction product is lower than the boiling temperature of the organic substance; preferably lower than the boiling temperature of the organic substance with the lowest boiling point among those being liquid at normal temperature and pressure.

6. The process according to any of solutions 1-5, wherein in case of contacting with the hydrogen-storage alloy, the temperature of the hydrogen-rich gas is lower than the boiling temperature of the organic liquid hydrogen-storage material under normal pressure.

7. The process according to solution 1 Wherein the number of the hydrogen-storage alloy(s) can be one or more, and a plurality of hydrogen-storage alloys can be used in a mixture, or can be used in series or in parallel or in combination of in series and in parallel; the preferred pressure for contacting the hydrogen-rich gas with the hydrogen-storage alloy is 0.001-5 MPa for example 0.01-5 MPa or 0.03-4 MPa or 0.05-5 MPa or 0.08-2 MPa or 0.005-3 MPa or 0.1-1 MPa.

8. The process according to solution 1, wherein contacting said hydrogen-rich gas with the hydrogen-storage alloy is performed in the hydrogen-storage alloy storage container(s), the number of hydrogen-storage alloy storage container(s) is one or more; the pressure for contacting the hydrogen-rich gas with the hydrogen-storage alloy is 0.05-5 MPa preferably 0.1-1 MPa;

In case of a plurality of hydrogen-storage alloy storage containers and in the presence of hydrogen-storage containers in series, preferably, in the hydrogen-rich gas stream direction, the contact pressure for finally contacting with the hydrogen-storage alloy is 0.05-5 MPa, preferably 0.1-1 MPa.

9. The process according to solution 1, wherein the number of the hydrogen-storage alloy storage container(s) is one or more, wherein according to the order of contacting with hydrogen gas, the hydrogen-storage alloy in the hydrogen-storage alloy storage container finally contacting with hydrogen gas is a hydrogen-storage alloy having a high equilibrium pressure, wherein the hydrogen-storage alloy having a high equilibrium pressure is such one that there is at least one temperature point between 150 and 450° C., and at this temperature point the equilibrium pressure for absorbing hydrogen gas is 35 MPa or higher; preferably the hydrogen-storage alloy in at least one hydrogen-storage alloy storage container is a hydrogen-storage alloy having a high equilibrium pressure.

10. The process according to solution 1, wherein the process further comprises the hydrogen-containing alloy is allowed to release hydrogen gas, and the released hydrogen contacts with different hydrogen-storage alloy(s) to form hydrogen-containing alloy(s), and this process is repeated once or multiple times, wherein the hydrogen-storage alloy used in at least the last repetition process is a hydrogen-storage alloy having a high equilibrium pressure.

11. The process according to any of solutions 1-10, wherein the hydrogen-storage alloy is one or more of rare earth-based $AB_5$ type, zirconium-titanium-based $AB_2$ type, titanium-based AB type, magnesium-based $A_2B$ type and vanadium-based solid solution type alloys.

12. The process according to solution 11, wherein the rare earth-based $AB_5$ type hydrogen-storage alloy specifically has the molecular formula of: $MmNi_{x1}Co_{x2}Mn_{x3}Fe_{x4}Al_{x5}Sn_{x6}$, wherein, $4.5 \leq x1+x2+x3+x4+x5+x6 \leq 5.5$, $3 \leq x1 \leq 5.5$, preferably $3 \leq x1 \leq 4.9$, $0 \leq x2 \leq 1.5$, preferably $0.1 \leq x2 \leq 1$, $0 \leq x3 \leq 0.8$, preferably $0.1 \leq x3 \leq 0.6$, $0 \leq x4 \leq 0.8$, preferably $0.1 \leq x4 \leq 0.6$, $0 \leq x5 \leq 0.75$, preferably $0 \leq x5 \leq 0.5$, $0 \leq x6 \leq 0.2$, preferably $0 \leq x6 \leq 0.15$; Mm is a mixed rare earth metal containing La, Ce, Pr, Nd, and Y with an expression formula of $Mm=La_{y1}Ce_{y2}Nd_{y3}Pr_{y4}Y_{y5}$, $y1+y2+y3+y4+y5=1$, $0.4 \leq y1 \leq 1$, preferably $0.45 \leq y1 \leq 0.8$, $0 \leq y2 \leq 0.45$, preferably $0.1 \leq y2 \leq 0.45$, $0 \leq y3 \leq 0.2$, $0 \leq y4 \leq 0.05$, $0 \leq y5 \leq 0.05$.

13. The process according to solution 11, wherein the zirconium-titanium-based $AB_2$ type hydrogen-storage alloy, wherein $A=Mg_{x1}Ca_{x2}Ti_{x3}Zr_{x4}Y_{x5}La_{x6}$, $x1+x2+x3+x4+x5+x6=0.9-1.1$, $0 \leq x1 \leq 1.1$, preferably $0.90 \leq x1 \leq 1.05$, $0 \leq x2 \leq 0.7$, preferably $0 \leq x2 \leq 0.25$, $0 \leq x3 \leq 1.05$, preferably $0.8 \leq x3 \leq 1$, $0 \leq x4 \leq 1.05$, preferably $0.85 \leq x4 \leq 1$, $0 \leq x5 \leq 0.2$, preferably $0 \leq x5 \leq 0.05$, $0 \leq x6 \leq 0.2$, preferably $0 \leq x6 \leq 0.05$, and $x3/(x3+x4) \geq 0.7$ or $x3/(x3+x4) \leq 0.3$; $B=V_{y1}Cr_{y2}Mn_{y3}Fe_{y4}Co_{y5}Ni_{y6}Cu_{y7}$, $y1+y2+y3+y4+y5+y6+y7=1.9-2.1$, $0 \leq y1 \leq 2.1$, preferably $0 \leq y1 \leq 1.8$, $0 \leq y2 \leq 2.1$, preferably $0 \leq y2 \leq 1.85$, $0 \leq y3 \leq 2.1$, preferably $0 \leq y3 \leq 2.05$, $0 \leq y4 \leq 1.6$, preferably $0 \leq y4 \leq 1.5$, $0 \leq y5 \leq 0.5$, preferably $0 \leq y5 \leq 0.3$, $0 \leq y6 \leq 0.5$, preferably $0 \leq y6 \leq 0.3$, $0 \leq y7 \leq 0.5$, preferably $0 \leq y7 \leq 0.2$, and $1.7 \leq y1+y2+y3+y4 \leq 2.1$.

14. The process according to solution 11, wherein the AB type hydrogen-storage alloy, wherein $A=Ti_{x1}Zr_{x2}Y_{x3}La_{x4}$, $x1+x2+x3+x4=0.85-1.1$, $0 \leq x1 \leq 1.1$, preferably $0.90 \leq x1 \leq 1.05$, $0 \leq x2 \leq 1.1$, preferably $0 \leq x2 \leq 0.5$, $0 \leq x3 \leq 0.2$, preferably $0 \leq x3 \leq 0.05$, $0 \leq x4 \leq 0.2$, preferably $0 \leq x4 \leq 0.05$; $B=V_{y1}Cr_{y2}Mn_{y3}Fe_{y4}Co_{y5}Ni_{y6}Cu_{y7}$, $y1+y2+y3+y4=0.95-1.05$, $0 \leq y1 \leq 0.5$, preferably $0 \leq y1 \leq 0.2$, $0 \leq y2 \leq 0.8$, preferably $0 \leq y2 \leq 0.2$, $0 \leq y3 \leq 0.8$, preferably $0.05 \leq y3 \leq 0.3$, $0 \leq y4 \leq 1.05$, preferably $0.7 \leq y4 \leq 1.05$, $0 \leq y5 \leq 0.35$, preferably $0 \leq y5 \leq 0.10$, $0 \leq y6 \leq 0.45$, preferably $0 \leq y6 \leq 0.20$, $0 \leq y7 \leq 0.3$, preferably $0 \leq y7 \leq 0.2$.

15. The process according to solution 11, wherein the vanadium-based solid solution type hydrogen-storage alloy, having a specific molecular formula of: $A_{x1}B_{x2}$, $x1+x2=1$, $0.85 \leq x1 \leq 0.95$, preferably $0.90 \leq x1 \leq 0.95$, $0.05 \leq x2 \leq 0.15$, preferably $0.05 \leq x2 \leq 0.10$; wherein $A=Ti_{y1}V_{y2}Zr_{y3}Nb_{y4}Y_{y5}La_{y6}Ca_{y7}$, $y1+y2+y3+y4+y5+y6+y7=1$, $0 \leq y1 \leq 0.9$, preferably $0 \leq y1 \leq 0.8$, $0 \leq y2 \leq 0.95$, preferably $0 \leq y2 \leq 0.95$, $0 \leq y3 \leq 0.90$, preferably $0 \leq y3 \leq 0.8$, $0 \leq y4 \leq 0.55$, preferably $0 \leq y4 \leq 0.4$, $0 \leq y5 \leq 0.2$, preferably $0.25 \leq y5 \leq 0.05$, $0 \leq y6 \leq 0.1$, preferably $0 \leq y6 \leq 0.05$, $0 \leq y7 \leq 0.1$, preferably $0 \leq y7 \leq 0.05$; $B=Mn_{z1}Fe_{z2}Co_{z3}Ni_{z4}$, $z1+z2+z3+z4=1$, $0 \leq z1 \leq 1$, preferably $0 \leq z1 \leq 0.95$, $0 \leq z2 \leq 0.95$, preferably $0 \leq z2 \leq 0.95$, $0.7 \leq z1+z2 \leq 1.0$, $0 \leq z3 \leq 0.3$, preferably $0 \leq z3 \leq 0.2$, $0 \leq z4 \leq 0.45$, preferably $0 \leq z4 \leq 0.3$.

16. The process according to solution 1 or 11, wherein the hydrogen-storage alloy is a combination of a first hydrogen-storage alloy and a second hydrogen-storage alloy; wherein, the first hydrogen-storage alloy is a magnesium-based $A_2B$ type hydrogen-storage alloy for contacting with the hydrogen-rich gas, the second hydrogen-storage alloy is used to pressurize a first hydrogen-storage hydrogen gas, and the second hydrogen-storage alloy is a hydrogen-storage alloy having a high equilibrium pressure.

17. The process according to solution 16, wherein the second hydrogen-storage alloy is one or more of rare earth-based $AB_5$ type, zirconium-titanium-based $AB_2$ type, titanium-based AB type alloys.

18. The process according to solution 1 or 16, wherein the hydrogen-rich gas is firstly passed through the first hydrogen-storage alloy for impurity separation; then the high-purity hydrogen gas released from the first hydrogen-storage alloy is contacted with the second hydrogen-storage alloy, and then the second hydrogen-storage alloy is allowed to release hydrogen gas under high pressure.

19. The process according to solution 16, wherein the hydrogen release temperature of the first hydrogen-storage alloy is higher than the hydrogen absorption temperature of the second hydrogen-storage alloy, and the temperature difference is preferably $\geq 100°$ C., preferably $350°$ C.$\geq$temperature difference$\geq 150°$ C.

20. The process according to solution 16, wherein the first hydrogen-storage alloy and the second hydrogen-storage alloy are in different hydrogen-storage alloy storage tanks, and there is a heat exchange system between the first hydrogen-storage alloy storage tank and the second hydrogen-storage alloy storage tank.

21. The process according to solution 16 or 17, wherein said $A_2B$ type first hydrogen-storage alloy, specifically having a molecular formula of: $A=Mg_{x1}Ca_{x2}Ti_{x3}La_{x4}Y_{x5}$, $x1+x2+x3=1.9-2.1$, $1.5 \leq x1 \leq 2.1$, preferably $1.70 \leq x1 \leq 2.05$, $0 \leq x2 \leq 0.5$, preferably $0 \leq x2 \leq 0.2$, $0 \leq x3 \leq 0.8$, preferably $0 \leq x3 \leq 0.50$; $B=Cr_{y1}Fe_{y2}Co_{y3}Ni_{y4}Cu_{y5}Mo_{y6}$, $y1+y2+y3+y4+y5+y6=0.9-1.1$, $0 \leq y1 \leq 0.30$, preferably $0 \leq y1 \leq 0.2$, $0 \leq y2 \leq 0.20$, preferably $0 \leq x2 \leq 0.10$, $0 \leq y3 \leq 1.1$, preferably $0 \leq y3 \leq 1$, $0 \leq y4 \leq 1.1$, preferably $0 \leq y4 \leq 1.05$, $0 \leq y5 \leq 0.4$, $0 \leq y6 \leq 0.15$, preferably $0 \leq y6 \leq 0.10$;

Said $AB_5$ type second hydrogen-storage alloy, specifically has the molecular formula of: $MmNi_{x1}Co_{x2}Mn_{x3}Fe_{x4}Al_{x5}Sn_{x6}$, wherein, $4.5 \leq x1+x2+x3+x4+x5+x6 \leq 5.5$, $3 \leq x1 \leq 5.5$, preferably $3 \leq x1 \leq 4.9$, $0 \leq x2 \leq 1.5$, preferably $0.1 \leq x2 \leq 1$, $0 \leq x3 \leq 0.8$, preferably $0.1 \leq x3 \leq 0.6$, $0 \leq x4 \leq 0.8$, preferably $0.1 \leq x4 \leq 0.6$, $0 \leq x5 \leq 0.75$, preferably $0 \leq x5 \leq 0.5$, $0 \leq x6 \leq 0.2$, preferably $0 \leq x6 \leq 0.15$; Mm is a mixed rare earth metal containing La, Ce, Pr, Nd, and Y with an expression formula of Mm=La$y1$Ce$y2$Nd$y3$Pr$y4$Y$y5$, $y1+y2+y3+y4+y5=1$, $0.4 \leq y1 \leq 1$, preferably $0.4 \leq y1 \leq 0.8$, $0 \leq y2 \leq 0.45$, preferably $0.1 \leq y2 \leq 0.45$, $0 \leq y3 \leq 0.2$, $0 \leq y4 \leq 0.05$, $0 \leq y5 \leq 0.05$;

The zirconium-titanium-based $AB_2$ type alloy, the second hydrogen-storage alloy, wherein A=Mg$x1$C-a$x2$Ti$x3$Zr$x4$Y$x5$La$x6$, $x1+x2+x3+x4+x5+x6=0.9-1.1$, $0 \leq x1 \leq 1.1$, preferably $0.90 \leq x1 \leq 1.05$, $0 \leq x2 \leq 0.7$, preferably $0 \leq x2 \leq 0.25$, $0 \leq x3 \leq 1.05$, preferably $0.8 \leq x3 \leq 1$, $0 \leq x4 \leq 1.05$, preferably $0.85 \leq x4 \leq 1$, $0 \leq x5 \leq 0.2$, preferably $0 \leq x5 \leq 0.05$, $0 \leq x6 \leq 0.2$, preferably $0 \leq x6 \leq 0.05$, and $x3/(x3+x4) \geq 0.7$ or $x3/(x3+x4) \leq 0.3$; B=V$y1$Cr$y2$Mn$y3$Fe$y4$Co$y5$Ni$y6$Cu$y7$, $y1+y2+y3+y4+y5+y6+y7=1.9-2.1$, $0 \leq y1 \leq 2.1$, preferably $0 \leq y1 \leq 1.8$, $0 \leq y2 \leq 2.1$, preferably $0 \leq y2 \leq 1.85$, $0 \leq y3 \leq 2.1$, preferably $0 \leq y3 \leq 2.05$, $0 \leq y4 \leq 1.6$, preferably $0 \leq y4 \leq 1.5$, $0 \leq y5 \leq 0.5$, preferably $0 \leq y5 \leq 0.3$, $0 \leq y6 \leq 0.5$, preferably $0 \leq y6 \leq 0.3$, $0 \leq y7 \leq 0.5$, preferably $0 \leq y7 \leq 0.2$, and $1.7 \leq y1+y2+y3+y4 \leq 2.1$;

The titanium-based AB type alloy, the second hydrogen-storage alloy, wherein A=Ti$x1$Zr$x2$Y$x3$La$x4$, $x1+x2+x3+x4=0.85-1.1$, $0 \leq x1 \leq 1.1$, preferably $0.90 \leq x1 \leq 1.05$, $0 \leq x2 \leq 1.1$, preferably $0 \leq x2 \leq 0.5$, $0 \leq x3 \leq 0.2$, preferably $0 \leq x3 \leq 0.05$, $0 \leq x4 \leq 0.2$, preferably $0 \leq x4 \leq 0.05$; B=V$y1$Cr$y2$Mn$y3$Fe$y4$Co$y5$Ni$y6$Cu$y7$, $y1+y2+y3+y4=0.95-1.05$, $0 \leq y1 \leq 0.5$, preferably $0 \leq y1 \leq 0.2$, $0 \leq y2 \leq 0.8$, preferably $0 \leq y2 \leq 0.2$, $0 \leq y3 \leq 0.8$, preferably $0.05 \leq y3 \leq 0.3$, $0 < y4 \leq 1.05$, preferably $0.7 \leq y4 \leq 1.05$, $0 \leq y5 \leq 0.35$, preferably $0 \leq y5 \leq 0.10$, $0 \leq y6 \leq 0.45$, preferably $0 \leq y6 \leq 0.20$, $0 \leq y7 \leq 0.3$, preferably $0 \leq y7 \leq 0.2$.

22. The process according to solution 16, wherein the temperature for contacting the hydrogen-rich gas with the first hydrogen-storage alloy is 20-150° C., the hydrogen gas partial pressure is 0.001-0.1 MPa; the temperature for the first hydrogen-storage alloy releasing hydrogen gas (hydrogen release temperature) is 150-450° C., the hydrogen gas partial pressure for the hydrogen release is 0.1-5 MPa.

23. The process according to solution 16 or 22, wherein the hydrogen absorption temperature of the second hydrogen-storage alloy is −70 to 100° C., the hydrogen gas partial pressure of the hydrogen absorption is 0.1-5 MPa, the hydrogen release temperature of the second hydrogen-storage alloy is 150-450° C., the hydrogen partial pressure of the hydrogen release $\geq 35$ MPa for example 35-100 MPa.

24. The process according to solution 16 or 22, wherein the hydrogen absorption temperature for contacting the hydrogen-rich gas with the first hydrogen-storage alloy is preferably 50-100° C., the hydrogen gas partial pressure is preferably 0.001-0.03 MPa; the hydrogen release temperature of the first hydrogen-storage alloy is preferably 200-350° C., the hydrogen gas partial pressure of the hydrogen release is preferably 0.1-1 MPa; the hydrogen absorption temperature for the second hydrogen-storage alloy absorbing hydrogen gas is preferably-30 to 100° C., the hydrogen gas partial pressure of the hydrogen absorption is preferably 0.1-1 MPa, the hydrogen release temperature of the second hydrogen-storage alloy is preferably 200-350° C., the hydrogen partial pressure of the hydrogen release is preferably $\geq 35$ MPa.

25. The process according to solution 1, wherein the temperature for the hydrogen-storage alloy releasing hydrogen gas (the temperature for heating the hydrogen-storage alloy, abbreviated as hydrogen release temperature) is 150-450° C., the pressure of the released hydrogen gas is $\geq 35$ MPa for example 35-100 MPa in order to obtain a high-purity and high-pressure hydrogen, or the hydrogen gas partial pressure for the hydrogen release is 0.1-5 MPa in order to obtain a high purity hydrogen gas, wherein the hydrogen release temperature is higher than the hydrogen absorption temperature.

26. The process according to solution 1, wherein the organic substance in the hydrogen-containing alloy is removed by a purge process; the purge is performed with hydrogen gas, for example the process is as follows: after the hydrogen-storage alloy reaches a predetermined adsorption capacity, the supply of a hydrogen-rich gas to the hydrogen-storage alloy is stopped, a hydrogen gas is passed through the hydrogen-containing alloy, the organic gas in the hydrogen-containing alloy and (also known as hydrogen-storage alloy storage container) is taken out, and introduced into a storage tank for storage or absorbed by the hydrogen-storage alloy in other hydrogen-storage alloy storage containers; wherein preferably, the purity of the hydrogen gas for purge is greater than 90 wt %, more preferably greater than 95 wt %, for example greater than 99 wt %.

27. The process according to solution 1, wherein the reaction temperature for contacting and reacting the organic liquid hydrogen-storage material with the dehydrogenation catalyst is 150-450° C., preferably 200-400° C., more preferably 300-350° C.

28. The process according to solution 1, wherein the weight hourly space velocity for contacting the organic liquid hydrogen-storage material with the dehydrogenation catalyst is 0.5-50 h$^{-1}$, preferably 1-45 h$^{-1}$ more preferably 2-30 h$^{-1}$.

29. The process according to solution 1, wherein the pressure for contacting and reacting the organic liquid hydrogen-storage material with the dehydrogenation catalyst is 0.03-5 MPa or 0.3-5 MPa, preferably 0.1-3 MPa for example 0.5-2 MPa or 0.2-1.6 MPa.

30. The process according to solution 1, wherein the organic liquid hydrogen-storage material is mixed with hydrogen gas and then contacted with the dehydrogenation catalyst, and the hydrogen-to-hydrocarbon ratio (the molar ratio of hydrogen gas to the organic liquid hydrogen-storage material) is 0-10.

31. The process according to solution 1, wherein the organic liquid dehydrogenation reaction in the presence or absence of hydrogen gas, the organic liquid dehydrogenation reaction temperature is 150-450° C., the weight hourly space velocity 0.5-50 h$^{-1}$, the reaction pressure 0.3-5 MPa, the hydrogen-to-hydrocarbon ratio is 0-10 molar ratio, the preferred reaction temperature is 200-400° C., the weight hourly space velocity 1-30 h, the hydrogen-to-hydrocarbon ratio is 0-8 molar ratio.

32. The process according to solution 1, wherein the dehydrogenation catalyst is a metal-loaded type catalyst, the metal-loaded type catalyst comprise a support and a loaded active metal component, said support, said active metal preferably comprises one or more of Group VIII metals; more preferably, the active metal component contains a first active metal and an optional second active metal, said first active metal is one or more of Pt, Pd, Ru, Rh, and Ir, said second active metal is one or more of Ni, Re, Sn, Mo, Cu, Fe, Ca, Co, and W, said second active metal is preferably one or more of Ni, Re, and Sn; more preferably, the first active metal comprises Pt;

or,

The dehydrogenation catalyst includes a support and a loaded active metal component. The support is selected from one or more of alumina, silica, titanium dioxide, zirconium oxide, activated carbon, and silicon aluminum materials, and the active metal is selected from at least two metals of Ni, Zn, Sn, Cu, Fe, Ag, p, In, Re, Mo, Co, Ca, and W, and more preferably two or more of Ni, Zn, Sn, and Cu, or the active metal includes Ni and one or more selected from Zn, Sn, Cu, Fe, Ag, p, In, Re, Mo, Co, Ca, and W.

33. The process according to solution 32, wherein the mass fraction of the support in the dehydrogenation catalyst is 70-99.9%, and the mass fraction of the metal component is 0.1-30%.

34. The process according to solution 1, wherein the dehydrogenation catalyst includes a support and an active metal component, and the support is a support composition, and the support composition includes alumina and a modified metal oxide, the modified metal oxide is titanium oxide and/or zirconium oxide, wherein the modified metal oxide has η<0.3, where η= the content by weight percent of the crystal phase of the modified metal oxide in the support composition/the content by weight percent of the chemical composition of the modified metal oxide in the support composition, titanium oxide is calculated as $TiO_2$, and zirconium oxide is calculated as $ZrO_2$.

35. The process according to solution 34, wherein the support composition has η=0, preferably, the first metal oxide in a monolayer is dispersed on the alumina substrate.

36. The process according to solution 34, wherein in said support composition, the mass fraction of alumina is 80-98.5%, preferably 83-97.5% or 85-95% or 90-95%; the mass fraction of the modified metal oxide is 1.5-20%, preferably 2.5-17% or 5-15%, or 5-10%.

37. The process according to solution 34, wherein the modified metal oxide comprises titanium oxide, wherein preferably, in the support composition, the mass fraction of titanium dioxide preferably 2-20% for example 5-15% or 5-10% or 2.5-17%, the mass fraction of zirconium dioxide preferably 0-8% for example 0-6% or 0-3% or 1-6%.

38. The process according to solution 34, wherein relative to the pure phase of $TiO_2$, in the XPS spectrum of the support composition, there is a shift for the Ti $2P_{3/2}$ orbital electron binding energy, the peak having the binding energy of 458.8 eV is shifted by 0.6-0.7 eV to a higher binding energy and reaches 459.4-459.5 eV, and/or a peak at the Ti $2P_{1/2}$ orbital electron binding energy of 464.5 eV is shifted by 0.8-0.9 eV to a higher binding energy and reaches 465.3-465.4 eV.

39. The process according to solution 34, wherein the oxide substrate has at least one phase structure of γ-alumina, η-alumina, ρ-alumina or χ-alumina.

40. The process according to solution 34, wherein the support composition has a specific surface area of 100-350 m²/g.

41. The process according to solution 34, wherein said support composition has a pore volume of 0.3-1.3 ml/g.

42. The process according to solution 1 or 34, wherein said dehydrogenation catalyst comprises a support containing alumina and a modified metal oxide, and an active metal component, the modified metal oxide is titanium oxide and/or zirconium oxide; the active metal component is an oxide of active metal and/or a simple substance of active metal. Said active metal is for example one or more of VIIIB group metal, VIIB group metal, VB group metal, VIB group metal, IB group metal, rare earth element, alkaline earth metal, IVA group metal;

Preferably, the active metal comprises Pt and/or Ni, optionally other element; preferably, the other element is one or more of V, Cr, Mn, Fe, Co, Ni, Cu, Ag, Ce, W, Mo, Sn, Ca, Pt, Pd, Ru, Re, Rh, Ir, Os, Zn, P, and In.

43. The process according to solution 42, wherein the active metal comprises Pt, optionally other metal, the other metal can be a noble metal or a non-noble metal, said other metal is one or more of Pd, Ru, Re, Rh, Ir, Os, Sn, V, Mo, Cr, Mn, Fe, Co, Ni, Cu, Ag, Ce, W, Cu, and Ca.

44. The process according to solution 42, wherein in said dehydrogenation catalyst, the content of active metal is 0.1-20 wt % for example 0.1-15 wt %, the content of the support is 75-99.9 wt %, the content of Pt is 0.1-10 wt %; In the composition of the dehydrogenation catalyst of the present invention, for the content of the active metal, the nobel metal is calculated as simple substance, and the non-noble metal is calculated as oxide.

45. The process according to solution 43, wherein the other metal is one or more of Pd, Ru, Re, Rh, Ir, and Os.

46. The process according to solution 43, wherein in said dehydrogenation catalyst, the content of said active metal is 0.1-10 wt %, preferably 0.5-8 wt %; the content of said support is 90-99.9 wt %, is preferably 92-99.5 wt %.

47. The process according to solution 43, wherein in the catalyst, the Pt content is 0.1-2 wt % for example 0.3-1.5 wt % or 0.5-1 wt %, the content of said other metal content is 0-9.9 wt % for example 0.1-2 or 0.2-1 wt % or 0.1-0.8 wt %, the content of said support is preferably 90-99.9 wt % for example 96-99.6 wt % or 98-99.5 wt % or 98.5-99.3 wt %.

48. The process according to solution 43, wherein the other metal element is one or more of Sn, V, Mo, Cr, Mn, Fe, Co, Ni, Cu, Ag, Ce, W, Cu, and Ca.

49. The process according to solution 43, wherein in the catalyst, the Pt content is 0.1-10 wt %, the content of said other metal content is 0-15 wt %.

50. The process according to solution 43, wherein in the catalyst, the Pt content is 0.1-2 wt % for example 0.5-1.5 wt %, the content of other metal is 0-15 wt % for example 1-10 wt % or 2-8 wt % or 3-7 wt %; the content of said support is preferably 85-99.9 wt % for example 90-99 wt % or 90-98 wt % or 92-97 wt %.

51. The process according to solution 34, wherein the active metal comprises nickel, and optionally other metal, said other metal is one or more of Zn, Sn, Cu, Fe, Ag, p, In, Re, Mo, Co, Ca, and W.

52. The process according to solution 51, wherein in the catalyst, the mass fraction of said active metal is 5%-30%, the mass fraction of the support is 70-95%; the mass fraction of the support is preferably 75-90%, the mass fraction of the active metal is preferably 10%-25%.

53. The process according to solution 51, wherein in the catalyst, the content of nickel as oxide is 5-25 wt %, preferably 6-20 wt % for example 7-15 wt % or 7-12 wt % or 8-11 wt %, the content of the other metal as oxide is 0-15 wt % preferably 0-10 wt % for example 0.5-8 wt % or 1-5 wt %.

54. The process according to solution 1, wherein the organic liquid hydrogen-storage material is a saturated and/or unsaturated hydrocarbon containing cycloalkane ring(s) and optionally containing heteroatom(s), and the heteroatom-containing organic hydrogen-storage compound is an organic substance obtained by the substitution of a hydrocarbon containing cycloalkane ring(s) by heteroatom(s), in which the heteroatom substitution occurs on the cycloalkane ring. Among them, the organic liquid hydrogen-storage materials are preferably saturated or unsaturated hydrocarbons containing no heterocyclic atom and containing cycloalkane ring(s). More preferably saturated or unsaturated hydrocarbon containing no heterocyclic atom and having the total ring number of aromatic rings and cycloalkanes of 2 or less;

More further preferably, the organic hydrogen-storage material is saturated or unsaturated hydrocarbon containing no heterocyclic atom and having the total ring number of aromatic rings and cycloalkanes of 2 or less; Saturated and unsaturated hydrocarbons containing no heteroatom and containing cycloalkane ring(s) comprise one or more of cyclohexane, methylcyclohexane, decahydronaphthalene, and bi(cyclohexane); Heteroatom-containing saturated or unsaturated hydrocarbons containing cycloalkane ring(s) comprise: nitrogen-containing heterocyclic compound and nitrogen/boron-containing heterocyclic compound, for example nitrogen-containing heterocyclic compound comprises one or more of decahydrocarbazole, dodecahydroethylcarbazole, indoline, 4-aminopiperidine, piperidine-4-carboxamide, perhydro-4,7-phenanthroline, 2-methyl-1,2,3,4-tetrahydroquinoline, 2,6-dimethyldecahydro-1,5-naphthyridine; unsaturated hydrocarbons containing nitrogen/boron heteroatom comprise: one or more of 1,2-BN-cyclohexane, and 3-methyl-1,2-BN-cyclopentane.

55. The process according to solution 1, characterized by further comprising introducing the released hydrogen gas into a hydrogen gas storage tank to store the hydrogen gas; or the obtained high-purity high-pressure hydrogen gas can be directly used to refuel a hydrogen fuel cell vehicle.

56. A high-efficiently distributed process for producing high-purity and high-pressure hydrogen gas, the process comprising:

In a dehydrogenation reactor, a liquid organic hydrogen-storage material is subjected to dehydrogenation reaction in the presence of a dehydrogenation catalyst to obtain a dehydrogenation reaction product including hydrogen gas;

In a cooling separation apparatus, the dehydrogenation reaction product is cooled and separated to obtain a hydrogen-rich stream and an organic liquid;

In a hydrogen-storage alloy storage container, a hydrogen-rich stream or a purified hydrogen-rich stream is contacted with the hydrogen-storage alloy to obtain a hydrogen-containing alloy;

Purging with hydrogen gas removes an organic substance in the hydrogen-storage alloy storage container; wherein the purity of the hydrogen gas for purge is preferably greater than 90 wt %, more preferably greater than 95 wt %;

The hydrogen-containing alloy is heated to release hydrogen gas to obtain a high-pressure hydrogen gas and supply the obtained high-pressure hydrogen gas to a hydrogen-consuming apparatus or a high-pressure hydrogen gas storage tank for storage.

57. A system for providing a high-purity and high-pressure hydrogen gas, comprising:

An organic liquid hydrogen-storage material storage and supply apparatus, used to store an organic liquid hydrogen-storage material and provide the organic liquid hydrogen-storage material to a dehydrogenation reactor;

A dehydrogenated liquid storage apparatus, used to store the liquid product obtained after the dehydrogenation of the organic liquid hydrogen-storage material;

A dehydrogenation reactor apparatus, used for the dehydrogenation reaction of the organic liquid hydrogen-storage material under the action of the dehydrogenation catalyst to obtain a dehydrogenation reaction product including hydrogen gas;

A cooling separation apparatus, used to separate the dehydrogenation reaction product to obtain a hydrogen-rich gas product and a liquid product;

A hydrogen-storage & hydrogen-supply apparatus, which includes a hydrogen-storage alloy storage container and a hydrogen-storage alloy heating system, used to contact the hydrogen-rich gas with the hydrogen-storage alloy to adsorb hydrogen gas at low temperature and low pressure, and heat to dehydrogenate after the adsorption is saturated;

Optionally, a purge apparatus, used to remove organic substance(s) in the hydrogen-storage container;

A hydrogen gas supply apparatus, supplying a high-pressure hydrogen to the hydrogen-consuming apparatus or the hydrogen gas storage tank.

58. The system according to solution 57, wherein the system is configured to be integrated and built in a cargo container, and used as a cargo container-type hydrogen production system in a hydrogen refueling station, or directly built in a hydrogen refueling station for use.

59. The system according to solution 57, wherein the hydrogen-storage & hydrogen-supply apparatus comprises one or more hydrogen-storage alloy storage containers, a plurality of hydrogen-storage alloy storage containers can be connected in parallel or in series or in combination of in series and in parallel.

60. The system according to any of solutions 57-59, wherein at least one of the hydrogen-storage alloy storage containers is a high-pressure-resistant container and/or the hydrogen gas supply apparatus is a high-pressure-resistant apparatus. Preferably, its tolerance pressure is 35 MPa or more.

61. A mobile hydrogen supply system comprising a transportation vehicle and the system for providing high-purity hydrogen gas according to any of solutions 57-60 arranged on the transportation vehicle.

61. A distributed hydrogen supply apparatus, comprising the system for providing high-purity hydrogen gas according to any of solutions 57-60 and optionally comprising a high-pressure hydrogen gas storage tank.

EXAMPLES

The following examples will further illustrate the present invention, but they should not be used to limit the present invention.

Materials and Testing Methods

SB powder: Deutschland Sasol company, solid content 75 wt %.

P25 (titanium dioxide): Deutschland Degussa company, solid content 98 wt %.

Metal acid salts and metal salts were purchased from Sinopharm Chemical Reagent Beijing Co., Ltd.

Organic liquid hydrogen-storage materials were purchased from J&K Scientific Co., Ltd.

In each of examples and comparative examples, the compositions of the loaded-type organic liquid dehydrogenation catalysts were determined by X-ray fluorescence method, and the dehydrogenation products of the organic liquid hydrogen-storage materials were obtained by chromatographic analysis. The purity of hydrogen gas was analyzed by gas chromatography.

The organic liquid dehydrogenation experiments of the examples and the comparative examples of the present invention were carried out in a fixed bed reactor.

For separation, a cooling medium was used to conduct the cooling and separation, the hydrogen-storage container was connected after the separation system, the energy delivery medium was hot water or hot water vapor, and the water vapor was generated by the water vapor generator.

In the following examples, in the preparation of the support for the dehydrogenation catalyst of the organic liquid hydrogen-storage material, the content by percent of the crystal phase of the modified metal oxide was measured by the following process:

Philips XRG3100 generator equipped with a long fine focus copper X-ray source powered at 40 kV and 30 mA, Philips3020 digital goniometer, Philips3710MPD control computer and Kevex PSI Peltier cooled silicon detector were used for all X-ray diffraction measurements. Kevex4601 ion pump controller, Kevex4608Peltier power supply, Kevex4621 detector bias, Kevex4561A pulse processor and Kevex4911-A single-channel analyzer was used to operate Kevex detector. Philips APD4.1C version software was used to obtain diffraction patterns. All rietveld calculations were performed using Material Data, Inc. Riqas 3.1C version software (Qutokumpu HSC Chemistry for Windows; User Guide, Qutokumpo Resarch Oy, Pori, Finland (1999)).

In the following examples, XPS experiments were performed on Thermo Fisher company's ESCALab250 type X-ray photoelectron spectroscopy. The excitation source was a monochromatic Al K α X-ray with an energy of 1486.6 eV and a power of 150 W. The transmission energy used for narrow scanning was 30 eV The base vacuum during analysis was about 6.5*10-10 mbar. The binding energy was corrected by the C1s peak (284.8 eV) of contaminated carbon. The content by weight percent of the modified metal oxide on the surface of the support composition was determined by measuring 10 sample particles and taking the average value.

In the following examples, the specific surface area and the pore volume were determined by the static cryosorption capacity method (according to GB/T5816-1995) using an automatic adsorption apparatus of ASAP 2400 type, from Micromeritics Instruments USA, and the specific method was as follows: the object to be detected was vacuumized and degassed for 4 hours at 250° C. and 1.33 Pa, and contacted with nitrogen serving as adsorbate at −196° C. until the static adsorption reached the adsorption balance, the amount of nitrogen adsorbed by the adsorbent was calculated by the difference between the nitrogen gas intake amount and the amount of nitrogen remaining in the gas phase after adsorption, and then the specific surface area and the pore volume were calculated by the BET equation.

Preparation of the Support for the Dehydrogenation Catalyst of the Organic Liquid Hydrogen-Storage Material Support Example 1

The SB powder was calcined at 500° C. for 4 hours to obtain γ-$Al_2O_3$. The specific surface area of γ-$Al_2O_3$ was 176 $m^2$/g and the pore volume was 0.48 mL/g.

The above γ-$Al_2O_3$ (500 g) was placed in a fluidized reactor (the inner diameter. 10 cm, the height: 40 cm), titanium tetrachloride was placed in a constant temperature bath at 20° C., nitrogen gas (25° C.) was introduced through titanium tetrachloride at a flow rate of 10 L/min and then into the fluidized reactor from the bottom of the fluidized reactor, the introduction of nitrogen gas through the titanium tetrachloride bath was terminated after the fluidization was performed for 1 hour; nitrogen gas (25° C.) was introduced through deionized water (placed in a constant temperature bath at 50° C.) at a flow rate of 10 L/min and then into the fluidized reactor from the bottom of the fluidized reactor, the fluidization was performed for 4 hour for hydrolysis to obtain a hydrolyzed support. The hydrolyzed support was calcined in an air atmosphere at 550° C. for 4 hours to obtain the final support, which was named support 1. The support composition and support properties were shown in Table 1; and its X-ray diffraction (XRD) spectrum was shown as "1" in FIG. 1.

Support Examples 2-8

Supports 2-8 were prepared in the same way as support 1 in Support Example 1, except for the time for which titanium tetrachloride was carried by nitrogen gas into the fluidized bed, and the hydrolysis time for which nitrogen gas was introduced into deionized water. The support preparation conditions, support composition and support properties were shown in Table 1.

Support Examples 9-11

Supports 9-11 were prepared in the same way as support 1 in Support Example 1, except that nitrogen gas was firstly passed through titanium tetrachloride, and then through zirconium tetrachloride steam generator (its temperature was 300° C.). The support preparation conditions, support composition and support properties were shown in Table 1.

Support Comparative Example 1

SB powder was calcined at 500° C. for 4 hours directly to obtain γ-$Al_2O_3$, and the support was named support C1. The support composition and support properties were shown in Table 1.

Support Comparative Example 2

The support was prepared by referring to the process of Support Example 1, except that the γ-$Al_2O_3$ obtained by calcining SB powder at 500° C. for 4 hours was physically mixed with $TiO_2$, and the support was named support C2. The support composition and support properties were shown in Table 1; and its X-ray diffraction (XRD) spectrum was shown as "2" in FIG. 1.

Support Comparative Example 3

The support was prepared by referring to the process of Support Comparative Example 2, and the support was named support C3. The support composition and support properties were shown in Table 1.

Support Comparative Example 4

The support was prepared by referring to the process of Support Example 6, except that the support γ-$Al_2O_3$ obtained by calcining SB powder at 500° C. for 4 hours was physically mixed with an aqueous titanium tetrachloride solution, and the support was named support C4. The support composition and support properties were shown in Table 1.

Support Comparative Example 5

The support was named support C5. The support composition and support properties were shown in Table 1; and its X-ray diffraction (XRD) spectrum was shown as "5" in FIG. 1.

Support Comparative Example 6

The support was prepared by referring to the formulation of Support Example 9, except that the γ-$Al_2O_3$ obtained by calcining SB powder at 500° C. for 4 hours was physically mixed with TiO₂ and ZrO₂. The support was named support C6. The support composition and support properties were shown in Table 1.

Support Comparative Example 7

The support was prepared by referring to Support Comparative Example 6, and the support was named support C7. The support composition and support properties were shown in Table 1.

The properties of the supports prepared in Support Examples 1-11 and Support Comparative Examples 1-7 were shown in Table 1.

Preparation and Evaluation of the Dehydrogenation Catalyst of the Organic Liquid Hydrogen-Storage Material Example 1

0.34 g of chloroplatinic acid and water were prepared into 20 mL of impregnation liquor. The impregnation liquor was slowly added to 19.84 g of support 1 with stirring while adding to ensure that the impregnation liquor was uniformly loaded on the composite oxide support.

The impregnation temperature was 25° C., the impregnated solid was dried for 3 hours under purge at 120° C., and then calcined in air. The calcining temperature was 600° C., the air-to-catalyst ratio (air/solid volume ratio) during calcining was 600:1, and the calcining time was 4 hours, and a catalyst was finally obtained. The composition of the catalyst was listed in Table 2.

The dehydrogenation reaction of methylcyclohexane was performed in a fixed bed reactor to evaluate the above-prepared catalyst. The dehydrogenation reaction was carried out in a fixed bed microreactor. The evaluation conditions were: reaction temperature 350° C., reaction pressure (reactor inlet pressure) 1 MPa, make-up hydrogen flow rate 150 mL/minH2, methylcyclohexane feedstock 2 mL/min, and catalyst loading 20 g. The evaluation results of the catalyst were listed in Table 2, wherein the conversion rate=reacted methylcyclohexane/total methylcyclohexane feedstock; the selectivity=toluene-produced methylcyclohexane/reacted methylcyclohexane.

Example 5

In a manner similar to Example 1, chloroplatinic acid, nickel nitrate and water were prepared into 20 mL of impregnation liquor. The impregnation liquor was slowly added to 19.7 g of support 1 with stirring while adding to ensure that the impregnation liquor was uniformly loaded on the composite oxide support. The impregnation temperature was 25° C., the impregnated solid was dried for 3 hours under purge at 120° C., and then calcined in air. The calcining temperature was 600° C., the air-to-catalyst ratio (air/solid volume ratio) during calcining was 600:1, and the calcining time was 4 hours, and a catalyst was finally obtained.

The composition of the catalyst was listed in Table 2.

The dehydrogenation reaction of methylcyclohexane was performed in a fixed bed reactor to evaluate the above-prepared catalyst. The dehydrogenation reaction was carried out in a fixed bed microreactor. The evaluation conditions were: reaction temperature 350° C., reaction pressure (reactor inlet pressure) 1 MPa, make-up hydrogen flow rate 150 mL/minH2, methylcyclohexane feedstock 2.5 mL/min, and catalyst loading 20 g. The evaluation results of the catalyst were listed in Table 2, wherein the conversion rate=reacted methylcyclohexane/total methylcyclohexane feedstock; the selectivity=toluene-produced methylcyclohexane/reacted methylcyclohexane.

Example 10

Nickel nitrate, tin chloride and water were prepared into 20 mL of impregnation liquor. The impregnation liquor was slowly added to 17.8 g of support 1 with stirring while adding to ensure that the impregnation liquor was uniformly loaded on the composite oxide support.

The impregnation temperature was 25° C., the impregnated solid was dried for 3 hours under nitrogen purge at 120° C., and then calcined in air. The calcining temperature was 600° C., the air-to-catalyst ratio (air/solid volume ratio) during calcining was 600:1, and the calcining time was 4 hours, and a catalyst was finally obtained. The composition of the catalyst was listed in Table 2.

The dehydrogenation reaction of methylcyclohexane was performed in a fixed bed reactor to evaluate the above-prepared catalyst. The dehydrogenation reaction was carried out in a fixed bed microreactor. The evaluation conditions were: reaction temperature 400° C., reaction pressure (reactor inlet pressure) 1 MPa, make-up hydrogen flow rate 150 mL/minH2, methylcyclohexane feedstock 1.0 mL/min, and catalyst loading 20 g. The evaluation results of the catalyst were listed in Table 2, wherein the conversion rate=reacted methylcyclohexane/total methylcyclohexane feedstock; the selectivity=toluene-produced methylcyclohexane/reacted methylcyclohexane.

Examples 2, 4, 7-9 and 12-39 and Comparative Examples 1-17

According to Example 1, 5 or 10, the catalysts were prepared by impregnation process. The catalyst formula were shown in Table 2. The support was calculated on dry basis (calcined at 800° C. for 1 hour), platinum (Pt) was calculated on dry basis of simple substance, palladium (Pd) was calculated on dry basis of simple substance, iridium (Ir) was calculated on dry basis of simple substance, rhenium (Re) was calculated on dry basis of simple substance, nickel (Ni) was calculated as NiO, tin (Sn) was calculated as SnO2, zinc (Zn) was calculated as ZnO, copper (Cu) was calculated as CuO, iron (Fe) was calculated as Fe2O3, silver (Ag) was calculated as AgO, phosphorus (P) was calculated as P2O5, and manganese (Mn) was calculated as MnO2.

According to the evaluation method of Example 1, 5 or 10, the prepared catalysts were evaluated, and the evaluation conditions were as follows: reaction pressure (reactor inlet pressure) 1 MPa, and catalyst loading amount 20 grams; reaction temperature, make-up hydrogen flow rate, and methylcyclohexane feedstock were listed in Table 2.

Examples 3, 6 and 11

The catalysts of Examples 3, 6 and 11 were prepared according to the process of Examples 2, 5 and 10 respectively, except that the impregnated solid was frozen at −45° C. for 10 hours, and then dried at −5° C., under 0.1 atm (absolute pressure) vacuum condition, and then the calcining was performed.

According to the evaluation method of Example 1, the prepared catalysts were evaluated, and the evaluation conditions were as follows: reaction pressure (reactor inlet pressure) 1 MPa, and catalyst loading amount 20 grams;

reaction temperature, make-up hydrogen flow rate, and methylcyclohexane feedstock were listed in Table 2.

The dehydrogenation catalyst provided by the present invention could have higher conversion activity than the dehydrogenation catalyst prepared by the existing process. Under the same reaction conditions, it had a higher hydrogen generation rate. Using freezing and vacuum drying processes, the activity and selectivity of the catalyst were increased, and the hydrogen generation rate was increased.

Preparation and Evaluation of the Hydrogen-Storage Alloy

Hydrogen-Storage Alloy Examples 1-13 and C1-C4

A total of about 1000 g of metals according to the alloy composition were weighed, placed in a water-cooled crucible of a vacuum induction melting furnace, and molten under vacuum to obtain an alloy, the preparation conditions including: the melting was performed under a background vacuum of $1*10^{-4}$ Pa, and the melting temperature and time were shown in Table 3. The annealing was performed by lowering the temperature to the annealing temperature at a rate of 10° C./min under a background vacuum of $1*10^{-4}$ Pa, and the annealing temperature and time were shown in Table 3. The nature cooling to room temperature was performed under a background vacuum of $1*10^{-4}$ Pa. The obtained alloy was crushed and sieved to obtain 70-200 mesh metal powder. The powder was put into a hydrogen-storage tank, and the hydrogen-storage tank was heated to 300° C. under a vacuum of 0.1 Pa for 4 hours to activate the alloy powder to obtain hydrogen-storage alloys 1-13 and C1-C4.

1 kg of hydrogen-storage alloy was placed in a hydrogen-storage tank, and a hydrogen gas containing organic substances at 20° C. (methane content of 0.01 vol %) was used as a model compound and passed into the hydrogen-storage tank to make the hydrogen gas react with the hydrogen-storage alloy to form a hydrogen-containing alloy. When the hydrogen-storage capacity of the hydrogen-storage alloy reached 75% of the theoretical capacity, the introduction of the hydrogen gas containing organic substances was terminated, the purging with hydrogen gas (purity: 95%) was performed for 20 minutes, then the hydrogen-storage tank was heated to keep the hydrogen-storage alloy under 50 MPa to perform the continuous hydrogen release, and the purity of hydrogen gas was analyzed by gas chromatography. The purity of hydrogen gas, the accumulated hydrogen-storage capacity and the attenuation rate of the hydrogen-storage capacity were shown in Table 3. The accumulated hydrogen-storage capacity refers to the total amount of the hydrogen gas absorbed in 30 runs of the hydrogen absorption. After 30 runs of the above hydrogen absorption and hydrogen release cycle, the attenuation rate of the hydrogen-storage capacity was determined, wherein the attenuation rate=(the hydrogen-storage capacity at the first run of hydrogen absorption and hydrogen release minus the hydrogen-storage capacity at the 30th run of hydrogen absorption and hydrogen release)/the hydrogen-storage capacity at the first run of hydrogen absorption and hydrogen release*100%.

Hydrogen-Storage Alloy Examples 14-26 and C5-C10

A total of about 1000 g of metals according to the alloy composition were weighed, placed in a water-cooled crucible of a vacuum induction melting furnace, and molten under vacuum to obtain an alloy, the preparation conditions including: the melting was performed under a background vacuum of $1*10^{-4}$ Pa, and the melting temperature and time were shown in Table 3. The annealing was performed by lowering the temperature to the annealing temperature at a rate of 10° C./min under a background vacuum of $1*10^{-4}$ Pa, and the annealing temperature and time were shown in Table 3. The nature cooling to room temperature was performed under a background vacuum of $1*10^{-4}$ Pa. The obtained alloy was crushed and sieved to obtain 70-200 mesh metal powder. The powder was put into a hydrogen-storage tank, and the hydrogen-storage tank was heated to 300° C. under a vacuum of 0.1 Pa for 4 hours to activate the alloy powder to obtain hydrogen-storage alloys 14-26 and C5-C10.

1 kg of hydrogen-storage alloy was placed in a hydrogen-storage tank, and a hydrogen gas containing organic substances at 10° C. (methane content of 0.05 vol %) was used as a model compound and passed into the hydrogen-storage tank to make the hydrogen gas react with the hydrogen-storage alloy to form a hydrogen-containing alloy. When the hydrogen-storage capacity of the hydrogen-storage alloy reached 75% of the theoretical capacity, the introduction of the hydrogen gas containing organic substances was terminated, the purging with hydrogen gas (purity: >98%) was performed for 20 minutes, then the hydrogen-storage tank was heated to keep the hydrogen-storage alloy under 35 MPa to perform the continuous hydrogen release, and the purity of hydrogen gas was analyzed by gas chromatography. The purity of hydrogen gas, the accumulated hydrogen-storage capacity and the attenuation rate of the hydrogen-storage capacity were shown in Table 3. The accumulated hydrogen-storage capacity refers to the total amount of the hydrogen gas absorbed in 10 runs of the hydrogen absorption. After 10 runs of the above hydrogen absorption and hydrogen release cycle, the attenuation rate of the hydrogen-storage capacity was determined, wherein the attenuation rate=(the hydrogen-storage capacity at the first run of hydrogen absorption and hydrogen release minus the hydrogen-storage capacity at the 10th run of hydrogen absorption and hydrogen release)/the hydrogen-storage capacity at the first run of hydrogen absorption and hydrogen release*100%.

Hydrogen-Storage Alloy Examples 27-40 and C11-C14

A total of about 1000 g of metals according to the alloy composition were weighed, placed in a water-cooled crucible of a vacuum induction melting furnace, and molten under vacuum to obtain an alloy, the preparation conditions including: the melting was performed under a background vacuum of $1*10^{-4}$ Pa, and the melting temperature and time were shown in Table 3. The annealing was performed by lowering the temperature to the annealing temperature at a rate of 10° C./min under a background vacuum of $1*10^{-4}$ Pa, and the annealing temperature and time were shown in Table 3. The nature cooling to room temperature was performed under a background vacuum of $1*10^{-4}$ Pa. The obtained alloy was crushed and sieved to obtain 70-200 mesh metal powder. The powder was put into a hydrogen-storage tank, and the hydrogen-storage tank was heated to 300° C. under a vacuum of 0.1 Pa for 4 hours to activate the alloy powder to obtain hydrogen-storage alloys 27-40 and C11-C14.

1 kg of hydrogen-storage alloy was placed in a hydrogen-storage tank, and a hydrogen gas containing organic substances at 20° C. (methane content of 0.1 vol %) was used as a model compound and passed into the hydrogen-storage tank at a pressure of 5 MPa to make the hydrogen gas react with the hydrogen-storage alloy to form a hydrogen-containing alloy.

When the hydrogen-storage capacity of the hydrogen-storage alloy reached 75% of the theoretical capacity, the introduction of the hydrogen gas containing organic substances was terminated, the purging with hydrogen gas (purity: 95%) was performed for 20 minutes, then the hydrogen-storage tank was heated to keep the hydrogen-storage alloy under 20 MPa to perform the continuous hydrogen release, and the purity of hydrogen gas was analyzed by gas chromatography. The purity of hydrogen gas, the accumulated hydrogen-storage capacity and the attenuation rate of the hydrogen-storage capacity were shown in Table 3. The accumulated hydrogen-storage capacity refers to the total amount of the hydrogen gas absorbed in 10 runs of the hydrogen absorption. After 10 runs of the above hydrogen absorption and hydrogen release cycle, the attenuation rate of the hydrogen-storage capacity was determined, wherein the attenuation rate=(the hydrogen-storage capacity at the first run of hydrogen absorption and hydrogen release minus the hydrogen-storage capacity at the 10th run of hydrogen absorption and hydrogen release)/the hydrogen-storage capacity at the first run of hydrogen absorption and hydrogen release*100%.

Hydrogen-Storage Alloy Examples 41-56 and C15-C19

A total of about 1000 g of metals according to the alloy composition were weighed, placed in a water-cooled crucible of an arc-melting furnace, and molten under argon atmosphere to obtain an alloy, the specific preparation including: the melting was performed under a high-purity Ar atmosphere (purity 99.999), and the melting temperature, pressure and time were shown in Table 3. The annealing was performed by lowering the temperature to the annealing temperature of 650° C. at a rate of 10° C./min under a background vacuum of $1*10^{-4}$ Pa and for 48 hours at that annealing temperature. The nature cooling to room temperature was performed under vacuum. The obtained alloy was crushed and sieved to obtain 70-200 mesh metal powder. The powder was put into a hydrogen-storage tank, and the hydrogen-storage tank was heated to 300° C. under a vacuum of 0.1 Pa for 4 hours to activate the alloy powder to obtain hydrogen-storage alloys 41-56 and C15-C19.

1 kg of hydrogen-storage alloy was placed in a hydrogen-storage tank, and a hydrogen gas containing organic substances at 20° C. (methane content of 0.1 vol %) was used as a model compound and passed into the hydrogen-storage tank at a pressure of 2 MPa to make the hydrogen gas react with the hydrogen-storage alloy to form a hydrogen-containing alloy. When the hydrogen-storage capacity of the hydrogen-storage alloy reached 75% of the theoretical capacity, the introduction of the hydrogen gas containing organic substances was terminated, the hydrogen-storage tank was vacuumized with a vacuum pump at 80° C. for 5 minutes and then heated to keep the hydrogen-storage alloy under 0.1 MPa to perform the continuous hydrogen release, and the purity of hydrogen gas was analyzed by gas chromatography. The purity of hydrogen gas, the accumulated hydrogen-storage capacity and the attenuation rate of the hydrogen-storage capacity were shown in Table 3. The accumulated hydrogen-storage capacity refers to the total amount of the hydrogen gas absorbed in 10 runs of the hydrogen absorption. After 10 runs of the above hydrogen absorption and hydrogen release cycle, the attenuation rate of the hydrogen-storage capacity was determined, wherein the attenuation rate=(the hydrogen-storage capacity at the first run of hydrogen absorption and hydrogen release minus the hydrogen-storage capacity at the 10th run of hydrogen absorption and hydrogen release)/the hydrogen-storage capacity at the first run of hydrogen absorption and hydrogen release*100%.

Hydrogen-Storage Alloy Examples 57-67 and C20-C24

A total of about 1000 g of metals according to the alloy composition were weighed, placed in a water-cooled crucible of an arc-melting furnace, and molten under argon atmosphere to obtain an alloy, the specific preparation including: the melting was performed under a high-purity Ar atmosphere (purity 99.999%), and the melting temperature, pressure and time were shown in Table 3. The alloy was naturally cooled to room temperature under Ar atmosphere, then transferred into a vacuum annealing furnace to perform the vacuum annealing under a background pressure of $1*10^{-4}$ Pa, wherein the annealing temperature and time were shown in Table 3; and naturally cooled to room temperature. The obtained alloy was crushed and sieved to obtain 70-200 mesh metal powder. The powder was put into a hydrogen-storage tank, and the hydrogen-storage tank was heated to 50-300° C. under a vacuum of 0.1 Pa for 1-10 hours to activate the alloy powder (the specific activation temperature and time were shown in Table 3) to obtain hydrogen-storage alloys 57-67 and C20-C24.

1 kg of hydrogen-storage alloy was placed in a hydrogen-storage tank, and a hydrogen gas containing organic substances at 20° C. (methane content of 0.1 vol %) was used as a model compound and passed into the hydrogen-storage tank at a pressure of 2 MPa to make the hydrogen gas react with the hydrogen-storage alloy to form a hydrogen-containing alloy. When the hydrogen-storage capacity of the hydrogen-storage alloy reached 75% of the theoretical capacity, the introduction of the hydrogen gas containing organic substances was terminated, the hydrogen-storage tank was purged with hydrogen gas (purity 95%) for 20 minutes and then heated to keep the hydrogen-storage alloy under 10 MPa to perform the continuous hydrogen release, and the purity of hydrogen gas was analyzed by gas chromatography. The purity of hydrogen gas was shown in Table 3. After 10 runs of the above hydrogen absorption and hydrogen release cycle, the accumulated hydrogen-storage capacity and the attenuation rate of the hydrogen-storage capacity were determined, and listed in Table 3, wherein the attenuation rate=(the hydrogen-storage capacity at the first run of hydrogen absorption and hydrogen release minus the hydrogen-storage capacity at the 10th run of hydrogen absorption and hydrogen release)/the hydrogen-storage capacity at the first run of hydrogen absorption and hydrogen release*100%. The accumulated hydrogen-storage capacity refers to the total amount of the hydrogen gas absorbed in 10 runs of the hydrogen absorption.

The hydrogen-storage alloy provided by the present invention had good resistance to organic substance pollution, had better hydrogen absorption efficiency when the hydrogen gas contained organic substance, and had a higher hydrogen-storage capacity, and high-pressure and high-purity hydrogen gas could be obtained.

$AB_5$ Type Hydrogen-Storage Alloy Example 68

$MmNi_{3.55}Co_{0.75}Mn_{0.4}Al_{0.3}$, wherein $Mm=La_{0.61}Ce_{0.16}Pr_{0.04}Nd_{0.19}$ A total of about 100 g of metals according to the alloy composition were weighed, placed in a water-cooled crucible of an arc-melting furnace, and molten under argon atmosphere to obtain an alloy, the preparation conditions including: high-purity Ar atmosphere (purity 99.999%), pressure 0.9-1.0 atm, electric current 80-200 A, voltage 40 V, melting time 10-60 minutes, natural cooling to room temperature, under the Ar atmosphere. The alloy was transferred to high vacuum annealing furnace for vacuum annealing, background pressure $1*10^{-4}$ Pa, annealing temperature 800-950° C., annealing time 24-168 hours, and natural cooling to room temperature. The obtained alloy was crushed and sieved to obtain 70-200 mesh metal powder. The powder was put into a hydrogen-storage tank, and the hydrogen-storage tank was heated to 200-400° C. under a vacuum of 0.1 Pa for 1-4 hours to activate the alloy powder.

The following test methods were used to illustrate the effect of the catalyst of Example 1 and the $AB_5$ type hydrogen-storage alloy of Example 68 on the dehydrogenation reaction of the organic liquid hydrogen-storage material, and the separation by purification and pressurization.

The feedstock oil is methyl cyclohexane. The dehydrogenation reaction of methylcyclohexane was performed in a fixed bed microreactor for the evaluation, and the evaluation conditions were: reaction temperature 350° C., pressure 1 MPa, make-up hydrogen flow rate 150 mL/minH2 (normal conditions), methylcyclohexane feedstock 2 mL/min, and catalyst loading 20 g. The specific parameters and results were shown below.

After the dehydrogenation reaction product was cooled, it was separated in a separation tank placed in 20° C. brine, the cooling temperature was controlled to 20° C., the liquid product was collected, and the gas product was introduced into the hydrogen-storage alloy storage tank for the hydrogen absorption. After the adsorption capacity of the hydrogen-storage alloy reached the set value, the hydrogen-storage alloy storage tank was purged with hydrogen with purity of 99% at the hydrogen absorption temperature for 30 minutes, and then the hydrogen-storage alloy was heated to release the hydrogen gas.

wherein, the conversion rate=reacted methylcyclohexane/total methylcyclohexane feed The reaction products were analyzed by chromatography, and the conversion rate was calculated using the product composition data at the 10th minute.

Dehydrogenation reaction temperature: 350° C.
Dehydrogenation reaction pressure: 1 MPa
Organic liquid dehydrogenation conversion rate: 98.50%
Hydrogen absorption temperature: 20° C.
Hydrogen partial pressure for hydrogen absorption: 0.2 MPa
Hydrogen release temperature: 200° C.
Hydrogen partial pressure for hydrogen release: 35 MPa
Purity of hydrogen gas: 99.99%
Hydrogen-storage capacity (200 mL): 14.1 g.

TABLE 1

Support preparation conditions, support composition and support properties

| Support Example | Support Name | Modified support composition, wt % $Al_2O_3$ | $TiO_2$ | $ZrO_2$ | Fluidization time/hours | Hydrolysis time/hours | Specific surface area/cm²/g | Pore volume mL/g | η | θ | Shift at 458.8 eV of Ti 2 $P_{3/2}$ orbital electron binding energy, eV | Shift at 464.5 eV of Ti 2 $P_{1/2}$ orbital electron binding energy, eV |
|---|---|---|---|---|---|---|---|---|---|---|---|---|
| 1 | 1 | 97.02 | 2.98 | | 1 | 4 | 174 | 0.48 | 0 | 33.2 | 0.63 | 0.82 |
| 2 | 2 | 94.23 | 5.77 | | 2 | 8 | 170 | 0.48 | 0 | 16.6 | 0.63 | 0.82 |
| 3 | 3 | 92.11 | 7.89 | | 3 | 10 | 168 | 0.46 | 0 | 12.0 | 0.63 | 0.82 |
| 4 | 4 | 90.03 | 9.97 | | 4 | 16 | 165 | 0.45 | 0 | 9.3 | 0.62 | 0.81 |
| 5 | 5 | 88.22 | 11.78 | | 5 | 18 | 164 | 0.45 | 0 | 7.8 | 0.62 | 0.81 |
| 6 | 6 | 86.47 | 13.53 | | 6 | 20 | 162 | 0.43 | 0 | 6.8 | 0.62 | 0.81 |
| 7 | 7 | 84.8 | 15.2 | | 7 | 25 | 161 | 0.43 | 0 | 6.0 | 0.61 | 0.80 |
| 8 | 8 | 83.3 | 16.7 | | 8 | 30 | 160 | 0.42 | 0 | 5.4 | 0.61 | 0.80 |
| 9 | 9 | 95.79 | 2.86 | 1.35 | 1 | 8 | 172 | 0.47 | 0 | 34.3 | 0.63 | 0.82 |
| 10 | 10 | 89.27 | 7.25 | 3.48 | 3 | 16 | 167 | 0.45 | 0 | 12.8 | 0.62 | 0.82 |
| 11 | 11 | 83.18 | 11.59 | 5.23 | 5 | 30 | 160 | 0.42 | 0 | 7.8 | 0.61 | 0.81 |
| Comparative 1 | C1 | 100 | | | | | 176 | 0.48 | | | | |
| Comparative 2 | C2 | 97.08 | 2.92 | | | | 172 | 0.43 | 0.4 | 1.6 | 0 | 0 |
| Comparative 3 | C3 | 90.12 | 9.88 | | | | 163 | 0.42 | 0.5 | 1.5 | 0 | 0 |
| Comparative 4 | C4 | 86.55 | 13.45 | | | | 150 | 0.4 | 0.5 | 2.4 | 0.41 | 0.52 |
| Comparative 5 | C5 | 86.58 | 13.42 | | | | 150 | 0.4 | 0.5 | 2.6 | 0.41 | 0.53 |
| Comparative 6 | C6 | 95.75 | 2.88 | 1.37 | | | 169 | 0.43 | 0.4 | 1.4 | 0 | 0 |
| Comparative 7 | C7 | 83.24 | 11.51 | 5.25 | | | 151 | 0.39 | 0.5 | 1.1 | 0 | 0 |

Note:
The support composition was the normalized result of the XRF measurement.

TABLE 2

| Example | Support Names | Support Weight (wt %) | Chloroplatinic acid Weight (wt %) | Nickel nitrate Weight (wt %) | Other metal Names | Other metal Weight (wt %) | Methyl cyclohexane conversion rate | Selectivity | yield | Hydrogen gas generation rate[a] mL\h | microreaction test condition[b] |
|---|---|---|---|---|---|---|---|---|---|---|---|
| 1 | 1 | 99.2 | 0.8 | | | | 76.90% | 98.40% | 0.76 | 48.06 | 350, 150, 2 |
| 2 | 1 | 99.4 | 0.6 | | | | 70.20% | 98.60% | 0.69 | 43.98 | 350, 150, 2 |
| 3 | 1 | 99.4 | 0.6 | | | | 74.10% | 98.70% | 0.73 | 46.4 | 350, 150, 2 |

TABLE 2-continued

| Example | Support Names | Support Weight (wt %) | Chloro-platinic acid Weight (wt %) | Nickel nitrate Weight (wt %) | Other metal Names | Other metal Weight (wt %) | Methyl cyclohexane conversion rate | Selectivity | yield | Hydrogen gas generation rate[a]mL\h | microreaction test condition[b] |
|---|---|---|---|---|---|---|---|---|---|---|---|
| 4 | 1 | 96.5 | 0.5 | 1 | copper nitrate | 2 | 73.20% | 97.90% | 0.72 | 56.94 | 350, 150, 2.5 |
| 5 | 1 | 98.5 | 0.5 | 1 | | | 72.10% | 97.30% | 0.70 | 55.95 | 350, 150, 2.5 |
| 6 | 1 | 98.5 | 0.5 | 1 | | | 73.20% | 97.40% | 0.71 | 56.72 | 350, 150, 2.5 |
| 7 | 1 | 99.5 | 0.5 | | | | 62.80% | 98.40% | 0.62 | 49.03 | 350, 150, 2.5 |
| 8 | 1 | 90 | 10 | | | | 76.90% | 99.00% | 0.76 | 96.53 | 350, 300, 4 |
| 9 | 1 | 98 | 2 | | | | 72.80% | 98.80% | 0.72 | 91.27 | 350, 300, 4 |
| 10 | 1 | 88 | | 10 | tin chloride | 2 | 95.60% | 91.80% | 0.88 | 28.49 | 400, 150, 1.0 |
| 11 | 1 | 88 | | 10 | tin chloride | 2 | 96.00% | 92.10% | 0.88 | 28.72 | 400, 150, 1.0 |
| 12 | 1 | 90 | | 10 | | | 93.50% | 90.50% | 0.85 | 27.57 | 400, 150, 1.0 |
| 13 | 2 | 98.9 | | | palladium chloride chloroiridic acid | 0.6 0.5 | 70.80% | 95.60% | 0.68 | 43.44 | 350, 150, 2 |
| 14 | 2 | 99.2 | 0.6 | | rhenium trichloride | 0.2 | 76.10% | 98.50% | 0.75 | 47.62 | 350, 150, 2 |
| 15 | 2 | 91.7 | 0.3 | 8 | | | 68.40% | 93.60% | 0.64 | 51.5 | 350, 150, 2.5 |
| 16 | 2 | 75 | | 10 | iron nitrate ammonium phosphate | 9 6 | 95.80% | 82.40% | 0.79 | 26.65 | 400, 150, 1.0 |
| 17 | 3 | 99.2 | 0.6 | | palladium chloride | 0.2 | 76.50% | 98.60% | 0.75 | 47.88 | 350, 150, 2 |
| 18 | 3 | 99.2 | 0.6 | | palladium chloride | 0.2 | 76.50% | 98.60% | 0.75 | 47.88 | 350, 150, 2 |
| 19 | 3 | 84.9 | 0.1 | 15 | | | 63.50% | 90.40% | 0.57 | 46.64 | 350, 150, 2.5 |
| 20 | 3 | 89 | | 8 | tin chloride zinc nitrate | 1 2 | 95.40% | 91.20% | 0.87 | 28.27 | 400, 150, 1.0 |
| 21 | 4 | 98.9 | 0.6 | | chloroiridic acid | 0.5 | 77.00% | 95.80% | 0.74 | 47.25 | 350, 150, 2 |
| 22 | 4 | 87 | | 9 | iron nitrate | 4 | 95.20% | 87.80% | 0.84 | 27.59 | 400, 150, 1.0 |
| 23 | 5 | 96.4 | 0.6 | | tin chloride | 3 | 76.20% | 97.20% | 0.74 | 47.28 | 350, 150, 2 |
| 24 | 5 | 96.5 | 0.5 | | tin chloride | 3 | 68.20% | 97.20% | 0.66 | 52.81 | 350, 150, 2.5 |
| 25 | 5 | 85 | | 10 | silver nitrate | 5 | 95.00% | 90.20% | 0.86 | 27.92 | 400, 150, 1.0 |
| 26 | 6 | 94.4 | 0.6 | 5 | nickel nitrate | | 76.50% | 96.30% | 0.74 | 47.1 | 350, 150, 2 |
| 27 | 6 | 99.2 | 0.8 | | | | 76.60% | 98.20% | 0.75 | 47.81 | 350, 150, 2 |
| 28 | 6 | 88.7 | 0.3 | 8 | tin chloride | 3 | 70.80% | 94.20% | 0.67 | 53.58 | 350, 150, 2,5 |
| 29 | 6 | 87 | | 8 | zinc nitrate copper nitrate | 3 2 | 95.90% | 92.10% | 0.88 | 28.6 | 400, 150, 1.0 |
| 30 | 7 | 86 | | 8 | zinc nitrate iron nitrate | 3 3 | 95.80% | 89.80% | 0.86 | 28.17 | 400, 150, 1.0 |
| 31 | 9 | 94.4 | 0.6 | | manganous nitrate | 5 | 76.60% | 95.10% | 0.73 | 46.81 | 350, 150, 2 |
| 32 | 9 | 99.2 | 0.8 | | | | 76.50% | 98.10% | 0.75 | 47.71 | 350, 150, 2 |
| 33 | 9 | 94.5 | 0.5 | | manganous nitrate | 5 | 62.60% | 93.70% | 0.59 | 46.99 | 350, 150, 2.5 |
| 34 | 9 | 88 | | 10 | zinc nitrate | 2 | 95.10% | 90.50% | 0.86 | 28.07 | 400, 150, 1.0 |
| 35 | 10 | 93.4 | 0.6 | | copper nitrate | 6 | 76.70% | 96.50% | 0.74 | 47.33 | 350, 150, 2 |
| 36 | 10 | 99.2 | 0.8 | | | | 76.70% | 98.50% | 0.76 | 47.96 | 350, 150, 2 |
| 37 | 10 | 93.5 | 0.5 | | copper nitrate | 6 | 64.80% | 96.50% | 0.63 | 49.9 | 350, 150, 2.5 |
| 38 | 10 | 92 | | 6 | copper nitrate | 2 | 94.50% | 90.60% | 0.86 | 27.95 | 400, 150, 1.0 |
| 39 | 11 | 79.9 | 0.1 | 15 | manganous nitrate | 5 | 66.90% | 92.30% | 0.62 | 49.79 | 350, 150, 2.5 |
| Comparative 1 | C1 | 99.2 | 0.6 | | rhenium trichloride | 0.2 | 66.00% | 98.00% | 0.65 | 41.32 | 350, 150, 2 |
| Comparative 2 | C1 | 99.5 | 0.5 | | | | 58.50% | 98.10% | 0.57 | 45.51 | 350, 150, 2.5 |
| Comparative 3 | C1 | 88 | | 10 | tin chloride | 2 | 80.10% | 91.10% | 0.73 | 23.72 | 400, 150, 1.0 |
| Comparative 4 | C2 | 99.2 | 0.8 | | | | 67.00% | 97.80% | 0.66 | 41.7 | 350, 150, 2 |
| Comparative 5 | C2 | 96.5 | 0.5 | 1 | copper nitrate | 2 | 61.80% | 96.70% | 0.60 | 47.63 | 350, 150, 2.5 |
| Comparative 6 | C2 | 98.5 | 0.5 | 1 | | | 59.50% | 97.60% | 0.58 | 46.17 | 350, 150, 2.5 |
| Comparative 7 | C2 | 88 | | 10 | tin chloride | 2 | 83.20% | 91.70% | 0.76 | 24.79 | 400, 150, 1.0 |
| Comparative 8 | C3 | 98.9 | 0.6 | | chloroiridic acid | 0.5 | 62.60% | 95.00% | 0.59 | 38.23 | 350, 150, 2 |

TABLE 2-continued

| Example | Support Names | Support Weight (wt %) | Chloroplatinic acid Weight (wt %) | Nickel nitrate Weight (wt %) | Other metal Names | Other metal Weight (wt %) | Methyl cyclohexane conversion rate | Selectivity | yield | Hydrogen gas generation rate[a] mL\h | microreaction test condition[b] |
|---|---|---|---|---|---|---|---|---|---|---|---|
| Comparative 9 | C3 | 87 | | 9 | iron nitrate | 4 | 86.20% | 87.20% | 0.75 | 24.8 | 400, 150, 1.0 |
| Comparative 10 | C4 | 94.4 | 0.6 | 5 | nickel nitrate | | 64.50% | 91.80% | 0.59 | 38.51 | 350, 150, 2 |
| Comparative 11 | C4 | 99.2 | 0.8 | | | | 64.50% | 96.80% | 0.62 | 39.86 | 350, 150, 2 |
| Comparative 12 | C5 | 99.2 | 0.8 | | | | 65.80% | 97.30% | 0.64 | 40.81 | 350, 150, 2 |
| Comparative 13 | C5 | 88.7 | 0.3 | 8 | tin chloride | 3 | 54.80% | 90.20% | 0.49 | 40.14 | 350, 150, 2.5 |
| Comparative 14 | | | | | zinc nitrate | 3 | | | | | |
| | C5 | 87 | | 8 | copper nitrate | 2 | 90.80% | 91.90% | 0.83 | 27.04 | 400, 150, 1.0 |
| Comparative 15 | C6 | 94.4 | 0.6 | 5 | manganous nitrate | 5 | 60.30% | 93.80% | 0.57 | 36.55 | 350, 150, 2 |
| Comparative 16 | C6 | 94.5 | 0.5 | 5 | manganous nitrate | 5 | 57.30% | 93.80% | 0.54 | 43.25 | 350, 150, 2.5 |
| Comparative 17 | C6 | 88 | | 10 | zinc nitrate | 2 | 75.60% | 91.80% | 0.69 | 22.52 | 400, 150, 1.0 |

Note[a]:
The hydrogen generation rate in the above Table does not include the supplementary hydrogen in the feed.

Note[b]:
Micro reaction test conditions: temperature° C., make-up hydrogen flow rate (mL/minH2), methylcyclohexane feed rate (mL/min)

TABLE 3

| Hydrogen-storage alloy, Example | Melting temperature, ° C. | Melting time, hour | Melting pressure, bar | Annealing temperature, ° C. | Annealing time, hours | Activation, temperature, ° C. | Activation time, hours | Hydrogen-storage alloy formula |
|---|---|---|---|---|---|---|---|---|
| 1 | 1800 | 1 | | 800 | 24 | | | $(Ti_{0.8}Y_{0.2})_{0.95}(Mn_{0.95}Ni_{0.05})_{0.05}$ |
| 2 | 1850 | 0.8 | | 920 | 60 | | | $(Ti_{0.4}V_{0.4}Y_{0.2})_{0.9}(Fe_{0.05}Mn_{0.9}Ni_{0.05})_{0.1}$ |
| 3 | 1950 | 0.7 | | 850 | 90 | | | $(Ti_{0.7}Nb_{0.1}Y_{0.2})_{0.9}(Mn_{0.7}Ni_{0.3})_{0.1}$ |
| 4 | 2040 | 0.5 | | 900 | 115 | | | $(Ti_{0.4}Zr_{0.4}Y_{0.2})_{0.93}(Fe_{0.2}Mn_{0.7}Ni_{0.1})_{0.07}$ |
| 5 | 2100 | 0.3 | | 840 | 134 | | | $(Ti_{0.4}V_{0.35}Zr_{0.2}Y_{0.05})_{0.95}(Fe_{0.6}Mn_{0.2}Co_{0.1}Ni_{0.1})_{0.05}$ |
| 6 | 2200 | 0.2 | | 950 | 168 | | | $(Ti_{0.88}Y_{0.1}Ca_{0.02})_{0.95}(Fe_{0.3}Mn_{0.6}Ni_{0.1})_{0.05}$ |
| 7 | 1800 | 1 | | 800 | 24 | | | $(Ti_{0.8}Y_{0.2})_{0.95}(Fe_1)_{0.05}$ |
| 8 | 1850 | 0.8 | | 920 | 60 | | | $(Ti_{0.4}V_{0.4}Y_{0.2})_{0.9}(Fe_{0.05}Mn_{0.95})_{0.1}$ |
| 9 | 1950 | 0.7 | | 850 | 90 | | | $(Ti_{0.7}Nb_{0.1}Y_{0.2})_{0.9}(Mn_1)_{0.1}$ |
| 10 | 2040 | 0.5 | | 900 | 115 | | | $(Ti_{0.4}Zr_{0.4}Y_{0.2})_{0.93}(Fe_{0.2}Mn_{0.7}Co_{0.1})_{0.07}$ |
| 11 | 2100 | 0.3 | | 840 | 134 | | | $(Ti_{0.4}V_{0.4}Zr_{0.2})_{0.95}(Fe_{0.6}Mn_{0.2}Co_{0.1}Ni_{0.1})_{0.05}$ |
| 12 | 2200 | 0.2 | | 950 | 168 | | | $(Ti_{0.88}Y_{0.1}Ca_{0.2})_{0.95}(Fe_{0.3}Mn_{0.6}Co_{0.1})_{0.05}$ |
| 13 | 1950 | 0.7 | | 850 | 90 | | | $(Ti_{0.7}Nb_{0.1}Y_{0.2})_{0.8}(Mn_{0.7}Ni_{0.3})_{0.2}$ |
| C1 | 1800 | 1 | | 800 | 24 | | | $(Ti_{0.8}V_{0.2})_{0.95}(Mn_{0.55}Ni_{0.45})_{0.05}$ |
| C2 | 1850 | 0.8 | | 920 | 60 | | | $(Nb_{0.4}V_{0.4}Y_{0.2})_{0.9}(Fe_{0.05}Mn_{0.9}Ni_{0.05})_{0.1}$ |
| C3 | 2040 | 0.5 | | 900 | 115 | | | $(V_{0.4}Zr_{0.4}Y_{0.2})_{0.93}(Fe_{0.2}Mn_{0.7}Co_{0.1})_{0.07}$ |
| C4 | 2100 | 0.3 | | 840 | 134 | | | $(Ti_{0.4}V_{0.4}Zr_{0.2})_{0.95}(Fe_{0.05}Mn_{0.2}Co_{0.3}Ni_{0.45})_{0.05}$ |
| 14 | 2200 | 1 | | 950 | 24 | | | $Mg_{0.01}Ti_{0.93}Zr_{0.15}Y_{0.01}VMn_{0.9}Ni_{0.1}$ |
| 15 | 1870 | 0.9 | | 930 | 65 | | | $Ti_{0.85}Zr_{0.18}Y_{0.05}La_{0.02}V_{0.23}Cr_{0.05}Mn_{1.5}Fe_{0.09}Ni_{0.1}Cu_{0.1}$ |
| 16 | 2000 | 0.7 | | 900 | 90 | | | $Mg_{0.1}Ti_{0.7}Zr_{0.2}Y_{0.05}V_{0.1}Mn_{1.6}Ni_{0.2}Cu_{0.2}$ |
| 17 | 2050 | 0.6 | | 880 | 120 | | | $Ca_{0.01}Ti_{0.85}Zr_{0.05}Y_{0.05}V_{1.2}Mn_{0.6}Ni_{0.1}Cu_{0.2}$ |
| 18 | 2130 | 0.4 | | 85 | 142 | | | $Mg_{0.1}Ti_{0.8}Zr_{0.15}Y_{0.05}V_{0.1}Cr_{1.4}Mn_{0.2}Co_{0.1}Ni_{0.1}Cu_{0.2}$ |
| 19 | 2200 | 0.2 | | 800 | 168 | | | $Ti_{0.8}Zr_{0.25}Y_{0.05}V_{1.79}Mn_{0.1}Fe_{0.01}Ni_{0.1}Cu_{0.1}$ |
| 20 | 2200 | 1 | | 950 | 24 | | | $Ti_{0.64}Zr_{0.45}Y_{0.01}VMn_{0.9}Ni_{0.1}$ |
| 21 | 1870 | 0.9 | | 930 | 65 | | | $Ti_{0.55}Zr_{0.48}Y_{0.05}La_{0.02}V_{0.33}Cr_{0.05}Mn_{1.5}Fe_{0.09}Ni_{0.1}$ |
| 22 | 2000 | 0.7 | | 900 | 90 | | | $Ti_{0.6}Zr_{0.4}Y_{0.05}V_{0.1}Mn_{1.8}Ni_{0.2}$ |
| 23 | 2050 | 0.6 | | 880 | 120 | | | $Ca_{0.01}Ti_{0.9}Zr_{0.05}Y_{0.05}V_{1.2}Mn_{0.6}Ni_{0.3}$ |
| 24 | 2130 | 0.4 | | 85 | 142 | | | $TiZr_{0.05}Y_{0.05}V_{0.1}Cr_{1.4}Mn_{0.2}Co_{0.1}Ni_{0.3}$ |
| 25 | 2200 | 0.2 | | 800 | 168 | | | $Ti_{0.5}Zr_{0.55}Y_{0.05}V_{1.79}Mn_{0.1}Fe_{0.01}Ni_{0.2}$ |
| 26 | 2200 | 1 | | 950 | 24 | | | $Mg_{0.01}Ti_{0.63}Zr_{0.45}Y_{0.01}VMn_{0.9}Ni_{0.1}$ |
| C5 | 2200 | 1 | | 950 | 24 | | | $Ti_{0.65}Zr_{0.45}VMn_{0.9}Ni_{0.1}$ |
| C6 | 1870 | 0.9 | | 930 | 65 | | | $Ti_{1.03}Y_{0.05}La_{0.02}V_{0.23}Cr_{0.05}Mn_{1.5}Fe_{0.09}Ni_{0.1}Cu_{0.1}$ |
| C7 | 2000 | 0.7 | | 900 | 90 | | | $Mg_{0.5}Y_{0.5}Y_{0.05}V_{0.1}Mn_{1.6}Ni_{0.2}Cu_{0.2}$ |
| C8 | 2050 | 0.6 | | 880 | 120 | | | $Ca_{0.01}Ti_{0.85}Y_{0.05}V_{1.2}Mn_{0.7}Ni_{0.2}$ |
| C9 | 2130 | 0.4 | | 85 | 142 | | | $Mg_{0.1}Ti_{0.8}Zr_{0.15}Y_{0.05}V_{0.3}Cr_{1.4}Co_{0.1}Ni_{0.1}Cu_{0.2}$ |
| C10 | 2200 | 0.2 | | 800 | 168 | | | $Ti_{0.8}Zr_{0.25}Y_{0.05}Mn_{1.89}Fe_{0.01}Ni_{0.1}Cu_{0.1}$ |
| 27 | 1850 | 0.8 | | 800 | 98 | | | $TiY_{0.01}V_{0.1}Fe_{0.7}Mn_{0.1}Ni_{0.1}$ |
| 28 | 1950 | 1 | | 750 | 180 | | | $TiY_{0.02}V_{0.2}Fe_{0.7}Mn_{0.1}$ |

TABLE 3-continued

| | | | | | | | |
|---|---|---|---|---|---|---|---|
| 29 | 1830 | 0.5 | | 980 | 80 | | $Ti_{0.97}Y_{0.03}V_{0.05}Cr_{0.03}Fe_{0.5}Mn_{0.4}$ |
| 30 | 2200 | 1.5 | | 840 | 240 | | $Ti_{0.9}Y_{0.04}V_{0.05}Fe_{0.9}Mn_{0.1}$ |
| 31 | 2040 | 2 | | 780 | 120 | | $Ti_{0.91}Zr_{0.05}Y_{0.04}V_{0.1}Cr_{0.2}Fe_{0.6}Mn_{0.1}$ |
| 32 | 1850 | 1.5 | | 980 | 80 | | $Ti_{0.95}Y_{0.05}V_{0.05}Fe_{0.7}Mn_{0.21}Cu_{0.05}$ |
| 33 | 1950 | 2 | | 750 | 180 | | $Ti_{1.02}Y_{0.03}V_{0.05}Fe_{0.8}Mn_{0.1}Ni_{0.1}$ |
| 34 | 1850 | 0.8 | | 800 | 98 | | $TiY_{0.01}V_{0.1}Fe_{0.7}Ni_{0.2}$ |
| 35 | 1950 | 1 | | 750 | 180 | | $TiY_{0.02}V_{0.2}Fe_{0.8}$ |
| 36 | 1830 | 0.5 | | 980 | 80 | | $Ti_{0.97}Y_{0.03}V_{0.05}Cr_{0.03}Fe_{0.9}$ |
| 37 | 2200 | 1.5 | | 840 | 240 | | $Ti_{0.9}Y_{0.04}V_{0.15}Fe_{0.9}$ |
| 38 | 2040 | 2 | | 780 | 120 | | $Ti_{0.91}Zr_{0.05}Y_{0.04}V_{0.1}Cr_{0.2}Fe_{0.7}$ |
| 39 | 1850 | 1.5 | | 980 | 80 | | $Ti_{0.95}Y_{0.05}V_{0.26}Fe_{0.7}Cu_{0.05}$ |
| 40 | 1950 | 2 | | 750 | 180 | | $Ti_{1.02}Y_{0.03}V_{0.05}Fe_{0.9}Ni_{0.1}$ |
| C11 | 1850 | 0.8 | | 800 | 98 | | $TiV_{0.1}Fe_{0.7}Mn_{0.1}Ni_{0.1}$ |
| C12 | 1950 | 1 | | 750 | 180 | | $TiY_{0.02}Fe_{0.9}Mn_{0.1}$ |
| C13 | 1830 | 0.5 | | 980 | 80 | | $TiV_{0.05}Cr_{0.03}Fe_{0.5}Mn_{0.4}$ |
| C14 | 2200 | 1.5 | | 840 | 240 | | $Ti_{0.9}Y_{0.04}Fe_{0.95}Mn_{0.1}$ |
| 41 | 1850 | 0.8 | 0.6 | 650 | 48 | | $Mg_{1.8}Y_{0.1}Cr_{0.05}Ni_1$ |
| 42 | 1950 | 1 | 0.9 | 650 | 48 | | $Mg_{1.5}Ti_{0.5}Y_{0.05}Cr_{0.1}Ni_1$ |
| 43 | 1830 | 0.5 | 0.8 | 650 | 48 | | $Mg_2Y_{0.1}Cr_{0.05}Ni_{0.6}Cu_{0.4}$ |
| 44 | 2200 | 1.5 | 1 | 650 | 48 | | $Mg_{1.92}Y_{0.08}Cr_{0.2}Ni_{0.75}Fe_{0.05}$ |
| 45 | 2040 | 2 | 0.7 | 650 | 48 | | $Mg_{1.9}Y_{0.1}Cr_{0.1}Fe_{0.1}Ni_{0.7}Cu_{0.1}$ |
| 46 | 1850 | 1.5 | 0.9 | 650 | 48 | | $Mg_{1.9}Y_{0.1}Cr_{0.1}Ni_{0.8}Co_{0.2}$ |
| 47 | 1950 | 2 | 0.7 | 650 | 48 | | $Mg_{1.8}Y_{0.1}La_{0.1}Cr_{0.05}Ni_{0.9}Co_{0.1}$ |
| 48 | 2040 | 0.8 | 1 | 650 | 48 | | $Mg_{1.7}Ti_{0.2}Y_{0.1}Cr_{0.05}Ni_{0.7}Co_{0.3}$ |
| 49 | 1850 | 0.8 | 0.6 | 650 | 48 | | $Mg_{1.8}Y_{0.1}Ni_1$ |
| 50 | 1950 | 1 | 0.9 | 650 | 48 | | $Mg_{1.5}Ti_{0.5}Y_{0.05}Ni_{1.1}$ |
| 51 | 1830 | 0.5 | 0.8 | 650 | 48 | | $Mg_2Y_{0.1}Ni_{0.6}Cu_{0.4}$ |
| 52 | 2200 | 1.5 | 1 | 650 | 48 | | $Mg_{1.92}Y_{0.08}Ni_{0.95}Fe_{0.05}$ |
| 53 | 2040 | 2 | 0.7 | 650 | 48 | | $Mg_{1.9}Y_{0.1}Fe_{0.1}Ni_{0.8}Cu_{0.1}$ |
| 54 | 1850 | 15 | 0.9 | 650 | 48 | | $Mg_{1.9}Y_{0.1}Ni_{0.8}Co_{0.2}$ |
| 55 | 1950 | 2 | 0.7 | 650 | 48 | | $Mg_{1.8}Y_{0.1}La_{0.1}Ni_{0.9}Co_{0.1}$ |
| 56 | 2040 | 0.8 | 1 | 650 | 48 | | $Mg_{1.7}Ti_{0.2}Y_{0.1}Ni_{0.7}Co_{0.32}$ |
| C15 | 1850 | 0.8 | 0.6 | 650 | 48 | | $Mg_{1.9}Ni_1$ |
| C16 | 1950 | 1 | 0.9 | 650 | 48 | | $Mg_{1.5}Ti_{0.5}Ni_{1.1}$ |
| C17 | 1830 | 0.5 | 0.8 | 650 | 48 | | $Mg_{2.1}Ni_{0.6}Cu_{0.4}$ |
| C18 | 2200 | 1.5 | 1 | 650 | 48 | | $Mg_2Ni_{0.95}Fe_{0.05}$ |
| C19 | 2040 | 2 | 0.7 | 650 | 48 | | $Mg_2Fe_{0.1}Ni_{0.8}Cu_{0.1}$ |
| 57 | 1850 | 0.8 | 0.6 | 800 | 98 | 80 | 7 | $La_{0.5}Ce_{0.32}Nd_{0.15}Pr_{0.02}Y_{0.01}Ni_{4.4}Fe_{0.55}Al_{0.05}$ |
| 58 | 1950 | 1 | 0.9 | 750 | 180 | 100 | 6 | $La_{0.8}Ce_{0.15}Y_{0.05}Ni_4Mn_{0.5}Al_{0.5}$ |
| 59 | 1830 | 0.5 | 0.8 | 980 | 80 | 95 | 5 | $La_{0.45}Ce_{0.4}Nd_{0.1}Pr_{0.03}Y_{0.02}Ni_4Co_{0.8}Al_{0.2}$ |
| 60 | 2200 | 1.5 | 1 | 840 | 240 | 240 | 8 | $La_{0.75}Ce_{0.15}Nd_{0.05}Pr_{0.02}Y_{0.03}Ni_{4.7}Al_{0.1}Fe_{0.2}$ |
| 61 | 2040 | 2 | 0.7 | 780 | 120 | 180 | 4 | $La_{0.8}Ce_{0.15}Nd_{0.03}Y_{0.02}Ni_{4.5}Co_{0.3}Mn_{0.1}Al_{0.1}$ |
| 62 | 1850 | 0.8 | 0.6 | 800 | 98 | 80 | 7 | $La_{0.5}Ce_{0.32}Nd_{0.15}Pr_{0.02}Y_{0.01}Ni_{4.4}Fe_{0.6}$ |
| 63 | 1950 | 1 | 0.9 | 750 | 180 | 100 | 6 | $La_{0.8}Ce_{0.15}Y_{0.05}Ni_{4.5}Mn_{0.5}$ |
| 64 | 1830 | 0.5 | 0.8 | 980 | 80 | 95 | 5 | $La_{0.45}Ce_{0.4}Nd_{0.1}Pr_{0.03}Y_{0.02}Ni_{4.2}Co_{0.8}$ |
| 65 | 2200 | 15 | 1 | 840 | 240 | 240 | 8 | $La_{0.75}Ce_{0.15}Nd_{0.05}Pr_{0.02}Y_{0.03}Ni_{4.8}Fe_{0.2}$ |
| 66 | 2040 | 2 | 0.7 | 780 | 120 | 180 | 4 | $La_{0.8}Ce_{0.15}Nd_{0.03}Y_{0.02}Ni_{4.5}Co_{0.4}Mn_{0.1}$ |
| 67 | 1850 | 0.8 | 0.6 | 800 | 98 | 80 | 7 | $La_{0.97}Y_{0.03}Ni_4Co_1$ |
| C20 | 1850 | 0.8 | 0.6 | 800 | 98 | 80 | 7 | $La_{0.5}Ce_{0.32}Nd_{0.15}Pr_{0.03}Ni_{4.4}Fe_{0.6}$ |
| C21 | 1950 | 1 | 0.9 | 750 | 180 | 100 | 6 | $La_{0.8}Ce_{0.2}Ni_{4.5}Mn_{0.5}$ |
| C22 | 1830 | 0.5 | 0.8 | 980 | 80 | 95 | 5 | $La_{0.45}Ce_{0.4}Nd_{0.1}Pr_{0.05}Ni_{4.2}Co_{0.8}$ |
| C23 | 2200 | 15 | 1 | 840 | 240 | 240 | 8 | $La_{0.75}Ce_{0.15}Nd_{0.05}Pr_{0.05}Ni_{4.8}Fe_{0.2}$ |
| C24 | 2040 | 2 | 0.7 | 780 | 120 | 180 | 4 | $La_{0.8}Ce_{0.15}Nd_{0.05}Ni_{4.5}Co_{0.4}Mn_{0.1}$ |

| Hydrogen-storage alloy, Example | Accumulated hydrogen-storage capacity, g | Hydrogen purity, % | Attenuation rate, % |
|---|---|---|---|
| 1 | 581.28 | ≥99.95 | 1.27 |
| 2 | 582.29 | ≥99.95 | 0.92 |
| 3 | 582.46 | ≥99.95 | 0.87 |
| 4 | 582.63 | ≥99.95 | 0.81 |
| 5 | 581.54 | ≥99.95 | 1.18 |
| 6 | 583.31 | ≥99.95 | 0.58 |
| 7 | 580.61 | ≥99.95 | 1.5 |
| 8 | 581.45 | ≥99.95 | 1.21 |
| 9 | 581.77 | ≥99.95 | 1.1 |
| 10 | 581.87 | ≥99.95 | 1.07 |
| 11 | 580.94 | ≥99.95 | 1.39 |
| 12 | 582.8 | ≥99.95 | 0.75 |
| 13 | 579.02 | ≥99.95 | 2.04 |
| C1 | 564.28 | 99.68 | 7 |
| C2 | 557.85 | 99.74 | 9.14 |
| C3 | 566.88 | 99.79 | 6.13 |
| C4 | 568.27 | 99.86 | 5.67 |
| 14 | 134.27 | ≥99.97 | 1.07 |
| 15 | 134.65 | ≥99.97 | 0.52 |
| 16 | 134.59 | ≥99.97 | 0.6 |
| 17 | 134.3 | ≥99.97 | 1.03 |

TABLE 3-continued

| | | | |
|---|---|---|---|
| 18 | 134.67 | ≥99.97 | 0.49 |
| 19 | 134.61 | ≥99.97 | 0.58 |
| 20 | 134.24 | ≥99.97 | 1.12 |
| 21 | 134.57 | ≥99.97 | 0.64 |
| 22 | 134.44 | ≥99.97 | 0.83 |
| 23 | 134.15 | ≥99.97 | 1.25 |
| 24 | 134.47 | ≥99.97 | 0.78 |
| 25 | 134.43 | ≥99.97 | 0.84 |
| 26 | 133.97 | ≥99.97 | 1.52 |
| C5 | 130.77 | 99.72 | 6.21 |
| C6 | 131.83 | 99.85 | 4.67 |
| C7 | 131.3 | 99.79 | 5.44 |
| C8 | 130.94 | 99.74 | 5.96 |
| C9 | 132.71 | 99.89 | 3.38 |
| C10 | 132.12 | 99.86 | 4.25 |
| 27 | 139.22 | ≥99.97 | 0.4 |
| 28 | 139.17 | ≥99.97 | 0.47 |
| 29 | 139.31 | ≥99.97 | 0.27 |
| 30 | 139.4 | ≥99.97 | 0.04 |
| 31 | 139.44 | ≥99.97 | 0.09 |
| 32 | 139.01 | ≥99.97 | 0.7 |
| 33 | 139.24 | ≥99.97 | 0.38 |
| 34 | 139.06 | ≥99.97 | 0.63 |
| 35 | 138.99 | ≥99.97 | 0.73 |
| 36 | 139.2 | ≥99.97 | 0.43 |
| 37 | 139.44 | ≥99.97 | 0.09 |
| 38 | 139.36 | ≥99.97 | 0.21 |
| 39 | 138.75 | ≥99.97 | 1.07 |
| 40 | 139 | ≥99.97 | 0.72 |
| C11 | 135.31 | 99.63 | 5.96 |
| C12 | 134.88 | 99.54 | 6.55 |
| C13 | 135.55 | 99.75 | 5.61 |
| C14 | 136.95 | 99.89 | 3.63 |
| 41 | 267.34 | ≥99.99 | 1.96 |
| 42 | 268.43 | ≥99.99 | 1.16 |
| 43 | 268.79 | ≥99.99 | 0.9 |
| 44 | 269.03 | ≥99.99 | 0.72 |
| 45 | 269.24 | ≥99.99 | 0.57 |
| 46 | 269.42 | ≥99.99 | 0.43 |
| 47 | 269.45 | ≥99.99 | 0.4 |
| 48 | 268.91 | ≥99.99 | 0.81 |
| 49 | 266.62 | ≥99.99 | 2.49 |
| 50 | 267.82 | ≥99.99 | 1.61 |
| 51 | 268.18 | ≥99.99 | 1.34 |
| 52 | 268.49 | ≥99.99 | 1.12 |
| 53 | 268.73 | ≥99.99 | 0.94 |
| 54 | 268.93 | ≥99.99 | 0.79 |
| 55 | 269.02 | ≥99.99 | 0.73 |
| 56 | 268.63 | ≥99.99 | 1.01 |
| C15 | 258.4 | 99.43 | 8.48 |
| C16 | 259.9 | 99.55 | 7.39 |
| C17 | 260.67 | 99.63 | 6.84 |
| C18 | 262.71 | 99.68 | 5.36 |
| C19 | 263.89 | 99.76 | 4.5 |
| 57 | 104.75 | ≥99.97 | 0.48 |
| 58 | 104.9 | ≥99.97 | 0.2 |
| 59 | 104.86 | ≥99.97 | 0.27 |
| 60 | 104.98 | ≥99.97 | 0.04 |
| 61 | 104.95 | ≥99.97 | 0.09 |
| 62 | 104.63 | ≥99.97 | 0.7 |
| 63 | 104.8 | ≥99.97 | 0.38 |
| 64 | 104.76 | ≥99.97 | 0.45 |
| 65 | 104.95 | ≥99.97 | 0.09 |
| 66 | 104.86 | ≥99.97 | 0.27 |
| 67 | 104.39 | ≥99.97 | 1.16 |
| C20 | 101.39 | 99.76 | 6.8 |
| C21 | 102.07 | 99.83 | 5.53 |
| C22 | 101.89 | 99.56 | 5.87 |
| C23 | 102.62 | 99.85 | 4.5 |
| C24 | 102.12 | 99.89 | 5.44 |

The invention claimed is:

1. A process of providing high-purity hydrogen gas, comprising:

S1: contacting an organic liquid hydrogen-storage material with a dehydrogenation catalyst to obtain a dehydrogenation reaction product containing hydrogen gas;

S2: cooling the dehydrogenation reaction product to obtain a liquid product and a hydrogen-rich gas product, and collecting the liquid product;

S3: contacting the hydrogen-rich gas with a hydrogen-storage alloy to obtain a hydrogen-containing alloy, collecting an unadsorbed gas, and optionally removing an organic substance in the hydrogen-containing alloy storage container; and S4: heating the hydrogen-containing alloy to release a hydrogen gas, wherein the hydrogen-storage alloy is selected from the group consisting of:

$La_{0.61}Ce_{0.16}Pr_{0.04}Nd_{0.19}Ni_{3.55}Co_{0.75}Mn_{0.4}Al_{0.3}$, $(Ti_{0.8}V_{0.2})_{0.95}(Fe_1)_{0.05}$, $(Ti_{0.8}Y_{0.2})_{0.95}(Mn_{0.95}Ni_{0.05})_{0.05}$, $(Ti_{0.4}V_{0.4}Y_{0.2})_{0.9}(Fe_{0.05}Mn_{0.95})_{0.1}$, $(Ti_{0.4}V_{0.4}Y_{0.2})_{0.9}(Fe_{0.05}Mn_{0.9}Ni_{0.05})_{0.1}$, $(Ti_{0.7}Nb_{0.1}Y_{0.2})_{0.9}(Mn_1)_{0.1}$, $(Ti_{0.7}Nb_{0.1}Y_{0.2})_{0.9}(Mn_{0.7}Ni_{0.3})_{0.1}$, $(Ti_{0.4}Zr_{0.4}Y_{0.2})_{0.93}(Fe_{0.2}Mn_{0.7}Co_{0.1})_{0.07}$, $(Ti_{0.4}Zr_{0.4}Y_{0.2})_{0.93}(Fe_{0.2}Mn_{0.7}Ni_{0.1})_{0.07}$, $(Ti_{0.4}V_{0.4}Zr_{0.2})_{0.95}(Fe_{0.6}Mn_{0.2}Co_{0.1}Ni_{0.1})_{0.05}$, $(Ti_{0.4}V_{0.35}Zr_{0.2}Y_{0.05})_{0.95}(Fe_{0.6}Mn_{0.2}Co_{0.1}Ni_{0.1})_{0.05}$, $(Ti_{0.88}Y_{0.1}Ca_{0.02})_{0.95}(Fe_{0.3}Mn_{0.6}Co_{0.1})_{0.05}$, $(Ti_{0.88}Y_{0.1}Ca_{0.02})_{0.95}(Fe_{0.3}Mn_{0.6}Ni_{0.1})_{0.05}$, $(Ti_{0.7}Nb_{0.1}Y_{0.2})_{0.8}(Mn_{0.7}Ni_{0.3})_{0.2}$, $Ti_{0.64}Zr_{0.45}Y_{0.01}VMn_{0.9}Ni_{0.1}$, $Mg_{0.01}Ti_{0.93}Zr_{0.15}Y_{0.01}VMn_{0.9}Ni_{0.1}$, $Ti_{0.55}Zr_{0.48}Y_{0.05}La_{0.02}V_{0.33}Cr_{0.05}Mn_{1.5}Fe_{0.09}Ni_{0.1}$, $Ti_{0.85}Zr_{0.18}Y_{0.05}La_{0.02}V_{0.23}Cr_{0.05}Mn_{1.5}Fe_{0.09}Ni_{0.1}Cu_{0.1}$, $Ti_{0.6}Zr_{0.4}Y_{0.05}V_{0.1}Mn_{1.8}Ni_{0.2}$, $Mg_{0.1}Ti_{0.7}Zr_{0.2}Y_{0.05}V_{0.1}Mn_{1.6}Ni_{0.2}Cu_{0.2}$, $Ca_{0.01}Ti_{0.9}Zr_{0.05}Y_{0.05}V_{1.2}Mn_{0.6}Ni_{0.3}$, $Ca_{0.01}Ti_{0.85}Zr_{0.05}Y_{0.05}V_{1.2}Mn_{0.6}Ni_{0.1}Cu_{0.2}$, $TiZr_{0.05}Y_{0.05}V_{0.1}Cr_{1.4}Mn_{0.2}Co_{0.1}Ni_{0.3}$, $Mg_{0.1}Ti_{0.8}Zr_{0.15}Y_{0.05}V_{0.1}Cr_{1.4}Mn_{0.2}Co_{0.1}Ni_{0.1}Cu_{0.2}$, $Ti_{0.5}Zr_{0.55}Y_{0.05}V_{1.79}Mn_{0.1}Fe_{0.01}Ni_{0.2}$, $Ti_{0.8}Zr_{0.25}Y_{0.05}V_{1.79}Mn_{0.1}Fe_{0.01}Ni_{0.1}Cu_{0.1}$, $Mg_{0.01}Ti_{0.63}Zr_{0.45}Y_{0.01}VMn_{0.9}Ni_{0.1}$, $Mg_{1.8}Y_{0.1}Ni_1$, $Mg_{1.8}Y_{0.1}Cr_{0.05}Ni_1$, $Mg_{1.5}Ti_{0.5}Y_{0.05}Ni_{1.1}$, $Mg_{1.5}Ti_{0.5}Y_{0.05}Cr_{0.1}Ni_1$, $Mg_2Y_{0.1}Ni_{0.6}Cu_{0.4}$, $Mg_2Y_{0.1}Cr_{0.05}Ni_{0.6}Cu_{0.4}$, $Mg_{1.92}Y_{0.08}Ni_{0.95}Fe_{0.05}$, $Mg_{1.92}Y_{0.08}Cr_{0.2}Ni_{0.75}Fe_{0.05}$, $Mg_{1.9}Y_{0.1}Fe_{0.1}Ni_{0.8}Cu_{0.1}$, $Mg_{1.9}Y_{0.1}Cr_{0.1}Fe_{0.1}Ni_{0.7}Cu_{0.1}$, $Mg_{1.9}Y_{0.1}Ni_{0.8}Co_{0.2}$, $Mg_{1.9}Y_{0.1}Cr_{0.1}Ni_{0.8}Co_{0.2}$, $Mg_{1.8}Y_{0.1}La_{0.1}Ni_{0.9}Co_{0.1}$, $Mg_{1.8}Y_{0.1}La_{0.1}Cr_{0.05}Ni_{0.9}Co_{0.1}$, $Mg_{1.7}Ti_{0.2}Y_{0.1}Ni_{0.7}Co_{0.32}$, $Mg_{1.7}Ti_{0.2}Y_{0.1}Cr_{0.05}Ni_{0.7}Co_{0.3}$, $TiY_{0.01}V_{0.1}Fe_{0.7}Ni_{0.2}$, $TiY_{0.01}V_{0.1}Fe_{0.7}Mn_{0.1}Ni_{0.1}$, $TiY_{0.02}V_{0.2}Fe_{0.8}$, $TiY_{0.02}V_{0.2}Fe_{0.7}Mn_{0.1}$, $Ti_{0.97}Y_{0.03}V_{0.05}Cr_{0.03}Fe_{0.9}$, $Ti_{0.97}Y_{0.03}V_{0.05}Cr_{0.03}Fe_{0.5}Mn_{0.4}$, $Ti_{0.9}Y_{0.04}V_{0.15}Fe_{0.9}$, $Ti_{0.9}Y_{0.04}V_{0.05}Fe_{0.9}Mn_{0.1}$, $Ti_{0.91}Zr_{0.05}Y_{0.04}V_{0.1}Cr_{0.2}Fe_{0.7}$, $Ti_{0.91}Zr_{0.05}Y_{0.04}V_{0.1}Cr_{0.2}Fe_{0.6}Mn_{0.1}$, $Ti_{0.95}Y_{0.05}V_{0.26}Fe_{0.7}Cu_{0.05}$, $Ti_{0.95}Y_{0.05}V_{0.05}Fe_{0.7}Mn_{0.21}Cu_{0.05}$, $Ti_{1.02}Y_{0.03}V_{0.05}Fe_{0.9}Ni_{0.1}$, $Ti_{1.02}Y_{0.03}V_{0.05}Fe_{0.8}Mn_{0.1}Ni_{0.1}$, $La_{0.5}Ce_{0.32}Nd_{0.15}Pr_{0.02}Y_{0.01}Ni_{4.4}Fe_{0.55}Al_{0.05}$, $La_{0.5}Ce_{0.32}Nd_{0.15}Pr_{0.02}Y_{0.01}Ni_{4.4}Fe_{0.6}$, $La_{0.8}Ce_{0.15}Y_{0.05}Ni_4Mn_{0.5}Al_{0.5}$, $La_{0.8}Ce_{0.15}Y_{0.05}Ni_{4.5}Mn_{0.5}$, $La_{0.45}Ce_{0.4}Nd_{0.1}Pr_{0.03}Y_{0.02}Ni_4Co_{0.8}Al_{0.2}$, $La_{0.45}Ce_{0.4}Nd_{0.1}Pr_{0.03}Y_{0.02}Ni_{4.2}Co_{0.8}$, $La_{0.75}Ce_{0.15}Nd_{0.05}Pr_{0.02}Y_{0.03}Ni_{4.7}Al_{0.1}Fe_{0.2}$, $La_{0.75}Ce_{0.15}Nd_{0.05}Pr_{0.02}Y_{0.03}Ni_{4.8}Fe_{0.2}$, $La_{0.8}Ce_{0.15}Nd_{0.03}Y_{0.02}Ni_{4.5}Co_{0.3}Mn_{0.1}Al_{0.1}$, $La_{0.8}Ce_{0.15}Nd_{0.03}Y_{0.02}Ni_{4.5}Co_{0.4}Mn_{0.1}$, $La_{0.97}Y_{0.03}Ni_4Co_1$, and combinations of two or more thereof.

2. The process for providing a high-purity hydrogen gas according to claim 1, wherein:

in S1, the reaction temperature for contacting and reacting the organic liquid hydrogen-storage material with the dehydrogenation catalyst is 150 to 450° C.;

the weight hourly space velocity for contacting and reacting the organic liquid hydrogen-storage material with the dehydrogenation catalyst is 0.5-50 $h^{-1}$;

the pressure for contacting and reacting the organic liquid hydrogen-storage material with the dehydrogenation catalyst is 0.03-5 MPa (gauge pressure); and optionally, the organic liquid hydrogen-storage material is mixed with hydrogen gas and then contacted with the dehydrogenation catalyst, and the hydrogen-to-hydrocarbon ratio (the molar ratio of hydrogen gas to the organic liquid hydrogen-storage material) is 0-10;

in S2, the cooling temperature for cooling the dehydrogenation reaction product is lower than the boiling temperature of the organic substance(s) in the liquid product;

in S3, the hydrogen-rich gas is the hydrogen-rich gas product or a hydrogen gas-containing gas obtained by further separation of the hydrogen-rich gas product, and the process for the further separation is selected from the group consisting of temperature swing separation, membrane separation, pressure swing adsorption separation, and a combination of two or more thereof;

the mass fraction of hydrogen gas in the hydrogen-rich gas is ≥80%;

contacting the hydrogen-rich gas with the hydrogen-storage alloy is carried out in one or more hydrogen-storage alloy storage containers;

the number of the hydrogen-storage alloy(s) is one or more, and the hydrogen-storage alloys are used in a mixture, or in series, or in parallel, or in a combination thereof;

the pressure for contacting the hydrogen-rich gas with the hydrogen-storage alloy is 0.001-5 MPa, in case of a plurality of hydrogen-storage alloy storage containers and in the presence of hydrogen-storage containers in series, in the hydrogen-rich gas stream direction, the contact pressure for finally contacting with the hydrogen-storage alloy is 0.05-5 MPa;

the temperature for contacting the hydrogen-rich gas with the hydrogen-storage alloy is −70 to 100° C.; and in case of contacting with the hydrogen-storage alloy, the temperature of the hydrogen-rich gas is lower than the boiling temperature of the organic liquid hydrogen-storage material under normal pressure; and in S4, the temperature of hydrogen gas released by the hydrogen-storage alloy is 150 to 450° C., the pressure of the released hydrogen gas is ≥35 MPa in order to obtain a high-purity and high-pressure hydrogen, or the partial pressure of the released hydrogen gas is 0.1-5 MPa in order to obtain a high purity hydrogen gas, wherein the hydrogen release temperature is higher than the hydrogen absorption temperature; and the organic liquid hydrogen-storage material is an organic compound containing a ring in the molecule, which optionally contains heteroatom(s), and the heteroatom (s) may be on the ring.

3. The process for providing a high-purity hydrogen gas according to claim 1, wherein in S3, the number of the hydrogen-storage alloy storage container(s) is one or more, wherein according to the order of contacting with hydrogen gas, the hydrogen-storage alloy in the hydrogen-storage alloy storage container finally contacting with hydrogen gas is a hydrogen-storage alloy having a high equilibrium pressure, wherein the hydrogen-storage alloy having a high equilibrium pressure is such one that there is at least one temperature point between 150 and 450° C., and at this temperature point the equilibrium pressure for absorbing hydrogen gas is 35 MPa or higher.

4. The process for providing a high-purity hydrogen gas according to claim 1, wherein the step of removing an organic substance in the hydrogen-containing alloy storage container is performed, wherein after the hydrogen-storage alloy reaches a predetermined adsorption capacity, the supply of a hydrogen-rich gas to the hydrogen-storage alloy is stopped, a hydrogen gas is passed through the hydrogen-containing alloy, the organic gas in the hydrogen-containing alloy and in the hydrogen-containing alloy storage container is taken out, and introduced into a storage tank for storage or absorbed by the hydrogen-storage alloy in other hydrogen-storage alloy storage containers; wherein the purity of the hydrogen gas for purge is greater than 90 wt %.

5. The process for providing a high-purity hydrogen gas according to claim 1, wherein the process further comprises the hydrogen-containing alloy is allowed to release hydrogen gas, and the released hydrogen contacts with different hydrogen-storage alloy(s) to form hydrogen-containing alloy(s), and this process is repeated once or multiple times, wherein the hydrogen-storage alloy used in at least the last repetition process is a hydrogen-storage alloy having a high equilibrium pressure.

6. The process for providing a high-purity hydrogen gas according to claim 1, wherein
the hydrogen-storage alloy is a combination of a first hydrogen-storage alloy and a second hydrogen-storage alloy;
the first hydrogen-storage alloy is used for contacting with the hydrogen-rich gas, the first hydrogen-storage alloy is selected from the group consisting of $Mg_{1.8}Y_{0.1}Ni_1$, $Mg_{1.8}Y_{0.1}Cr_{0.05}Ni_1$, $Mg_{1.5}Ti_{0.5}Y_{0.05}Ni_{1.1}$, $Mg_{1.5}Ti_{0.5}Y_{0.05}Cr_{0.1}Ni_1$, $Mg_2Y_{0.1}Ni_{0.6}Cu_{0.4}$, $Mg_2Y_{0.1}Cr_{0.05}Ni_{0.6}Cu_{0.4}$, $Mg_{1.92}Y_{0.08}Ni_{0.95}Fe_{0.05}$, $Mg_{1.92}Y_{0.08}Cr_{0.2}Ni_{0.75}Fe_{0.05}$, $Mg_{1.9}Y_{0.1}Fe_{0.1}Ni_{0.8}Cu_{0.1}$, $Mg_{1.9}Y_{0.1}Cr_{0.1}Fe_{0.1}Ni_{0.7}Cu_{0.1}$, $Mg_{1.9}Y_{0.1}Ni_{0.8}Co_{0.2}$, $Mg_{1.9}Y_{0.1}Cr_{0.1}Ni_{0.8}Co_{0.2}$, $Mg_{1.8}Y_{0.1}La_{0.1}Ni_{0.9}Co_{0.1}$, $Mg_{1.8}Y_{0.1}La_{0.1}Cr_{0.05}Ni_{0.9}Co_{0.1}$, $Mg_{1.7}Ti_{0.2}Y_{0.1}Ni_{0.7}Co_{0.32}$, $Mg_{1.7}Ti_{0.2}Y_{0.1}Cr_{0.05}Ni_{0.7}Co_{0.3}$, and combinations of any two or more thereof;, the second hydrogen-storage alloy is used to pressurize a first hydrogen-storage hydrogen gas, and the second hydrogen-storage alloy is a hydrogen-storage alloy having a high equilibrium pressure, and the second hydrogen-storage alloy is one or more selected from the group consisting of $La_{0.61}Ce_{0.16}Pr_{0.04}Nd_{0.19}Ni_{3.55}Co_{0.75}Mn_{0.4}Al_{0.3}$, $Ti_{0.64}Zr_{0.45}Y_{0.01}VMn_{0.9}Ni_{0.1}$, $Mg_{0.01}Ti_{0.93}Zr_{0.15}Y_{0.01}VMn_{0.9}Ni_{0.1}$, $Ti_{0.55}Zr_{0.48}Y_{0.05}La_{0.02}V_{0.33}Cr_{0.05}Mn_{1.5}Fe_{0.09}Ni_{0.1}$, $Ti_{0.85}Zr_{0.18}Y_{0.05}La_{0.02}V_{0.23}Cr_{0.05}Mn_{1.5}Fe_{0.09}Ni_{0.1}Cu_{0.1}$, $Ti_{0.6}Zr_{0.4}Y_{0.05}V_{0.1}Mn_{1.8}Ni_{0.2}$, $Mg_{0.1}Ti_{0.7}Zr_{0.2}Y_{0.05}V_{0.1}Mn_{1.6}Ni_{0.2}Cu_{0.2}$, $Ca_{0.01}Ti_{0.9}Zr_{0.05}Y_{0.05}V_{1.2}Mn_{0.6}Ni_{0.3}$, $Ca_{0.01}Ti_{0.85}Zr_{0.05}Y_{0.05}V_{1.2}Mn_{0.6}Ni_{0.1}Cu_{0.2}$, $TiZr_{0.05}Y_{0.05}V_{0.1}Cr_{1.4}Mn_{0.2}Co_{0.1}Ni_{0.3}$, $Mg_{0.1}Ti_{0.8}Zr_{0.15}Y_{0.05}V_{0.1}Cr_{1.4}Mn_{0.2}Co_{0.1}Ni_{0.1}Cu_{0.2}$, $Ti_{0.5}Zr_{0.55}Y_{0.05}V_{1.79}Mn_{0.1}Fe_{0.01}Ni_{0.2}$, $Ti_{0.8}Zr_{0.25}Y_{0.05}V_{1.79}Mn_{0.1}Fe_{0.01}Ni_{0.1}Cu_{0.1}$, $Mg_{0.01}Ti_{0.63}Zr_{0.45}Y_{0.01}VMn_{0.9}Ni_{0.1}$, $TiY_{0.01}V_{0.1}Fe_{0.7}Ni_{0.2}$, $TiY_{0.01}V_{0.1}Fe_{0.7}Mn_{0.1}Ni_{0.1}$, $TiY_{0.02}V_{0.2}Fe_{0.8}$, $TiY_{0.02}V_{0.2}Fe_{0.7}Mn_{0.1}$, $Ti_{0.97}Y_{0.03}V_{0.05}Cr_{0.03}Fe_{0.9}$, $Ti_{0.97}Y_{0.03}V_{0.05}Cr_{0.03}Fe_{0.5}Mn_{0.4}$, $Ti_{0.9}Y_{0.04}V_{0.15}Fe_{0.9}$, $Ti_{0.9}Y_{0.04}V_{0.05}Fe_{0.9}Mn_{0.1}$, $Ti_{0.91}Zr_{0.05}Y_{0.04}V_{0.1}Cr_{0.2}Fe_{0.7}$, $Ti_{0.91}Zr_{0.05}Y_{0.04}V_{0.1}Cr_{0.2}Fe_{0.6}Mn_{0.1}$, $Ti_{0.95}Y_{0.05}V_{0.26}Fe_{0.7}Cu_{0.05}$, $Ti_{0.95}Y_{0.05}V_{0.05}Fe_{0.7}Mn_{0.21}Cu_{0.05}$, $Ti_{1.02}Y_{0.03}V_{0.05}Fe_{0.9}Ni_{0.1}$, $Ti_{1.02}Y_{0.03}V_{0.05}Fe_{0.8}Mn_{0.1}Ni_{0.1}$, $La_{0.5}Ce_{0.32}Nd_{0.15}Pr_{0.02}Y_{0.01}Ni_{4.4}Fe_{0.55}Al_{0.05}$, $La_{0.5}Ce_{0.32}Nd_{0.15}Pr_{0.02}Y_{0.01}Ni_{4.4}Fe_{0.6}$, $La_{0.8}Ce_{0.15}Y_{0.05}Ni_4Mn_{0.5}Al_{0.5}$, $La_{0.8}Ce_{0.15}Y_{0.05}Ni_{4.5}Mn_{0.5}$, $La_{0.45}Ce_{0.4}Nd_{0.1}Pr_{0.03}Y_{0.02}Ni_4Co_{0.8}Al_{0.2}$, $La_{0.45}Ce_{0.4}Nd_{0.1}Pr_{0.03}Y_{0.02}Ni_{4.2}Co_{0.8}$, $La_{0.75}Ce_{0.15}Nd_{0.05}Pr_{0.02}Y_{0.03}Ni_{4.7}Al_{0.1}Fe_{0.2}$, $La_{0.75}Ce_{0.15}Nd_{0.05}Pr_{0.02}Y_{0.03}Ni_{4.8}Fe_{0.2}$, $La_{0.8}Ce_{0.15}Nd_{0.03}Y_{0.02}Ni_{4.5}Co_{0.3}Mn_{0.1}Al_{0.1}$, $La_{0.8}Ce_{0.15}Nd_{0.03}Y_{0.02}Ni_{4.5}Co_{0.4}Mn_{0.1}$, $La_{0.97}Y_{0.03}Ni_4C_{O1}$, and combinations of any two or more thereof;
the hydrogen-rich gas is firstly passed through the first hydrogen-storage alloy for impurity separation; then the high-purity hydrogen gas released from the first hydrogen-storage alloy is contacted with the second hydrogen-storage alloy, and then the second hydrogen-storage alloy is allowed to release hydrogen gas under high pressure;
the hydrogen release temperature of the first hydrogen-storage alloy is higher than the hydrogen absorption temperature of the second hydrogen-storage alloy, and the temperature difference is ≥100° C.;
the first hydrogen-storage alloy and the second hydrogen-storage alloy are in different hydrogen-storage alloy storage tanks, and there is a heat exchange system between the first hydrogen-storage alloy storage tank and the second hydrogen-storage alloy storage tank;
the hydrogen absorption temperature for contacting the hydrogen-rich gas with the first hydrogen-storage alloy is 20-150° C., and the hydrogen gas partial pressure is 0.001-0.1 MPa;
the temperature at which the first hydrogen-storage alloy releases hydrogen gas is 150 to 450° C., and the hydrogen gas partial pressure for hydrogen release is 0.1-5 MPa;
the hydrogen absorption temperature at which the second hydrogen-storage alloy absorbs hydrogen gas is −70 to 100° C., and the hydrogen gas partial pressure for hydrogen absorption is 0.1-5 MPa,
the hydrogen release temperature of the second hydrogen-storage alloy is 150-450° C., and the hydrogen gas partial pressure for hydrogen release is ≥35 MPa.

7. The process for providing a high-purity hydrogen gas according to claim 1, wherein the process further comprises the released hydrogen gas is introduced into a hydrogen gas storage tank to store hydrogen gas; or the obtained high-purity and high-pressure hydrogen gas can be directly used to refuel a hydrogen fuel cell vehicle.

8. The process according to claim 1, wherein said dehydrogenation catalyst is a catalyst for producing hydrogen by dehydrogenation of organic liquid hydrogen-storage material, wherein the catalyst contains a support composition for a dehydrogenation catalyst of an organic liquid hydrogen-storage material and an active component, the support composition comprises alumina and a modified metal oxide, and the modified metal oxide is titanium oxide and/or zirconium oxide, wherein, $\eta < 0.3$, $\theta \geq 5$,
$\eta =$ the content by weight percent of the crystal phase of the modified metal oxide in the support composition/the content by weight percent of the chemical composition of the modified metal oxide in the support composition, and
$\theta =$ the content by weight percent of the modified metal oxide on the surface of the support composition/the content by weight percent of the chemical composition of the modified metal oxide in the support composition, titanium oxide is calculated as $TiO_2$, zirconium oxide is calculated as $ZrO_2$.

9. The process according to claim 8, wherein relative to a pure phase of $TiO_2$, in the XPS spectrum of the support composition, a peak at the Ti $2P_{3/2}$ orbital electron binding energy of 458.8 eV is shifted by 0.6-0.7 eV to a higher binding energy and/or a peak at the Ti $2P_{1/2}$ orbital electron binding energy of 464.5 eV is shifted by 0.8-0.9 eV to a higher binding energy.

10. The process according to claim 9, wherein a mass fraction of alumina in the support composition is 80-98.5%, a mass fraction of the modified metal oxide is 1.5-20%;
the modified metal oxide comprises titanium oxide;
in the support composition, the mass fraction of titanium oxide is 2-20%, and a mass fraction of zirconium dioxide is 0-8%;
wherein the support composition has the phase structure of at least one of γ-alumina, η-alumina, ρ-alumina, and χ-alumina; and
the support composition has a specific surface area of 100-350 m$^2$/g, and the support composition has a pore volume of 0.3-1.3 mL/g.

11. The process according to claim 9, wherein
an active component is:
at least one element in a noble metal group;
Pt and at least one element in a first metal group; or
Ni, at least one element in a second metal group, and optionally phosphorus, wherein
the noble metal group is a group consisting of elements selected from Pt, Pd, Ru, Re, Rh, Ir, and Os;
the first metal group is a group consisting of elements selected from Sn, V, Mo, Cr, Mn, Fe, Co, Ni, Cu, Ag, Ce, W, Cu, and Ca;
the second metal group is a group consisting of elements selected from Zn, Sn, Cu, Fe, Ag, In, Re, Mo, Co, Ca, and W; and
in the catalyst, the content of the support composition is 70-99.9 wt %, and the content of the active component is 0.1-30 wt %.

12. The process according to claim 11, wherein, in the catalyst, the active component is at least one element in the noble metal group, the content of the support composition is 90-99.9 wt %, the content of active component is 0.1-10 wt %,
the active component is Pt and optionally at least one element other than Pt in the noble metal group, wherein the content of Pt is 0.1-10 wt %, and the content of the at least one element other than Pt in the noble metal group is 0-9.9 wt %.

13. The process according to claim 11, wherein, in the catalyst, the active component is Pt and at least one element in the first metal group,
the content of the support composition is 75-99.5 wt %, the content of active component is 0.5-25 wt %;
in the active component, the content of Pt (calculated as elemental Pt) is 0.01-10 wt %, the content of at least one element (calculated as oxide) in the first metal group is 0.5-20 wt %, and
at least one element in the first metal group is Ni or is a combination of Ni and at least one element other than Ni selected from metals in the first metal group, wherein the mass ratio of Pt (calculated as elemental Pt) to Ni (as NiO) is (0.01:16) to (0.5:0.1).

14. The process according to claim 11, wherein, in the catalyst, the active component is Ni, at least one element in the second metal group, and optionally phosphorus,
in the catalyst, the content of the support composition is 70-95 wt %, the content of active component calculated as oxide is 5-30 wt %, and
in the active component, the content of nickel calculated as NiO is 0.5-25 wt %, the content of at least one element calculated as oxide in the second metal group is 0-15 wt %, and the content of phosphorus as $P_2O_5$ is 0-15 wt %.

* * * * *